(12) United States Patent
Arnold et al.

(10) Patent No.: US 7,908,474 B2
(45) Date of Patent: *Mar. 15, 2011

(54) METHOD FOR IMPROVED KEY MANAGEMENT FOR ATMS AND OTHER REMOTE DEVICES

(75) Inventors: Todd W. Arnold, Charlotte, NC (US);
Elizabeth A. Dames, Harrisburg, NC (US); Carsten D. Frehr, Farum (DK);
Kurt S. Jacobsen, Roskilde (DK);
Michael J. Kelly, Staatsburg, NY (US);
Mark D. Marik, Denver, NC (US);
Jesper Wiese, Lyngby (DK)

(73) Assignee: International Business Machines Corporation, Armonk, NY (US)

( * ) Notice: Subject to any disclaimer, the term of this patent is extended or adjusted under 35 U.S.C. 154(b) by 1209 days.

This patent is subject to a terminal disclaimer.

(21) Appl. No.: 11/534,232

(22) Filed: Sep. 22, 2006

(65) Prior Publication Data
US 2010/0031021 A1 Feb. 4, 2010

(51) Int. Cl.
*H04L 9/00* (2006.01)
*G06F 21/00* (2006.01)
(52) U.S. Cl. ........................................ 713/155; 713/190
(58) Field of Classification Search .................. 713/169, 713/155, 190
See application file for complete search history.

(56) References Cited

U.S. PATENT DOCUMENTS

| | | | |
|---|---|---|---|
| 3,707,725 A | 12/1972 | Dellheim | |
| 5,317,740 A | 5/1994 | Sites | |
| 5,437,037 A | 7/1995 | Furuichi | |
| 5,713,010 A | 1/1998 | Buzbee et al. | |
| 5,732,273 A | 3/1998 | Srivastava et al. | |
| 6,071,317 A | 6/2000 | Nagel | |
| 6,092,175 A | 7/2000 | Levy et al. | |
| 6,106,573 A | 8/2000 | Mahalingaiah et al. | |
| 6,131,154 A | 10/2000 | Kawasaki et al. | |
| 6,173,421 B1 | 1/2001 | Weaver Johnson et al. | |
| 6,308,318 B2 | 10/2001 | Krishnaswamy | |
| 6,634,019 B1 | 10/2003 | Rice et al. | |
| 6,993,751 B2 | 1/2006 | Bhansali et al. | |
| 7,010,784 B1 | 3/2006 | Sentovich et al. | |
| 7,080,360 B2 | 7/2006 | Bates et al. | |
| 7,178,135 B2 | 2/2007 | Bates et al. | |
| 7,257,806 B1 | 8/2007 | Chen et al. | |
| 7,308,458 B2 | 12/2007 | Vincent, III | |

(Continued)

OTHER PUBLICATIONS

Benton et al.; "Compiling Functional Types to relational specifications fo rLow Level Imperative Code"; ACM TLDI, pp. 3-14; 2009.

(Continued)

*Primary Examiner* — Kambiz Zand
*Assistant Examiner* — Aubrey H Wyszynski
(74) *Attorney, Agent, or Firm* — Cantor Colburn LLP; John Campbell

(57) ABSTRACT

A method, article, and system for providing an effective implementation of a data structure comprising instructions that are cryptographically protected against alteration or misuse, wherein the instructions further comprise a trusted block that defines specific key management policies that are permitted when an application program employs the trusted block in application programming interface (API) functions to generate or export symmetric cryptographic keys. The trusted block has a number of fields containing rules that provide an ability to limit how the trusted block is used, thereby reducing the risk of the trusted block being employed in unintended ways or with unintended keys.

5 Claims, 18 Drawing Sheets

U.S. PATENT DOCUMENTS

| | | |
|---|---|---|
| 7,320,123 B2 | 1/2008 | Govindarajapuram et al. |
| 7,363,617 B2 | 4/2008 | Barsness et al. |
| 7,383,396 B2 | 6/2008 | Wyman |
| 7,421,681 B2 | 9/2008 | DeWitt, Jr. et al. |
| 7,516,304 B2 | 4/2009 | Ehrman et al. |
| 7,596,745 B2 | 9/2009 | Dignum et al. |
| 7,665,015 B2 | 2/2010 | Dignum et al. |
| 2004/0003246 A1* | 1/2004 | Hopkins et al. ............... 713/168 |
| 2004/0015832 A1 | 1/2004 | Stapp et al. |

OTHER PUBLICATIONS

Edson Borin et al.; "Software-Based Transparent and Comprehensive Control-Flow Error Detection"; IEEE CGO, pp. 1-13; 2006.

Joao Dias et al.; "Automatically Generating Instruction Selectors using Declarative Machine Descriptions"; ACM POPL, pp. 403-416; 2010.

Xekalakis et al.; "Combining Thread Level Speculation, Helper Threads and Runhead Execution"; ACM ICS, pp. 410-420; 2009.

* cited by examiner

METHOD FOR IMPROVED KEY MANAGEMENT FOR ATMS AND OTHER REMOTE DEVICES

CROSS REFERENCE TO RELATED APPLICATIONS

This application is related to commonly assigned U.S. patent application Ser. No. 11/534,236, entitled METHOD FOR CONTROLLING SECURITY FUNCTION EXECUTION WITH A FLEXIBLE, EXTENDABLE, AND NON-FORGABLE BLOCK, filed on Sep. 22, 2006. This application is incorporated by reference herein in its entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to cryptographic coprocessors employed in server computer systems, and more particularly to providing a method, article, and system for the effective implementation for securely transferring symmetric encryption keys to remote devices, such as Automated Teller Machines (ATMs), PIN entry devices, and point of sale terminals. It may also be used to transfer symmetric keys to another cryptographic system of any type, such as a Host Security Module (HSM) in a computer server.

2. Description of the Related Art

Automated Teller Machines (ATMs), PIN entry devices, and point of sale terminals have become a central feature of modern life and have become quite prevalent in and out of the work environment. For example, during the course of the day, a user may utilize an ATM to conduct financial transactions, purchase gas for an automobile from a point of sale terminal in the form of a fuel pump via a credit or debit card, and purchase food at the grocery store in a checkout line with a point of sale terminal also with a credit or debit card. In all these instances, security is a prime concern, and an individual's data (card number, passwords, account numbers, etc.) must be kept secure and out of reach from unintended parties. In addition, access to controls and machine settings must be secured. The securing of sensitive data is normally accomplished through the use of encryption or encoding of the data. Encrypted data is only supposed to be accessible to an intended party with use of an encryption key to decipher the encoded information. The widespread use of electronic transaction processing applications has increased the demands for improved features, ease of use, and improved security.

Remote Key Loading refers to the process or loading symmetric encryption keys to a remotely located device, such as an ATM, from a central administrative site. The process encompasses two phases of key distribution:

1. Distribution of initial key encrypting keys (KEKs) to a newly installed device. A KEK is a type of symmetric encryption key that is used to encrypt other keys so they can be securely transmitted over unprotected paths.
2. Distribution of operational keys or replacement KEKs, enciphered under a IEK currently installed in the device.

A new ATM, when it is delivered from the manufacturer and being put into operation, has none of the affiliated bank's or service provider's security keys pre-installed. The process of getting the first key securely loaded in the ATM is a difficult one. Loading the first KEK into each ATM manually, in multiple cleartext key parts has typically been the security key loading process. In this process, two separate people must carry key part values to the ATM, and load them manually. Once inside the ATM, they are combined to form the actual KEK. In this manner, neither of the two people has the entire key, protecting the key value from disclosure or misuse. This method is labor-intensive and error-prone, making it expensive for the banks or service providers.

When an ATM is in operation, the bank or service provider can install new keys as needed by sending them enciphered under a KEK it installed at an earlier time. This is straightforward in concept, but the cryptographic architecture in the ATMs is often different from that of the host system sending the keys, and it is difficult to export the keys in a form understood by the ATM. For example, cryptographic architectures often enforce key usage restrictions, in which a key is bound to data describing limitations on how it can be used. The encoding of these restrictions and the method used to bind them to the key itself differs among cryptographic architectures, and it is often necessary to translate the format to that understood by the target device before a key can be transmitted. It is difficult to do this without reducing security in the system by making it possible to arbitrarily change key usage restrictions. The reduction in the level of security could potentially introduce holes that could permit misuse of the key management functions to attack the system.

The present invention is directed to addressing, or at least reducing the effects of, one or more of the problems set forth above, through the introduction of a new secure data structure called a trusted block. This disclosure describes a new and novel method for providing the necessary cryptographic functions to create and manage the special key forms needed for remote key distribution of this type. The invention described here also provides a mechanism through which the system owner can securely control these translations, preventing the majority of attacks that could be mounted by modifying usage restrictions.

Glossary

Access Control—A mechanism for regulating access to resources, data or services based on the role and identity of individual users.

AND—When capitalized in this fashion, refers to the "AND" boolean operation.

API Function—Application programming interface is the interface that a computer system, library, or application provides in order to allow requests for services to be made of it by other computer programs, and/or to allow data to be exchanged between them.

BER encoding—Basic Encoding Rules for ASN.1 (Abstract Syntax Notation One, defined in the X.208 standard). ASN.1 is a flexible notation that allows one to define a variety of data types, from simple types such as integers and bit strings to structured types such as sets and sequences, as well as complex types defined in terms of others. BER describes how to represent or encode values of each ASN.1 type as a string of eight-bit octets.

CBC—Cipher Block Chaining mode of encryption.

CCA—The Common Cryptographic Architecture, a cryptographic architecture and related APIs developed by IBM and used in many IBM cryptographic products.

CCA token—A key structure used to carry CCA keys in various formats. The token can be either an internal token or an external token as defined below.

Cleartext—The form of a message or data that is transferred or stored without cryptographic protection.

Confounder—A bit string that is used to initialize the encryption-block chaining value so that the encrypted result is different each time a data value is encrypted.

Control vector, or CV—That portion of a CCA key token that describes how the key may be used. This information is defined in published IBM documentation: IBM PCI Cryptographic Coprocessor CCA Basic Services Reference and Guide.

CVG—The Control Vector Generate service. This service generates a CV based on a key type.

DES—Data Encryption Standard—DES works by encrypting groups of 64 message bits, which is the same as 16 hexadecimal digits. To do the encryption, DES uses "keys" where are also apparently 16 hexadecimal digits long, or apparently 64 bits long. However, every 8th key bit is ignored in the DES algorithm, so that the effective key size is 56 bits. But, in any case, 64 bits (16 hexadecimal digits) is the round number upon which DES is organized Double length CV—A control vector that is 16 bytes in length.

Double length Key—A DES key that is 16 bytes in length.

DSV service—The Digital Signature Verify service. This service performs a digital signature verification using the public key found within the trusted block.

EDE—Encrypt, Decrypt, Encrypt. This describes a method of implementing Triple DES.

Exporter key—A type of transport key, which is used to wrap a key that will be used at a different node.

External key—A key that is for exchange with another cryptographic device. This key is encrypted with a transport key, also called a key-encrypting key (KEK). The KEK is shared with the other device to which the key may be transmitted.

IMP-PKA—A limited authority importer KEK (key encrypting key) used to protect PKA (public-key algorithm) structures when they are in external form.

Importer key—A type of transport key, which is used to unwrap a key that will be used at a node.

IV—Initial vector. This is a value used in CBC mode encryption.

Input block—A trusted block token, which gets updated during the trusted block creation process.

Internal key—A key that is for use on the local cryptographic device. This key is encrypted with a master key associated with the cryptographic device.

Key encrypting key (KEK)—A symmetric key that is used to encrypt a key for transport to another device. Both devices must have the same KEK key value so that one can encrypt a key with it, and the other can decrypt the key after it is received. Also called a Transport key.

Keyword—An option that will direct the specific processing of a process or routine.

KVP—A Key Verification Pattern. This is a cryptographically-calculated hash of a key's cleartext value, which can be used to verify that the correct key value is used, without disclosing any information about any bits of the key itself.

Label—A string which can be used to reference a key token that has been stored in a file or other repository.

MAC—A Message Authentication Code. This is a cryptographically-computed checksum, which uses a cryptographic key to produce a fixed-length hash of a variable-length message string. The MAC will change if any portion of the message is changed, or if the wrong key is used.

MAC key—A key designated for the purpose of computing a MAC (Message Authentication Code).

Master key—A key stored in a secure cryptographic device for the purpose of encrypting keys to be used in that device which are stored externally in unprotected storage.

MDC-2—The 2-encryption per stage version of the Modification Detection Code hashing algorithm discussed in the CCA Basic Services Reference and Guide (available from IBM Corporation, Armonk, N.Y., and at www.ibm.com/security/cryptocards).

MKVP—Master key verification pattern.

PKA Master Key—Public Key Algorithm master key—a master key used to encrypt keys for public-key algorithms such as RSA.

PKCS 1.0—Digital Signature Hash Block 1 Formatting Method described in the PKCS #1 v2.0 standard at website: www.rsasecurity.com/rsalabs/pkcs.

PKCS 1.1—Digital Signature Hash Block 0 Formatting Method described in the PKCS #1 v2.0 standard at website: www.rsasecurity.com/rsalabs/pkcs.

PKCS 1.2—A method of formatting keys described in the PKCS #1 v2.0 standard at website: www.rsasecurity.com/rsalabs/pkcs.

PKI service—The Public Key Import service. This service converts an RSA key or trusted block from external form to internal form. The PKI service is used to implement the Trusted Block Import service.

RKX service—The Remote Key Export service is a method of secured transport of DES keys from a security module (e.g. the 4764 Cryptographic Coprocessor) to a remote device, e.g. Automated Teller Machine or vise versa, using asymmetric or symmetric techniques. The DES keys to be transported are either key encrypting keys that are generated within the 4764, or alternately, operational keys or replacement KEKs enciphered under a KEK currently installed in a remote device. This service accepts as input parameters: a public key certificate, a transport key, a rule ID to identify the appropriate rule section to be used within a trusted block, an importer key, a source key, optional extra data that can be used as part of the OAEP key wrapping process, and key check parameters that are required to calculate the key check value. This service outputs a symmetric encrypted key, an optional asymmetric encrypted key, and an optional key check value.

RKX token, or RKX key token—A data structure used to encase a key that is generated, or exported by the RKX service. The RKX token contains: a length field indicating the size of the data it contains, an 8 byte confounder, an encrypted key that is either 8, 16, or 24 bytes in size, a rule ID identifying the trusted block rule that was used to create the RKX token, and a MAC value. The MAC value is an ISO-16609 TDES CBC mode MAC that is computed over the RKX token starting at offset zero in the token and including all fields up to but not including the MAC value field itself.

RSA OAEP—A method of formatting a key for secure transport described in the PKCS #1 v2.0 standard at website: www.rsasecurity.com/rsalabs/pkcs.

Single Length Key—A DES key that is 8 bytes in length.

Single Length CV—A control vector that is 8 bytes in length

TBC service—Trusted Block Create service. This service creates a trusted block in external form under dual or multiple control.

TDES—Triple DES

Triple DES—A mode of the DES encryption algorithm in which each block of data is encrypted three times with either two or three different eight-byte keys in order to provide increased security.

TLV—Acronym for "Tag Length Value". This refers to a data structure design in which there exists: a tag field identifying the data structure as a particular type; a length field of the entire structure including the tag, length, and value fields; and a value field which may be any number of bytes long.

Token—A data structure representing a series of bytes that are to be treated as an entity. The structure can contain cryptographic key material, control vectors or other data related to the key.

Transport key—See Key encrypting key.

Triple Length Key—A DES key that is 24 bytes in length.

Trusted Block—A data structure protected by a MAC that typically contains an RSA public key and optional information (rules) to control export of other keys associated with the device(s) that use that public key. For remote key distribution, the public key will be the root certification key for the remote device vendor, and it will be used to verify the signature on public key certificates for individual remote devices. In this case, the Trusted Block will also contain Rules that will be used to generate or export DES keys for the ATM or other remote devices. It is also possible for the Trusted Block to be used simply as a trusted public key container, and in this case the Public Key in the block will be used in CCA functions such as Digital Signature Verify. In summary, the trusted block is a data structure formatted to contain (1) zero or one trusted public key section, (2) zero or more rule sections, (3) zero or one trusted block label section, (4) one trusted block information section, and (5) zero or one application defined data section.

Variant—A value used to modify a key value. The variant is generally a binary string of the same length as the key, and it is exclusive-ORed with the key value to produce a variant key that is used for some cryptographic operation.

XOR—This refers to the "exclusive OR" Boolean operation.

SUMMARY OF THE INVENTION

Embodiments of the present invention include a data structure comprising instructions that are cryptographically protected against alteration or misuse. The instructions further comprise a trusted block that defines specific key management policies that are permitted when an application program employs the trusted block in application programming interface (API) functions to generate or export symmetric cryptographic keys. The API functions further comprise: a Trusted_Block_Create (TBC) function, and a Remote_Key_Export (RKX) function. The TBC function creates the trusted block, while the RKX function uses the trusted block to generate or export symmetric keys according to a set of parameters in the trusted block. In addition, the trusted block has a number of fields containing rules that provide an ability to limit how the trusted block is used, thereby reducing the risk of the trusted block being employed in unintended ways or with unintended keys.

The trusted block comprises: zero or one trusted public key section, zero or more rule sections, zero or one trusted block label section, one trusted block information section, and zero or one application defined data section. The application defined data section is an optional field that an application program can use to include its own data in the trusted block, and a cryptographic module does not use or examine this application program data in any way, but the application defined data is carried in the trusted block and protected in the same way as the other contents of said trusted block. The trusted block is protected by a MAC, which is calculated over the contents of the trusted block. The trusted block contains the public key and optional rules to control export of the symmetric cryptographic keys associated with device(s) that use the public key. In the case of remote key distribution the public key serves as the root certification key for the remote device(s). The public key may also serve to verify the signature on public key certificates for device(s), in which case said public key acts as a digital signature verifier.

The rules in the rules section of the trusted block are created and approved by a cryptographic module under dual control; and the rules are protected from modification. The rules in the rules section define how symmetric keys will be generated or exported under control of said trusted block.

The TBC function employs dual control (multiple control) to create the trusted block, where the dual control requires at least two separate individuals to create the trusted block. The TBC function comprises parameters that determine the length and structure and content of the trusted block. The MAC, which is a cryptographically-computed checksum that uses a cryptographic key to produce a fixed-length hash of a variable-length message string, will change if any portion of the trusted block is changed, or if a wrong key is used with said trusted block.

The structure of the trusted block used by the RKX function holds the encrypted symmetric keys so as to bind them to the trusted block, and allows sequences of RKX calls to be bound together as if they are an atomic operation. The RKX function provides for secure transport of the symmetric keys from a security module to a remote device. The RKX function creates a RKX token. The RKX token is a data structure used to encase the symmetric key. The RKX token further comprises: a length field indicating the size of the data contained within said RKX token; a 8 byte confounder; an encrypted key that is either 8, 16, or 24 bytes in size; a rule ID identifying said trusted block rule that was used to create said RKX token; and a MAC value.

The symmetric keys of the present novel invention maybe Data Encryption Standard (DES) key. The DES keys to be transported are either key encrypting keys (KEK) that are generated within the security module, or alternately, operational keys or replacement KEKs enciphered under a KEK installed in the remote device.

Embodiments of the present invention also include a method for securely transferring symmetric cryptographic keys to remote devices. The method utilizes a data structure comprising instructions that are cryptographically protected against alteration or misuse. The instructions further comprise a trusted block that defines specific key management policies that are permitted when an application program employs the trusted block in application programming interface (API) functions to generate or export symmetric cryptographic keys.

A system for implementing the method of the present invention, as well as, an article comprising one or more machine-readable storage media containing instructions that when executed enable a processor to carry out the method, are also provided.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
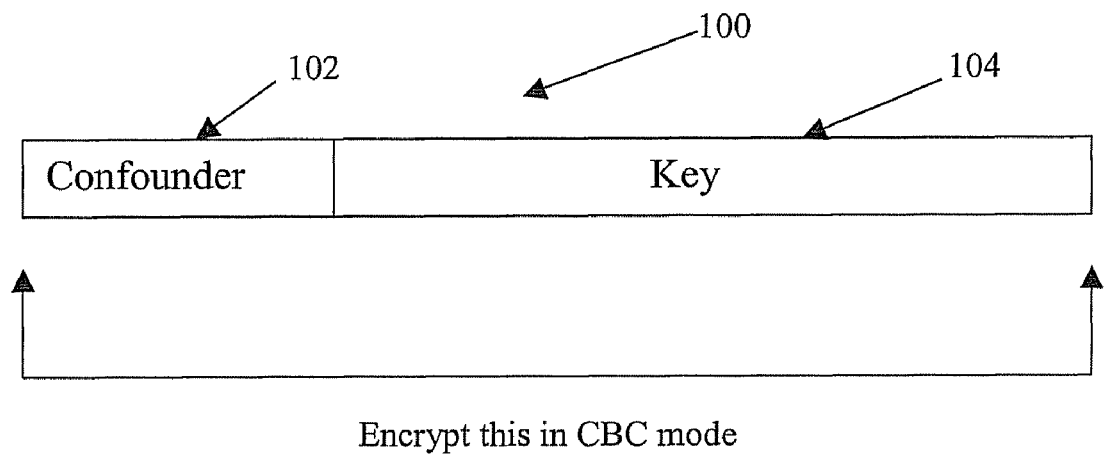
FIG. 1 is a block diagram illustrating a MAC key encrypted in CBC mode.

The detailed description explains the preferred embodiments of the invention, together with advantages and features, by way of example with reference to the drawings.

DETAILED DESCRIPTION OF THE INVENTION

The trusted block concept provides a great deal of flexibility and power, but at the same time it gives the security administrators the ability to tightly control what can be done with the cryptographic keys used by their applications. The new methods define new procedures for distributing and loading these keys using public key cryptographic techniques, which allow banks or other service providers to load the initial KEKs without sending anyone to the ATMs, or to exchange keys with other types of cryptographic systems. These methods will make the process quicker, more reliable, and much less expensive for the banks or other service providers. This disclosure describes a new and novel method for providing the necessary cryptographic functions to create and manage the special key forms needed for remote key distribution of this type. The invention described also provide a mechanism through which the system owner can securely control these translations, preventing the majority of attacks that could be mounted by modifying usage restrictions. An example of a cryptographic coprocessor used with server systems that would implement the present invention is the IBM 4764, which is also known as the PCIXCC or the Crypto Express2 (CEX2).

The trusted block is the central data structure to support all remote key loading functions. The trusted block provides great power and flexibility, but this means that it must be designed and used with care in order to have a secure system. The required security is provided through several features of the design.

Dual control (multiple control) is used to create a trusted block. Two separate individuals must cooperate in order to create a usable block.

The trusted block includes cryptographic protection that prevents any modification after it is created.

A number of fields in the trusted block rules offer the ability to limit how the block is used, reducing the risk of using it in unintended ways or with unintended keys.

Two API functions are defined to manage and use trusted blocks. The function Trusted_Block_Create (TBC) will create a Trusted Block, and the function Remote_Key_Export (RKX) will use a trusted block to generate or export symmetric keys according to the parameters in the trusted block.

Table 1 provides an overview of the structure of the trusted block.

TABLE 1

| Structure version information | |
| --- | --- |
| Public key | Modulus |
| | Exponent |
| | Attributes |
| Trusted Block Protection Information | MAC key |
| | MAC |
| | Flags |
| | KVP |
| | Activation/Expiration dates |
| Trusted Block name/label (optional) | Label |
| Rules | Rule 1 |
| | Rule 2 |
| | Rule 3 |
| | . . . |
| | Rule N |
| Application defined data | Data defined and understood only by the application using the trusted block |

The elements of table 1 are as follows:

Public Key This contains the public key and its attributes. For distribution of keys to a remote device, this will be the root certification key for the device vendor, and it will be used to verify the signature on public-key certificates for specific individual devices. In this case, the trusted block will also contain Rules that will be used to generate or export symmetric keys for the device. It is also possible for the trusted block to be used simply as a trusted public key container, and in this case the Public Key in the block will be used in general-purpose cryptographic functions such as digital signature verification. The public key attributes will contain information on key usage restrictions.

Protection Info This section contains information that is used to protect the trusted block contents against modification.

A CBC-mode MAC (Please note that alternative keyed hash algorithms, for example HMAC, can be used in place of the MAC without altering the intent of the invention) is calculated over the trusted block using a randomly-generated symmetric key, and the MAC key itself is encrypted and embedded in the block. For the internal form of the block, the MAC key is encrypted with a variant of the device master key. For the external form, the MAC key is encrypted with a fixed variant of a key-encrypting key. The KVP field contains the KVP for the master key that was used, and is filled with binary zeroes if the trusted block is in external format. The flags field contains the following Boolean flags.

The Active flag indicates whether the trusted block is complete and ready for use. This is the basis for enforcing dual control over creation of the block. One person creates the block, but in an inactive state. Subsequently, a second person approves the block and causes the Active flag to be turned on.

The date checking flag indicates whether the cryptographic device should check the expiration and activation dates for the trusted block. If this flag is off, date checking must be performed outside of the device if it is required. This is done so that the trusted block can be used with devices that have their own internal clock, as well as with devices that do not.

Trusted Block name/label This field optionally contains a text string that is a key label (name) for the trusted block. It is included in the block for use by an external system such as a host computer, and not by the card itself.

It is possible to disable use of trusted blocks that have been compromised or need to be removed from use for other reasons by publishing a revocation list containing the key names for the blocks that must not be used. A host computer system could check each trusted block before it is used in the cryptographic device, to ensure that the name from that block is not in the revocation list.

Expiration date and Activation date The trusted block can optionally contain an expiration date and an activation date. The activation date is the first day on which the block can be used, and the expiration date is the last day when the block can be used. If these dates are present, the date checkdng flag in the trusted block will indicate whether the cryptographic device should check the dates using its internal clock. If the device does not have its own clock, a host computer system application program can check the activation and expiration dates before the trusted block is used by the device. This is not quite as secure, but it is still valuable, and storing the dates in the block itself is preferable to making the application store it somewhere else and maintain the association between the separate trusted block and activation and expiration dates.

Rules A variable number of rules can be included in the block. Each rule contains information on how to generate or export a symmetric key, including values for variants to be used in order to provide keys in the formats expected by systems with differing cryptographic architectures. Rules are described in detail later in this document.

Application-defined data An optional field that an application program can use to include its own data in the trusted block. The cryptographic module does not use or examine this data in any way, but it is carried in the trusted block and protected in the same way as the other contents of the block.

The "Trust" in the Trusted Block is established by creating the block under dual control. Once that trust has been established, it is ensured using cryptographic techniques. The trusted block does not contain any data that has to be kept secret, but it is essential that its contents be protected against unintended modification. In order to accomplish this, the block is protected using a MAC, calculated using a symmetric key. The MAC key is randomly generated when the MAC is first calculated on the trusted block.

The MAC is calculated in the following way, for a trusted block B.

1. Make a temporary copy of the trusted block B. Call this temporary copy T.
2. Fill the following fields in block T with binary zeroes.
The MAC value.
The MAC key.
The KVP.
3. Calculate the MAC over the entire block T using the MAC key.
4. Insert the MAC into the MAC field of the trusted block B.

The MAC key itself is encrypted and embedded in the trusted block. If the trusted block is in internal form, the MAC key is encrypted with a variant of the device master key. If the block is in external form, it is encrypted using a key-encrypting key. In either case, the MAC key is prepended with a randomly generated confounder, which is equal to the block length of the encryption algorithm (For DES or Triple-DES the confounder is eight bytes in length) before it is encrypted. Encryption is in CBC mode, however alternative encryption modes will also work without altering the intent of the invention. ECB mode is not acceptable, however; encryption must use a mode that chains successive blocks of text so that each encryption depends on the content of the current message block and the preceding blocks. FIG. 1 illustrates the MAC key 100 encrypted in the CBC mode. The MAC key has two parts the confounder 102, and the key 104 itself.

For an internal format trusted block, the string shown in FIG. 1 is encrypted in CBC mode using a variant of the master key, with a zero IV (initialization vector). The variant is a fixed, randomly generated string of bytes with length equal to the master key. If the master key is a DES or Triple-DES key, each byte of the variant must have even parity so that the parity of the resulting key is not altered (Keys used with DES algorithms have odd parity in each byte of the key, so the variant must be constructed so that the resulting key after applying the variant still has odd parity in each byte.) The KVP for the device master key is stored in the KVP field of the trusted block so that availability of the correct master key can be verified when the block is used. For an external format trusted block, the string is encrypted in CBC mode using a provided key-encrypting key. Before it is used to encrypt the MAC key, the KEK is XORed with a variant in order to ensure the key cannot be misused in other CCA services. The variant value is a fixed, randomly generated value equal in length to the KEK. Like the variant for the master key described above, each byte of this variant must have even parity if it is used with a DES or Triple-DES key so that it does not affect the parity of the key.

The Trusted Block can have one or more rules, which define how symmetric keys will be generated or exported under control of the block. These are generally the keys that will be shared with the remote device, such as an ATM. As a part of the Trusted Block, the rules are created and approved by the cryptographic device owner under dual control, and protected from modification.

The IBM CCA cryptographic architecture uses control vectors exclusive-ORed with its symmetric keys, but most non-CCA cryptographic devices use variants, or use no modifying value at all. An important feature of the rules is the ability to specify arbitrary values to be XORed with the key being generated or exported. For additional flexibility, a second value can be specified to be XORed with the KEK used to wrap the key being generated or exported. These values can be CCA control vectors, variants, or zero. These values can be CCA control vectors, variants, or zero. This gives complete flexibility in sending keys to different types of cryptographic systems.

The Trusted Block rules can contain the following values to control key generation and export.

Rule ID A character string identifying the rule. When a program uses a Trusted Block, it provides a rule ID as an input parameter. This indicates which rule should be used, since the Trusted Block can have more than one rule. In addition, rules can reference other rules, and they do this by using the rule ID. (see next item.)

Transport key rule reference and Source key rule reference Rules can be used together. A key can be generated using one rule from the trusted block, and then used as input in a subsequent call. The rule references allow a rule to specify what other rule must have been used to produce a key used as input on this call. There are two different references that can be specified, and both are optional in a rule.

The transport key rule reference indicates what rule must have been used to produce the key used in the transport_key input to the RKX function, which is described later. If the reference is present in the rule, the transport key must be an RKX token, which contains the ID of the rule used to produce that token. The rule ID in the input RKX token must be equal to the ID specified in the rule.

The source key rule reference indicates what rule must have been used to produce the key used in the source_key input to the RKX function. If the reference is present in the rule, the source key must be an RKX token, which contains the ID of the rule used to produce that token. The rule ID in the input RKX token must be equal to the ID specified in the rule.

Note: the character * (asterisk) may be used in some implementations as a wildcard character in rule ID references. This would allow a reference to match multiple rules.

Generate/Export indicator A rule can be used to generate new symmetric keys, or to export existing keys. This flag indicates which of the two this rule is for.

Symmetric Encrypted Output Form This indicates the form of the encrypted output key. The form can either be a key immediately usable in cryptographic functions, or an RKX token that is bound to the Trusted Block and can only be used as input to a later call to the RKX function. This value will implicitly indicate the encryption method, for example CBC or ECB mode.

Asymmetric Encrypted Output Format/PKA Output Form This indicates what format should be used when encrypting the generated or exported key under the public key supplied within the public key certificate that is input to the RKX function. Examples are the industry-standard PKCS1.2 format or RSA OAEP format.

Generated key length The length of a generated key. Output key length is unused for export of existing keys, since that length is defined by the size of the key being exported.

Source key length limits This specifies the range of key lengths that are acceptable for export using this rule.

Output key variant A variant (which may have the value of a CCA Control Vector) to be XORed with the cleartext value of the output key, before it is enciphered. This can be any bit string, with length greater than or equal to the length of the key itself. If the variant is longer than the key, the leftmost bytes of the variant are used up to the length of the key.

KEK variant A variant (which may have the value of a CCA Control Vector) to be XORed with the KEK that is used to wrap the generated or exported key, before that KEK is used to wrap the key.

Key Label Template The host can optionally provide the key label (name) of a key being exported, or a key being used as the importer KEK. The rule can optionally contain a key label template, which will be matched against the host-supplied key label, using wildcards so that the template can match a set of related key labels. If the supplied label does not match the template in the rule, the cryptographic device will reject the request with an error.

Export key CV restrictions This field only applies when the key being exported is a CCA key, which has an associated control vector (CV). It will not be used for systems that do not use CCA keys.

Two fields work together to restrict the acceptable control vectors for CCA keys to be exported. By limiting the key types that can be exported, misuse of the export operation can be greatly reduced.

One field contains a mask to indicate which CV bits should be checked. The second field contains the required values for those CV bits that are to be checked. The CV for the key to be exported is first ANDed with the mask, and then the result is compared with the required values. If the two do not match, the request is rejected with an error.

Transport key CV values—The transport key CV may be applied to the transport key KEK before it is used to export the generated or exported key.

Key check algorithm Some applications will require a key check value for the key being generated or exported. An output parameter is provided to return the check value, and this field of the rule can be used to indicate what key check algorithm is to be used. The calculation of the key check value is optional. Note that an input parameter is also provided for use when the key check algorithm requires input parameters, such as a nonce, ATM ID, or other value.

Table 2 provides information on the content of the Trusted Block structure, including the rules it can contain.

TABLE 2

| Section | Optional? | Description |
| --- | --- | --- |
| Trusted public key | Yes | This includes the public key itself. Please note that the Trusted Block contains cryptographic information that guarantees the integrity of this public key and binds it to the local system. |
| A rule | Yes | A trusted block may have zero or more rules sections. If no rules are present, the block is simply a trusted public key. If there are rules, each is uniquely identified by its rule ID, and the block can be used by the RKX function to generate or export symmetric keys. |
| Trusted block label | Yes | This value can be used to identify the trusted block. One example of its use is for a host access control system such as RACF to verify that the application has the authority to use the trusted block identified by this label. |
| Trusted block information | No | This section contains control and security information related to the Trusted Block. It is separated from the public key and other sections, because this section is mandatory while the others are optional. |
| Application-defined data | Yes | This section can be used to include application-defined data in the Trusted Block. The data is not examined or used in any way by the CCA code, but it is cryptographically bound to the block so it can be trusted. |

The trusted public key section (Table 2) contains the public key modulus, exponent, and key usage flags to control how the key can be used. Table 3 summarizes the features and example applications of the public key. It should be noted that the public key is not a required part of a trusted block. In some applications, trusted blocks are used only in relation to symmetric key based key management, and in those cases the Trusted Block may not contain a public key section.

TABLE 3

Trusted Public Key Section contents

Public key exponent, e.
Modulus, n.
Key usage flags
These flags indicate how the public key can be used.
Examples include restrictions that would permit the key to be used as follows:
Use the key only in digital signature operations.
Use the key only in key management operations.
Use the key in both digital signature and key management operations.
These are only examples. Other key usage restrictions could also be defined.

The Trusted Block information section (Table 2) contains control and security related to the trusted block. It is required in all Trusted Blocks as indicated by its non-optional status. Table 4 summarizes the Trusted Block information section.

TABLE 4

Trusted block information

| | |
|---|---|
| Activation status. | This status can have one of the two following values. |
| INACTIVE | Trusted block is Inactive and will not be accepted for any purpose other than activation with the TBC function. |
| ACTIVE | Trusted block is Active and can be used in CCA functions such as RKX, TBC, and DSV. |

Trusted block information objects. This is a variable-length series of data objects for the trusted block information section. They are described below. Most are optional and are only present if needed.

The following objects (Table 4) contain optional parts of the trusted block information section. If used, the objects are included in the structure shown above.

The protection information object (Table 5) is required, and contains the data used to secure the trusted block. By making this a separate object, the opportunity to replace the protection mechanism in the future; for example, with a different MAC or HMAC algorithm is preserved.

TABLE 5

Protection information object

Encrypted MAC key. This includes the encryption of both the confounder and the key.
MAC
KVP for the device master key. This is set to binary zeroes if the trusted block is in external format.

The activation and expiration dates object (Table 6) is optional, and contains activation and expiration dates for the trusted block. It also contains a flag to indicate whether the cryptographic device should check the dates before using the block.

TABLE 6

Activation and expiration date object

CHECK-DATE - a Boolean flag indicating whether the cryptographic device should check the activation and expiration dates before using the trusted block.
Activation date for the trusted block.
Expiration date for the trusted block.

The Trusted Block label section (Tables 2 and 7) is optional and contains a label to identify the Trusted Block.

TABLE 7

Trusted block label

Label

The application-defined data section (Tables 2 and 8) is optional, and contains arbitrary data defined by the application program that creates the trusted block. It is not examined or used in any way by the device, but is bound to the trusted block by the MAC and can be used by the application program. An example is the use of this section to hold a public-key certificate for the trusted public key. The data is variable-length, but it must not cause the entire trusted block to exceed its maximum allowable size.

TABLE 8

Application-defined data

Length of application-defined data - values can be 0-400, inclusive.
Application-defined data The rule section (tables 2 and 9) of the Trusted Block is used to define a rule for key generation or export. The trusted block can have zero or more rules sections, where each section defines a different rule. Each rule has an embedded name that is used to identify it, so that a selected rule can be used when the trusted block is passed to the RKX function. The rules section consists of a set of fixed fields, followed by a variable number of optional objects. The optional objects are concatenated at the end of the fixed portion of the section structure, and only those objects that are needed are included in the structure. Table 9 summarizes the key features of the rule section.

TABLE 9

Rule

Rule ID. A character string value identifying the rule. The Rule ID for this rule must be different from the ID used in any other rules in this trusted block.
Generate/Export flag. This Boolean flag indicates whether the rule is for generation of a new symmetric key, or for export of an existing key.
Generated key length. This specifies the length, in bytes, of the key to be generated if this rule is for generation. If the rule is for key export, this value must be zero.
Key check algorithm identifier. This value identifies an algorithm to be used to compute a check value on the key. Examples include the following.
Do not compute a key check value.
Encrypt a block of binary zeroes with the key.
Compute a hash of the key using the SHA-1 algorithm.
Compute a hash of the key using the MDC-2 algorithm.
These are only examples, and other options are also possible.
Symmetric-encrypted output key format
This is used to specify the format of the output key, which is either encrypted under the transport key or in an RKX token. The following TABLE 9-continued Rule formats are defined.
The generated key is output in an RKX token.
The key is output in an external key token, encrypted by the transport key identified by the transport_key_identifier parameter to RKX. A transport key variant (see Transport Key Variant TLV) and/or a CCA Control Vector (see Common Export Key Parameters) may be applied to the transport key. If both are applied, the variant is applied first, and then the CV.
Other formats are also possible.
Asymmetric-encrypted output key format
This is used to specify the format of the output key which is encrypted under the RSA key provided as input to the RKX function.. The following formats are defined.
Do not output an asymmetric-encrypted copy of the key. The asymmetric-encrypted key length parameter of RKX will be set to zero on output.
The key is output in PKCS 1.2 format.
The key is output in RSAOEAP format. This format can make use of Extra Data, and that data can be provided in a parameter that is part of the RKX API.
Other formats are also possible.
Objects for optional fields. This is a series of zero or more objects. The objects are defined below.

The following objects contain optional parts of the trusted block rule section. If used, the objects are concatenated to the end of the base rule section structure defined above. The objects can appear in any order.

The transport key variant object is optional. It is used to hold a variant, which is XORed into the cleartext value of the transport key before that key is used to encrypt the key RKX is generating or exporting. The length must be greater than or equal to the length of the transport key that is supplied to RKX when this rule is used. If the variant is longer than the transport key, it is truncated on the right to the length of the key before it is used. Please note that if the transport key is in an RKX token, the variant is XORed with only the key itself, and not with the confounder that precedes the key in the token.

The transport key rule reference object is optional. If present, it contains the rule ID of the rule that must have been used to create the transport key being used to encrypt the key being generated or exported. This reference can only be used if the transport key is provided in an RKX token, which contains the rule ID for the rule used to create that key.

The common export key parameter object is required when exporting a key, and is optional when generating a key. It holds the parameters that are used to process the key being exported. This includes:

The variant which is XORed into the cleartext value of the key being exported, or generated before that key is encrypted.

The minimum and maximum length allowed for the key to be exported. Note that this is the actual key length, not the length of the structure that carries the key.

Flags to indicate options.

The length of the variant can be greater than the length of the key it is applied to. If the key to be exported is shorter than the variant, the variant is truncated on the right to be the same length as the key, and the truncated value is then used with the key. For example, if the variant length is 24 and the key being exported is only 16 bytes, then only the leftmost 16 bytes of the variant are used. The remaining 8 bytes are ignored. Table 10 summarizes common export parameters object.

TABLE 10

Common Export Key Parameters object
Flags (reserved)
Export key minimum length, in bytes. (For example, 8 for a single-length DES key)
Export key maximum length, in bytes
Output key variant length, in bytes.
Output key variant. This is applied to the cleartext value of the key being exported or generated.
Transport key CV length, in bytes.
Transport key CV, to be applied to the transport key before using it to export the key.

The source key rule reference object is optional, and is used to hold a rule reference for a source key that is provided to the RKX function in the form of an RKX token. That token contains the name of the rule that was used to create the token, and the source key rule reference, if present, is compared with that value in the RKX token. If the two do not match, execution of RKX aborts and an error is returned.

The export key CCA token parameters object is optional and is only used if the export key parameter is in the form of a CCA token. It is ignored (if present) when the export key is provided as an RKX token. The object contains fields that are compared with values in the CCA token, or associated with that token. Table 11 summarizes key aspects of the source key label object.

TABLE 11

Export key CCA token parameters object
Flags (reserved)
Export key CV limit mask.
Export key CV limit template.
Source key label template..

The Source key label template is a template that can be matched against the key label for the source key, when that key is specified using a key label. If the actual label for the key does not match the template (which can contain wildcards), the request is rejected. The CV limit mask and CV limit template have the same length, which is the length defined in the field Export key maximum length.

The following API functions support the creation of Trusted Blocks, and generation and export of keys using those blocks. In the presentation of the API functions below, the following terminology is used to describe option values passed to the functions.

Rule Array—The rule array is a variable-length array of 8-character text strings, each of which contains a keyword defining an option to be passed to the API function. The length of the array is determined by the number of options that are to be passed to the function, and it may vary for different invocations of the same function when different processing options are used.

Rule Array Count—The rule array count parameter specifies the number of 8-character option keywords that are contained in the rule array.

Please note that alternative methods can be used to pass options to an API function. The rule array is just used as the method in this description of the operations of these functions.

The Trusted Block create (TBC) function is used to create a Trusted Block under dual control. The block will be in external form, encrypted under a transport key (KEK). The format of the TBC function is shown in table 12.

TABLE 12

| | |
|---|---|
| TBC ( | |
| return_code | Output |
| rule_array_count | Input |
| rule_array | Input |
| input_block_length | Input |
| input_block | Input |
| transport_key_identifier | Input |
| trusted_block_length | In/Output |
| trusted_block ) | Output | input_block_length
  This parameter contains the length of the value in the input_block parameter, in bytes.
input_block
  This parameter contains the complete trusted block structure, which will be updated by the function and returned in parameter trusted_block. The length of the input_block string is indicated by parameter input_block_length. Its content is dependent on the rule array keywords supplied to the function.
  When the option keyword INACTIVE is given, the block is complete. It includes all fields of the trusted block structure, but typically does not have the MAC protection. If MAC protection is not present, the MAC key and MAC value will be filled in by the function. If the MAC protection is present due to recycling of an existing trusted block, then the MAC key and MAC value will be overlaid with the new MAC key and MAC value by this function. The Active flag will be set to False (0) in the block returned in trusted_block.
  When the option keyword ACTIVATE is given, the block is complete, including the MAC protection which is validated during execution of the function. The Active flag must be in the False (0) state. On output, the Active flag will be changed to the True (1) state, and the MAC value will be recalculated using the same MAC key.
transport_key_identifier This contains a key label (identifying name) or key token for a key encrypting key that is used to protect the trusted block.
trusted_block_length This parameter contains the length of the value in parameter trusted_block, in bytes.
trusted_block This is a buffer provided by the caller for the trusted block constructed by the function. On input, its length in parameter trusted_block_length contains the size of the buffer. On output, the length parameter is updated with the actual byte length of the trusted block written to the buffer. The trusted block consists of the data supplied in parameter input_block, but with the MAC protection and Active flag updated according to the rule array keyword that is provided. See table 13 and the description of the rule array keywords below for details on the actions.

TABLE 13

| Keyword | Meaning |
|---|---|
| | Operation (one required) |
| INACTIVE | Create the trusted block, but in inactive form. The MAC key is randomly generated, encrypted with the transport key, and inserted into the block. The Active flag is set to False (0), and the MAC is calculated over the block and inserted in the appropriate field. The resulting block is fully formed and protected, but it is not usable in any other CCA services. Use of the INACTIVE |

TABLE 13-continued

| Keyword | Meaning |
|---|---|
| | keyword is authorized by the access control system separately from the ACTIVATE operation. |
| ACTIVATE | Activate the supplied trusted block by turning on the Active flag and then recalculating the MAC using the key that is already present in the block. This makes the trusted block usable in CCA services. Use of the ACTIVATE keyword is authorized by the access control system separately from the INACTIVE operation. |

Either INACTIVE or ACTIVATE must be supplied to indicate the action. The two options are authorized separately, so that they can be assigned to different people. The same person should not be authorized to execute both the INACTIVE and ACTIVATE operations.

For keyword INACTIVE, the trusted block is constructed and protected with the MAC. The following steps summarize the INACTIVE operation.
1. Verify that the user is authorized to perform the INACTIVE operation of this function. Abort with an error if not authorized.
2. Validate the trusted block structure in parameter input_block. Abort with an error if the trusted block is not valid.
3. Validate the key in parameter transport_key_identifier. The definition of a valid key will depend on the particular implementation, but it would generally include validation that the data is not corrupt, and does not contain any invalid values.
4. Verify that there is enough space in the output buffer by verifying that parameter trusted_block_length is greater than or equal to parameter input_block_length.
5. Copy the block in parameter input_block to the buffer in parameter trusted_block and set parameter trusted_block_length to the value of parameter input_block_length.
6. Set the Active flag in trusted_block to False.
7. Randomly generate a new symmetric key to be used in computing the MAC for the trusted block.
8. Compute the MAC over the trusted block contents, using the key generated in step 7. Use an IV of binary zeroes. Insert the MAC into the MAC field of trusted_block.
9. Generate a random confounder with length equal to the symmetric algorithm block length, and encrypt the confounder concatenated with the MAC key from step 7 under the key provided in parameter transport_key_identifier. The MAC key should be encrypted in CBC mode using an IV of binary zeroes. Insert the encrypted MAC key in the appropriate field of trusted_block.

For keyword ACTIVATE, the trusted block is validated, and the Active flag is set so that the block can be used in other cryptographic services. The following steps summarize the operation.
1. Verify that the user is authorized to perform the ACTIVATE operation of this function. Abort with an error if not authorized.
2. Validate the key in parameter transport_key_identifier. The definition of a valid key will depend on the particular implementation, but it would generally include validation that the data is not corrupt, and does not contain any invalid values.
3. Validate the trusted block received in parameter input_block.
4. Verify that there is enough space in the output buffer by verifying that parameter trusted_block_length is greater than or equal to parameter input_block_length.

5. Copy the block in parameter input_block to the buffer in parameter trusted_block and set parameter trusted_block_length to the value of parameter input_block_length.
6. Parse the trusted block from parameter trusted_block to obtain the enciphered MAC key and the MAC.
7. Recover the cleartext version of the MAC key that is in the trusted block, by decrypting it with the transport key from parameter transport_key_identifier and removing the 8-byte confounder
8. Compute the MAC over the block in trusted_block, using the key recovered in step 7. Use an IV of binary zeroes. Compare the computed MAC to the MAC value parsed from the trusted block in step 6. If they are not equal, exit with an error.
9. Set the Active flag to True in the block in parameter trusted_block.
10. Compute a MAC over the block in parameter trusted_block, using the key recovered in step 7. Use an IV of binary zeroes. Please note that the MAC value will be different from the one received with the input trusted block, since the Active flag has been modified.

The remote key export (RKX) function uses the trusted block to generate or export symmetric keys for local use and for distribution to an ATM or other remote device. The application program indicates what rule in the trusted block is to be used. The function can either generate a new key, or export an existing key. The specified rule is examined to determine whether a generate or export operation is to be performed.

The RKX function uses a special structure to hold encrypted symmetric keys in a way that binds them to the trusted block, and allows sequences of RKX calls to be bound together as if they were an atomic operation. Incorporating the following three features into the RKX key structure does this.

- The key is enciphered using a variant of the MAC key that is in the trusted block. A fixed, randomly derived variant designated for this purpose is applied to the MAC key before it is used. The variant has the same length as the MAC key. If the MAC key is a DES or Triple-DES key, the variant will have even parity on each byte, so it will not affect the parity of the key it is applied to.
- The enciphered key is protected against disclosure, since the trusted block MAC key is itself protected at all times.
- The structure includes the rule ID for the trusted block rule that was used to create the key. A subsequent call to RKX can use this key with a trusted block rule that references the rule ID that must have been used to create this key, and that can be compared with this value.
- A MAC is computed over the encrypted key and the rule ID, using the same MAC key that is used to protect the trusted block itself. This MAC guarantees that the key and the rule ID cannot be modified without detection, providing integrity and binding the rule ID to the key itself. In addition, the MAC will only verify with the same trusted block that created the key, thus binding the key structure to that specific trusted block.

Figure 2:
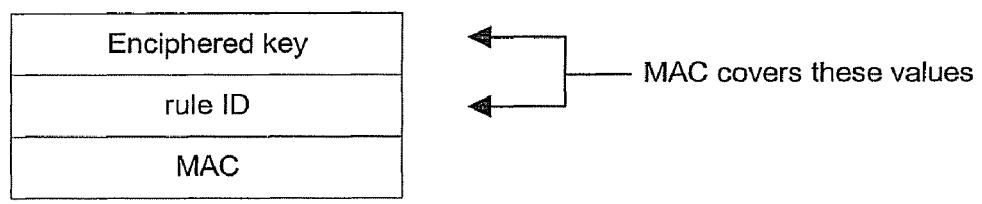
FIG. 2 is a block diagram depicting a conceptual view of the RKX key structure according to an embodiment of the present invention.

FIG. 2 shows a conceptual view of the RKX key structure, which is also known as an RKX token. The detailed structure for this key token will vary for different implementations. The RKX key is enciphered with a confounder, in a manner similar to that described previously for the MAC key The format of the RKX is shown in table 14.

TABLE 14

| RKX ( | |
|---|---|
| return_code | Output |
| rule_array_count | Input |
| rule_array | Input |
| trusted_block_length | Input |
| trusted_block | Input |
| certificate_length | Input |
| certificate | Input |
| certificate_parms_length | Input |
| certificate_parms | Input |
| transport_key_length | Input |
| transport_key | Input |
| rule_id_length | Input |
| rule_id | Input |
| Importer_key_length | Input |
| Importer_key | Input |
| source_key_length | Input |
| source_key | Input |
| asym_encrypted_key_length | Input/Output |
| asym_encrypted_key | Output |
| sym_encrypted_key_length | Input/Output |
| sym_encrypted_key | Output |
| extra_data_length | Input |
| extra_data | Input |
| key_check_parameters_length | Input |
| key_check_parameters | Input |
| key_check_length | Input/Output |
| key_check_value ) | Output |

The description of the RKX parameters are as follows:

rule_array_count The number of 8-character elements in the rule_array parameter. The value must be zero for this function.

rule_array An array of 8-character keywords. Each keyword is left-justified and padded on the right with space characters. There are no rule array keywords for this function.

trusted_block_length This parameter contains the length of the trusted_block parameter, in bytes.

trusted_block This is a string containing the trusted block used to validate the public key certificate, and defining the rules for key generation and export. The trusted block must be in internal form.

certificate_length This is the length of the string in parameter certificate, in bytes. If the certificate length is zero, the function will not attempt to use or validate the certificate in any way. This means that output parameter asym_encrypted_key_length will contain zero, and parameter asym_encrypted_key will not be changed from its content on input.

certificate This is a string containing a public-key certificate. The certificate must contain the public key modulus and exponent in binary form, as well as a digital signature. The signature will be verified using the root public key that is in the trusted block supplied in the trusted_block parameter.

certificate_parms_length This is the length of the certificate parameters in certificate_parms, in bytes. The length must be of sufficient size to accommodate the locations and lengths of values within the certificate in parameter certificate if a certificate is supplied, as indicated by certificate_length having a value greater than zero. If certificate_length is zero, then both certificate_parms_length and certificate_parms are ignored.

certificate_parms This string is a structure identifying the location and length of values within the certificate in parameter certificate. It is the responsibility of the calling application program to provide these values. This method gives the greatest flexibility to support different certificate formats.

The information in this structure includes a value indicating the hash algorithm used to compute the digital signature. It could also include information on the public-key algorithm used for the signature.

transport_key_length The length of the string in the transport_key parameter, in bytes.

transport_key The transport key is a Key Encrypting Key (KEK) that is used to encrypt a key generated or exported by the RKX function when that key is in the form of a CCA token. For the generation operation, the transport key encrypts the newly generated key. For the export operation, it encrypts the exported version of the key received in parameter source_key.

rule_id_length This parameter contains the length of the string in parameter rule_id, in bytes.

rule_id The trusted block can contain multiple rules, each of which is identified by a rule ID value. This parameter contains a string specifying the rule in the trusted block that will be used to control key generate, not export.

Importer_key_length This parameter contains the length of the string in parameter importer_key, in bytes. It must be zero if the operation is generate, not export.

Importer_key This parameter contains a RKX token, a CCA key token or key label for the IMPORTER key-encrypting key that is used to decipher the key passed in parameter source_key. It is unused if RKX is being used to generate a key, and not to export one.

source_key_length This parameter contains the length of the string in parameter source_key, in bytes. It must be zero if the operation is generate, not export. Note that this is the length of the entire structure passed in parameter source_key, not the length of the key itself inside that structure.

source_key This parameter contains a key to be exported. It must be empty (source_key_length=0) if the operation is generate. The key can be either an operational key in a form understood by the cryptographic device, or an RKX key structure.

asym_encrypted_key_length On input, this parameter contains the length of the application program's buffer provided with parameter asym_encrypted_key. On output, that value is replaced with the length of the key returned in that parameter.

asym_encrypted_key This parameter is the buffer RKX uses to return a generated or exported key that is encrypted under the public (asymmetric) key passed in parameter certificate. An error will be returned if the caller's buffer is too small to hold the value that would be returned.

sym_encrypted_key_length On input, this parameter contains the length of the application program's buffer provided with parameter sym_encrypted_key. On output, that value is replaced with the length of the key returned in that parameter.

sym_encrypted_key This parameter is the buffer RKX uses to return a generated or exported key. This key may be either an RKX token or a CCA token that is encrypted under the key-encrypting key passed in parameter transport_key. An error will be returned if the caller's buffer is too small to hold the value that would be returned.

extra_data_length This parameter contains the length of the string passed in parameter extra_data, in bytes.

extra_data This parameter is optional, and is used to pass extra data that can be used as part of the OAEP key wrapping process. It is only applicable when the output format for the RSA-encrypted key returned in asym_encrypted_key is RSA OAEP. Note that this format is specified as part of the rule in the trusted block.

key_check_parameters_length This parameter contains the length of the key check parameters that are provided as input in parameter key_check_parameters. It must be zero if no parameters are used by the key check algorithm specified in the rule.

key_check_parameters This parameter contains parameters that are required to calculate a key check value, which will be returned in parameter key_check_value. The parameters that are required will depend on the key check algorithm that is specified, and most algorithms will not require any parameters at all.

key_check_length On input, this parameter contains the length of the application program's buffer provided with parameter key_check_value. On output, that value is replaced with the length of the key check value that the function writes to the key_check_value buffer.

key_check_value This parameter is the buffer RKX uses to return a key check value that it calculates on the generated or exported key. Values in the rule specified with parameter rule_id can specify a key check algorithm that should be used to calculate this output value.

It should be noted that the RKX rule could contain a source key label template, which is matched against the key label for the source_key parameter if that key is specified using a label. Since the host CCA software replaces a label with the actual key token read from the key storage file, the label must be passed to the cryptographic module in another way. The host CCA API software for the RKX function accomplishes this. If the application program passes the source_key parameter as a key label, the RKX API code includes that label in the request parameter block that is sent to the cryptographic module. In this way, the device receives both the key token itself, and the key label that can be matched against the template in the rule.

The generate and export operations both begin with the following steps:
1. Validate all input parameters, including the trusted block structure. Abort with an error if any are invalid.
2. Verify that the Active flag in the trusted block is set to True. If not, this trusted block is not yet ready for use and must be rejected with an error.
3. If the trusted block contains expiration/activation dates AND the date checking flag in the block indicates the dates should be validated by the cryptographic module, verify that the current device internal clock shows a date that is less than or equal to the expiration date contained in the trusted block, and is greater than or equal to the activation date.
4. Verify that the trusted block is in internal form. Exit with an error if not.
5. Extract the encrypted MAC key from the trusted block and recover its cleartext value by decrypting with a fixed variant of the device master key.
6. Use the MAC key to verify the MAC on the trusted block contents. Exit with an error if the MAC fails to verify.
7. If parameter certificate_length is not zero, use the public key in the trusted block to verify the digital signature embedded in that certificate. The necessary certificate objects are located with information from the certificate_parms parameter. If the signature does not verify, exit with an error.
8. Locate the rule in the trusted block with an ID equal to the value in parameter rule_id. If a matching rule cannot be found in the block, abort with an error. If the rule is found, validate the contents of the rule. Each element of the rule must be a valid element, and the value associated with each rule element must be valid.

The generate and export operations have different processing beyond these common steps. That processing follows these steps, at a high level.

The generate operation comprises the following steps:
1. Verify that no parameters or rule elements referring to a source key are present, since there is no source key with the generate operation.
   Verify that parameters source_key_length and importer_key_length are zero
2. If the rule contains a transport key rule ID reference, then do the following.
   Verify that the transport_key parameter contains an RKX token.
   Verify that the rule ID in the transport_key parameter is equal to the transport key rule ID reference in the rule being used.
3. Verify that the generated key length in the rule is less than or equal to the length of the output key variant in the rule.
4. If the output is specified to be a CCA key token, verify that the length of the transport key variant in the rule is greater than or equal to the length of the key received in the transport_key parameter.
5. Generate a random value for the output key. Call this value K. The length of K must be equal to the output key length contained in the rule. Ensure that key K is not a DES weak or semi-weak key.
6. If the output key format is to be a CCA token, recover the clear value of the transport key received in the transport_key parameter. The format is determined by examining the version number field of the key token. If this key is in an RKX token, this step includes verifying the MAC that is part of the token.
7. If the output key format is to be a CCA token and the rule contains a transport key variant, XOR that variant with the clear transport key value recovered in the previous step.
8. If the rule specifies a key check algorithm, calculate the key check value according to the specified algorithm.
9. XOR the output key variant from the rule into the randomly-generated key K from above. Adjust the resulting key to have valid DES key parity.
10. Encrypt the key from step 9, in the mode specified in the output key format element of the rule.
    If the format is a CCA key token, encrypt using the transport key from step 6.
    If the format is an RKX token, this will include building the token with the encrypted key and the ID of the rule being used to generate it, and calculating the MAC over these two values. The key is then encrypted using a variant of the trusted block MAC key.
    Verify that the length of the resulting encrypted key structure is less than or equal to the value in parameter sym_encrypted_key_length. If it is, copy the key token to the buffer indicated in parameter sym_encrypted_key, and set parameter sym_encrypted_key_length to the length of this token.
11. If a public key certificate was provided to the RKX function in parameter certificate, and if the rule specifies that an asymmetric-encrypted output key should be produced, then encrypt the key from step 9 using the public key from the certificate. The form can be either PKCS1.2 or RSA OAEP (Note that other formats may be used without altering the intent of the invention). Verify that the length of the resulting encrypted key is less than or equal to the value in parameter asym_encrypted_key_length. If it is, copy the encrypted key to the buffer indicated in parameter asym_encrypted_key, and set parameter asym_encrypted_key_length to the length of this token.
12. If the rule contains a key check algorithm specifier, calculate the key check value according to the specified algorithm. For some algorithms, this may involve use of input parameters contained in key_check_parameters. Verify that the caller's output buffer size, indicated by parameter key_check_length, is large enough to hold the calculated key check value. If so, copy the value to that buffer and put the length of the key check value in parameter key_check_length.

The export operation comprises the following steps:
1. If the rule contains a transport key rule ID reference, then do the following.
   Verify that the transport_key parameter contains an RKX token.
   Verify that the rule ID in the transport_key parameter is equal to the transport key rule ID reference in the rule being used.
2. Verify that the length of the transport key variant in the rule is greater than or equal to the length of the key received in the transport_key parameter.
3. Verify that parameter importer_key_length is 64 (Verify this length is 64 only when the source key is a CCA token. If the source key is an RKX token, the importer_key_length and the importer_key parameters are ignored.), the length of a CCA key token.
4. If the source key parameter is a CCA token, recover the clear value of the source key received in the source_key parameter by decrypting it with the key passed in parameter importer_key_identifier. If the source key is in an RKX token, the recovery step includes verifying the MAC that is part of the token, then decrypting the key with the MAC key stored in the trusted block. The format is determined by examining the version field in the key token. Call this recovered key K.
5. Verify that the length of K is between the minimum and maximum export key length values contained in the rule. Also verify that this is the less than or equal to the length of the output key variant in the rule.
6. Recover the clear value of the transport key received in the transport_key parameter. The format of the key is determined by examining the key token. If this key is in an RKX token, the recovery step includes verifying the MAC that is part of the token.
7. If the rule contains a transport key variant, XOR that variant with the clear transport key value recovered in the previous step.
8. If the rule specifies a key check algorithm, calculate the key check value according to the specified algorithm.
9. If the rule contains an output key variant, XOR that variant into the cleartext source key K from above. Adjust the resulting key to have valid DES key parity.
10. Encrypt the key from step 9, using the mode specified in the output key format element of the rule.
    If the format is an RKX token, the key from step 9 is encrypted using a variant of the trusted block MAC Key. The RKX token is built using the encrypted key and the ID of the rule used to export it, and calculating the MAC over the RKX token from offset 0 up to but not including the MAC value field of the RKX token.
    If the format is a CCA key token, encrypt using the transport key from step 6, or from step 7, if the transport key variant was applied.
    Verify that the length of the resulting key token is less than or equal to the value in parameter sym_encrypted_key_length. If it is, copy the key token to the buffer indicated in parameter sym_encrypted_key, and set parameter sym_encrypted_key_length to the length of this token.
11. If a public key certificate was provided to the RKX function in parameter certificate, and if the rule specifies that an asymmetric-encrypted output key should be produced, then encrypt the key from step 9 using the public key from the certificate. The form will can be PKCS1.2 or RSA OAEP (Note that other formats may be used without altering the intent of the invention). Verify that the length of the resulting encrypted key is less than or equal to the value in parameter asym_encrypted_key_length. If it is, copy the encrypted key to the buffer indicated in parameter asym_encrypted_key, and set parameter asym_encrypted_key_length to the length of this token.
12. If the rule contains a key check algorithm specifier, calculate the key check value according to the specified algorithm. For some algorithms, this may involve use of input parameters contained in key_check_parameters. Verify that the caller's output buffer size, indicated by parameter key_check_length, is large enough to hold the calculated key check value. If so, copy the value to that buffer and put the length of the key check value in parameter key_check_length.

Additional API functions must be provided in order to have a workable system. Many cryptographic systems will already have functions that could be enhanced to provide the specific operations described below.

The Trusted Block Import function is used to import trusted blocks, which are created in external form, but must be in internal form when used.
For the purpose of importing a trusted block, the parameters will be as follows:
source_key will contain the trusted block in external form, as produced by the Trusted_Block_Create function.
transport_key will contain the KEK that was used in Trusted_Block_Create to protect the trusted block MAC key.
target_key will receive the internal form of the trusted block, in which the MAC key is enciphered under the proper variant of the device master key instead of the KEK.

The Trusted Block Import function operates as follows:
1. Parse the trusted block from parameter source_key to obtain the enciphered MAC key and the MAC.
2. Recover the cleartext version of the MAC key that is in the trusted block, by decrypting it with the proper variant of the transport key from parameter transport_key.
3. Compute the MAC over the trusted block using the key recovered in step 2. Compare the computed MAC to the MAC value parsed from the trusted block in step 1. If they are not equal, exit with an error.
4. Verify that the Active flag is set to True in the trusted block. If not, exit with an error.
5. Encipher the MAC key recovered in step 2, using the proper variant of the device master key. Encipher the key in CBC mode with an IV of binary zeroes. Insert the enciphered MAC key in the trusted block, replacing the one in the input block, which was enciphered with the transport key.
6. Copy the device master key KVP into the protection information section of the trusted block.
7. Return the updated trusted block structure to the caller.

A digital signature verification function (DSV) must be able to verify digital signatures using public keys that are contained in trusted blocks. The DSV could do this with any trusted block, regardless of whether the block also contains rules to govern its use when generating or exporting keys with the RKX function.

The parameters will be as follows:
public_key will contain the public key to be used in verifying the signature. This can be a trusted block, but if the DSV function is implemented to be general in nature it may also be possible for this to be a public key in other forms.
hash will contain the hash of the message string to be verified.
signature will contain the digital signature that is to be verified.

The DSV function will operate as follows:
1. Parse the trusted block from parameter public_key to obtain the public key value.
2. Decrypt the signature value and extract the hash from the decrypted result.
3. Compare the hash parameter with the hash recovered in step 2. If the two are equal, indicate that the signature was verified. If not, indicate that the signature was not verified.

The reencipher Trusted Block function is used when the Trusted blocks are in internal form and use the device master key to encrypt the embedded MAC key. When the master key is changed, the Reencipher Trusted Block function must be able to reencipher this under the new master key so that the trusted blocks are still usable.
The parameters will be as follows:
trusted_block will contain the trusted block that is to be reenciphered.
The reencipher Trusted Block function will operate as follows.
1. Verify that the trusted block is in internal form. Abort with an error if it is not.
2. Decrypt the MAC key in the trusted block using the proper variant of the old device master key.
3. Encipher the MAC key using the proper variant of the new device master key, and insert this value into the trusted block, replacing the version that was enciphered under the old master key.
4. Insert the KVP for the new master key into the trusted block.

In a first preferred embodiment of the Remote Key Loading design, the Trusted Block create function will be described further with the creation of the Trusted Block under dual control. The Trusted Block is a data structure that typically contains an RSA public key and optional information (rules) to control export of other keys associated with the devices that use the public key. This structure is protected by an ISO-16609 CBC mode TDES Message Authentication Code (MAC). The trusted block will contain the rules that will be used to generate or export DES keys. The trusted block could also serve as a trusted public key container, and in this case the public key in the trusted block can be used in digital signature verification services. The first step in preparing a trusted block is to call the trusted block create routine.

The trusted block create (TBC) routine or service has three primary inputs: the input block, transport key and a keyword. The input block contains all the fields of a trusted block token but will be updated by this service to contain a valid MAC and MAC key. The transport key is the key encrypting key that is used to wrap or protect the trusted block. There are two valid keywords: INACTIVE and ACTIVATE. The keywords are options, which will direct the specific processing of the routine.

The first step in the Trusted Block creation is to call the TBC service specifying the INACTIVE keyword. This service call will produce an inactive, external trusted block token. The trusted block is fully formed and protected with a MAC at this point but, it is not usable by any other service. A second person with different authorization can then perform the second step. The result of step one is input to the second call to the trusted block create service along with the transport key and the ACTIVATE rule keyword. This call produces an external, active, trusted block token. The trusted block is now usable in other services. After activation, another service is called to put the trusted block into internal format. The public key import verb performs this operation. The next two tables will describe the application programmer's interfaces (API) for the trusted block create (TBC) and public key import (PKI) services. The charts that follow will describe the processing flow of each service.

The API outlined in Table 15 for the TBC service highlights the major input and output fields used by the preferred embodiment for this verb. The first column contains the API parameter name. The second column indicates whether the parameter is an input to or an output from the service. The third column indicates whether the item is an integer or a string.

TABLE 15

| | | |
|---|---|---|
| rule_array_count | Input | Integer |
| rule_array | Input | String |
| input_block_length | Input | Integer |
| input_block_identifier | Input | String |
| transport_key_identifier | Input | String |
| trusted_block_length | In/Output | Integer |
| trusted_block_identifer | Output | String |

The parameters are as follows:

rule_array_count The rule_array_count parameter is a pointer to a string variable containing the number of elements in the rule_array variable. The value must be one.

rule_array The rule_array parameter is a pointer to a string variable containing an array of keywords. The keywords are eight bytes in length, must be left-justified and padded on the right with space characters. The rule_array keywords are shown in table 16.

TABLE 16

| Keyword (Operation) | Meaning |
|---|---|
| INACTIVE | Create the trusted block, but in inactive form. The MAC key is randomly generated, encrypted with the transport key, and inserted into the block. The Active flag is set to False (0), and the MAC is calculated over the block and inserted in the appropriate field. The resulting block is fully formed and protected, but it is not usable in any other services. |
| ACTIVATE | Use of this keyword makes the trusted block usable in other services. The Active flag is set to True (1), and the MAC is calculated over the block and inserted in the appropriate field. The resulting block is fully formed and protected. | input_block_length The input_block_length parameter is a pointer to an integer variable containing the number of bytes of data in the input_block_identifier parameter.

input_block_identifier The input_block_identifier parameter is a pointer to a string variable containing a trusted block label or complete trusted block token, which will be updated by the verb and returned in parameter trusted_block_identifier. The length of the input_block_identifier string is indicated by parameter input_block_length. Its content is dependent on the rule array keywords supplied to the verb.

When the keyword INACTIVE is given, the block is complete but typically does not have the MAC protection. If the MAC protection is present due to recycling of an existing trusted block, then the MAC key and MAC value will be overlaid by the new MAC key and MAC value. The input_block_identifier includes all fields of the trusted block token, but the MAC key and MAC will be filled in by the verb. The Active flag will be set to False (0) in the block returned in trusted_block_identifier.

When the keyword ACTIVATE is given, the block is complete, including the MAC protection which is validated during execution of the verb. The Active flag must be in the False (0) state on input. On output, the block will be returned in trusted_block_identifier provided the identifier is a token. The Active flag will have been changed to the True (1) state, and the MAC value recalculated using the same MAC key. If the trusted_block_identifier is a label, the updated block will be written to a key storage repository such as a disk or other means.

transport_key_identifier The transport_key_identifier parameter is a pointer to a string variable containing a key label or key token, which has special usage restrictions, that is used to protect the trusted block. The usage restrictions are indicated by the presence of an IMP-PKA control vector in the transport key token.

trusted_block_length The trusted_block_length parameter is a pointer to an integer variable containing the number of bytes of data in the trusted_block_identifier parameter. If the trusted block length is not a multiple of 8 bytes, the code handling this API will pad the trusted block with zero bytes up to the next multiple of 8 bytes so that an ISO-16609 CBC mode triple DES MAC can be performed successfully on the trusted block within the adapter.

trusted_block_identifier The trusted_block_identifier parameter is a pointer to a string variable containing a trusted block label or trusted block token for the trusted block constructed by this API. On input, its length in parameter trusted_block_length, contains the size of the buffer. On output, the trusted_block_length parameter is updated with the actual byte length of the trusted block written to the buffer if the trusted_block_identifier is a token. The trusted block consists of the data supplied in parameter input_block_identifier, but with the MAC protection and Active flag updated according to the rule array keyword that is provided.

If the trusted_block_identifier is a label identifying a key record, the returned trusted block token will be written to a key storage repository such as a disk or other means.

The API outlined in table 17 for the Trusted Block Import function highlights the major input and output fields used by the preferred embodiment. The first column contains the API parameter name. The second column indicates whether the parameter is an input to or an output from the service. The third column indicates whether the item is an integer or a string.

TABLE 17

| | | |
|---|---|---|
| rule_array_count | Input | Integer |
| rule_array | Input | String |
| Source_key_token_length | Input | Integer |
| Source_key_token | Input | String |
| transport_key_identifier | Input | String |
| target_key_identifier_length | In/Output | Integer |
| target_key_identifier | In/Output | String | rule_array_count The rule_array_count parameter is a pointer to an integer variable containing the number of elements in the rule_array variable. The value must be zero for this verb.

rule_array The rule_array parameter is a pointer to a string variable containing an array of keywords. The keywords are eight bytes in length, and must be left-justified and padded on the right with space characters. The rule_array parameter is not presently used in this service, but must be specified.

source_key_token_length The source_key_token_length parameter is a pointer to an integer variable containing the number of bytes of data in the source_key_token variable. If the source_key_token parameter is an external Trusted Block key token which is not a multiple of 8 bytes, the code handling this API will pad the trusted block with zero bytes up to the next multiple of 8 bytes so that an ISO-16609 CBC mode triple DES MAC can be performed successfully on the trusted block within the adapter.

source_key_token The source_key_token parameter is a pointer to a string variable containing the trusted block in external form as produced by the Trusted Block Create (CSNDTBC) verb with the ACTIVATE keyword. This API will be used to encipher the MAC key within the trusted block under a fixed variant of the PKA master key instead of the transport key-encrypting key.

The transport_key_identifier must contain a tranport KEK with special usage controls in this case.

transport_key_identifier The transport_key_identifier parameter is a pointer to a string variable containing either a key-encrypting-key token, a key label of a key-encrypting-key token, or a null key-token.

If the source key token is a trusted block, then this key must be a KEK with special usage controls. The usage restrictions are indicated by the presence of an IMP-PKA control vector in the transport key token. It will be used to decrypt the MAC key contained within the trusted Block in the source_key_token.

target_key_identifier_length The target_key_identifier_length parameter is a pointer to an integer variable containing the number of bytes of data in the target_key_identifier variable.

On output, and if the size is of sufficient length, the variable is updated with the actual length of the target_key_identifier variable.

target_key_identifier The target_key_identifier parameter is a pointer to a string variable containing either a key label identifying a key record that is stored in a key storage repository such as a disk or other means; or is other information that will be overwritten with the imported key, such as a trusted block whose MAC key is now enciphered under the PKA master key.

The flowcharts (FIGS. 3A, 3B, 4A, 4B, 5A and 5B) outline the key steps required to create a trusted block under dual control and transform it into an operational entity.

Figure 3A:
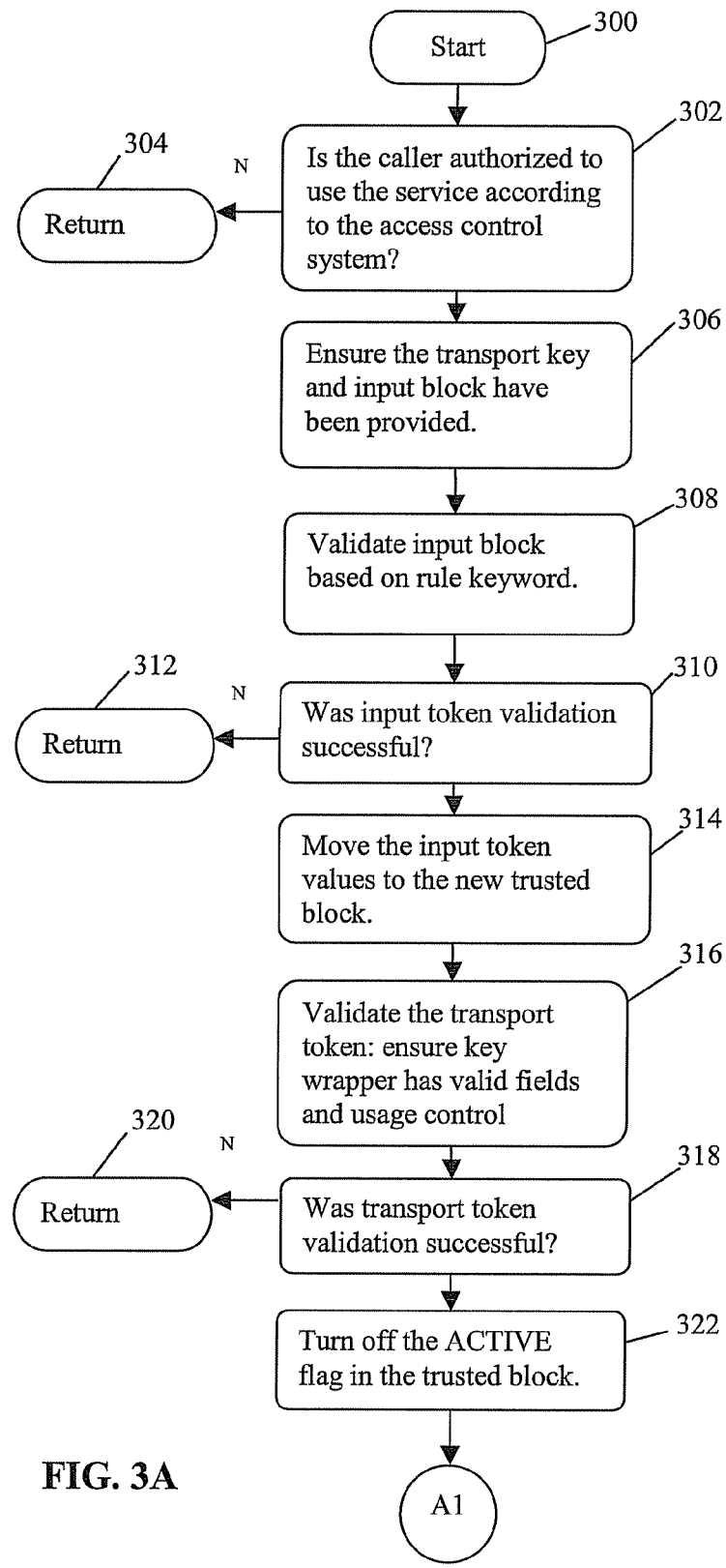
FIGS. 3A and 3B are flow charts depicting the creation of the inactive, external trusted block according to an embodiment of the present invention.
Figure 3B:
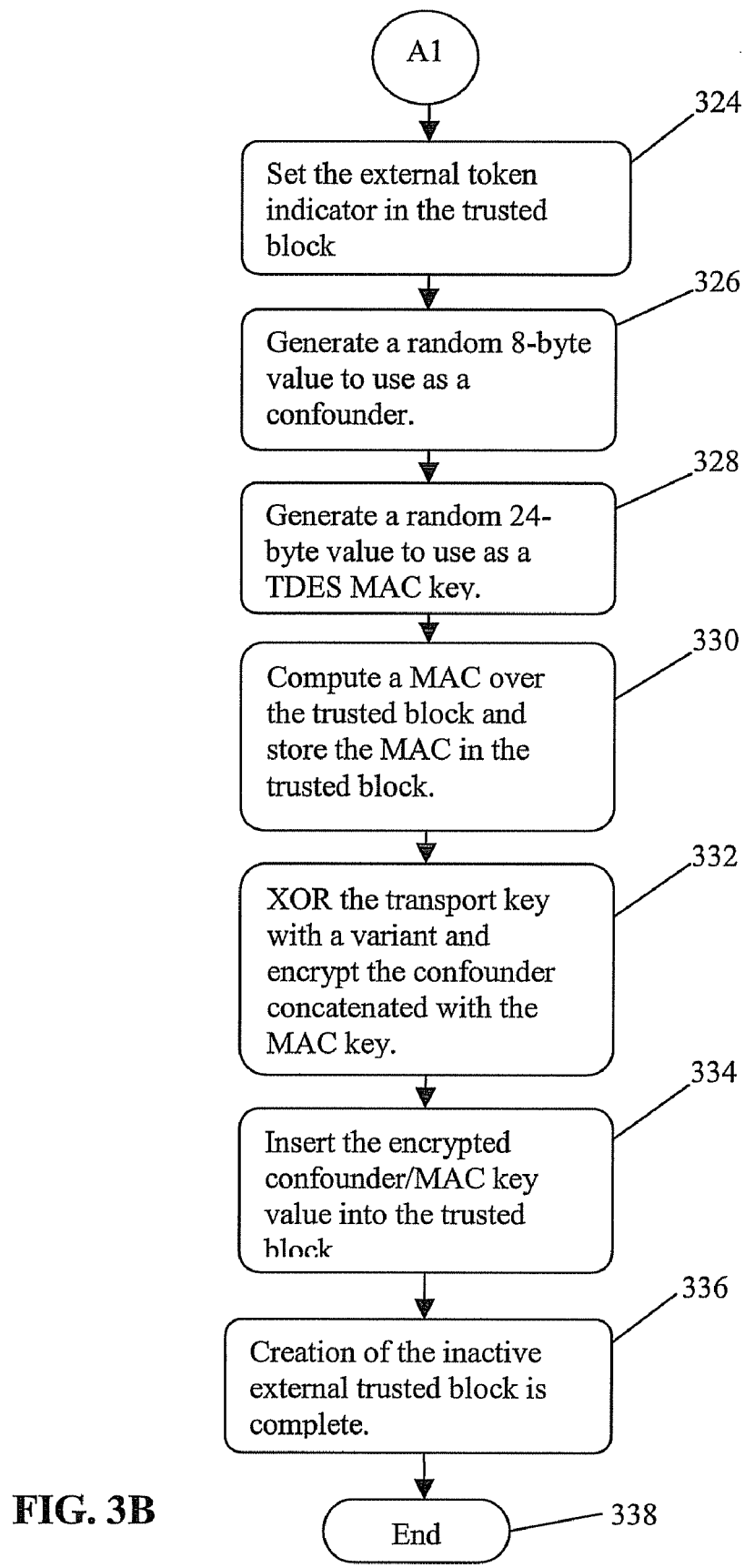

Step 1 (FIGS. 3A and 3B) of the creation of the Trusted Block is as follows (Creation of the Inactive, External Trusted Block starting at 300 in FIG. 3A):

1. The first thing that must be done is to validate that the caller of the service has authority to call the service with the INACTIVE keyword (302). This is critical to ensure that an unauthorized party is not trying to perform the first step in creating a trusted block. If the credentials of the caller cannot be verified against the authorization criteria, the caller will not be allowed to perform the step, an error will be posted and the process terminated (304).
2. Before beginning, verify that the necessary inputs have been provided by the caller (306).
3. The input block must be validated (308). The validation includes verifying that there are no extra sections, the token internal or external indicator is set, and the fields have valid lengths and values. These are the requirements for the input block when the INACTIVE keyword is specified.
4. If the validation was not successful an error indicating the nature of the problem should be returned to the caller (310, 312).
5. Start building the trusted block (314). The input block forms the foundation for the trusted block that is being created. Copy the important fields into the trusted block structure.
6. The transport key token must be validated (316). The token itself is a wrapper for the key material. The token also contains key usage information. It must be ensured that the key wrapper has valid fields and usage control information. The usage control information must be a special key encrypting key that can be used in trusted block creation operations. The usage restrictions are indicated by the presence of an IMP-PKA control vector in the transport key token.
7. If the token structure itself fails consistency checking or the wrong type of key usage information is present in the token, it must be rejected and an appropriate error posted (318, 320).
8. The active flag in the trusted block must be set to the inactive state (322). The active flag in the trusted block indicates whether it can be used in other services or whether it is only eligible to be used in the second step of the trusted block creation process. By setting the flag to inactive, the trusted block is then typically used in the second step of the trusted block creation process; however, it may be reused in the first step of the creation process.
9. The trusted blocks are always in the external state during the creation phase. Since the trusted block will contain a MAC key that is encrypted under a fixed variant of an IMP-PKA key encrypting key, it is necessary to ensure that the indicator is set to external (324).
10. The generation of random confounder whose length is equal to the symmetric algorithm is required (326). The confounder will be prepended to the MAC key later in the process.
11. Generation of a 24-byte random value, which will be used as a TDES MAC key, is required (328). The key will be used to create the MAC over the trusted block.
12. Compute an ISO-16609 CBC mode TDES MAC over the trusted block and store the MAC in the appropriate field of the trusted block (330). The MAC value protects both the trusted block's integrity as well as its authenticity. It allows the detection of any changes to the trusted block's contents.
13. The transport key will be used to encrypt the MAC key concatenated with the confounder. The transport key should be exclusive or'ed with a variant, which is a value the same size as the key which will change the key's value (332). CBC mode encryption should be used with an initialization vector of binary zeros. Those skilled in security understand what CBC mode encryption is and how initialization vectors are used.
14. Store the encrypted confounder/MAC key value in the appropriate place in the trusted block (334).
15. Creation of the external, inactive trusted block has been completed (336, 338). The newly formed trusted block and its length could now be returned to the caller.

Figure 4A:
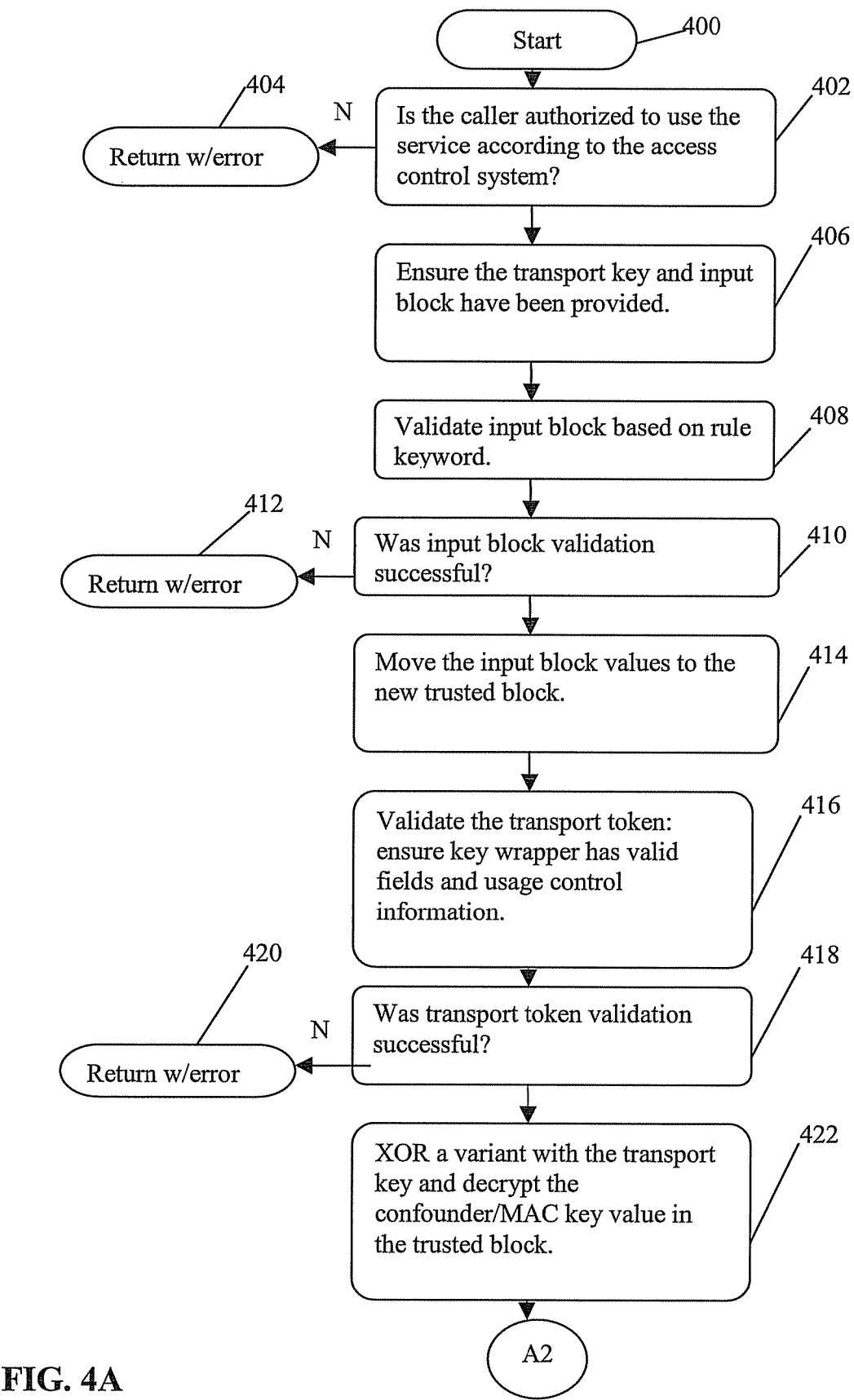
FIGS. 4A and 4B are flow charts depicting the creation of the active, external trusted block according to an embodiment of the present invention.
Figure 4B:
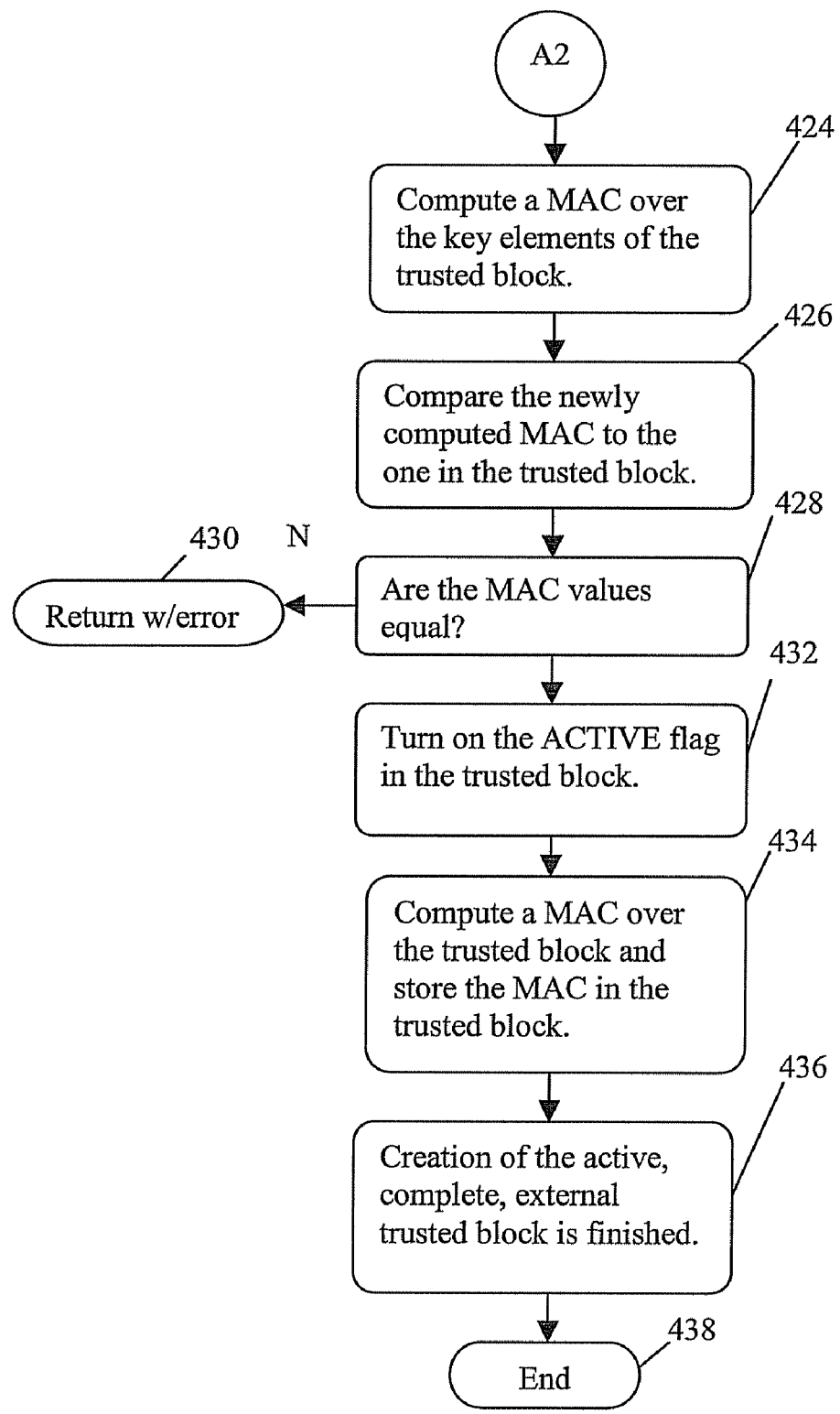

Step 2 (FIGS. 4A and 4B) of the creation of the Trusted Block is as follows (Creation of the Active, External Trusted Block starting at 400 in FIG. 4A and center on authorization, validation, and initialization):

1. The first thing that must be done is to validate that the caller of the service has authority to call the service with the ACTIVATE keyword (402). This is critical to ensure that an unauthorized party is not trying to perform the second step in creating a trusted block. If the credentials of the caller cannot be verified against the authorization criteria, the caller will not be allowed to perform the step, an error will be posted and the process terminated (404).
2. Before beginning, verify that the necessary inputs have been provided by the caller (406).
3. The input block must be validated (408). This time it must contain an INACTIVE external trusted block. Validation includes verifying that there are no extra sections, the token external indicator is set, the active flag is disabled, and fields within the block have valid lengths and values. These criteria must be met when the ACTIVATE keyword has been specified.
4. If the validation was not successful an error indicating the nature of the problem should be returned to the caller (410, 412).
5. Continue building the trusted block. The input block contains the trusted block that was created in the first creation step. Copy the important fields into the trusted block structure (414).
6. The transport key token must be validated (416). The token itself is a wrapper for the key material. The token also contains key usage information. We must ensure that the key wrapper has valid fields and usage control information. The usage control information must be a special key encrypting key that can be used in trusted block creation operations. The usage restrictions are indicated by the presence of an IMP-PKA control vector in the transport key token.
7. If the token structure itself fails consistency checking or the wrong type of key usage information is present in the token, it must be rejected and an appropriate error posted (418, 420).
8. Now we must recover the confounder and MAC key that are stored in the trusted block. In the previous creation step, the MAC key and confounder were encrypted with the transport key exclusive or'ed with a variant. Once again this transport key must be exclusive or'ed with a variant but this time used to decrypt the confounder/MAC key value in the trusted block (422).
9. The MAC key must now be used to create an ISO-16609 CBC mode TDES MAC over the trusted block (424).
10. The MAC value computed in step 24 must be compared with the MAC value that is stored in the trusted block (426).
11. If the MAC values to not successfully compare, the trusted block has been tampered with or the caller provided the wrong transport key. If a verification failure occurs an error code will be returned to the caller (428, 430).
12. If the verification of the trusted block was successful, the Active flag in the trusted block can now be set to the active state (432).
13. A MAC is once again computed over the trusted block and it is inserted into the appropriate place in the trusted block (434). This MAC value will be different than the one previously stored in the trusted block because the Active flag has now been set.
14. The creation of the active external trusted block is complete (436, 438). It can now be used by other services.

Figure 5A:
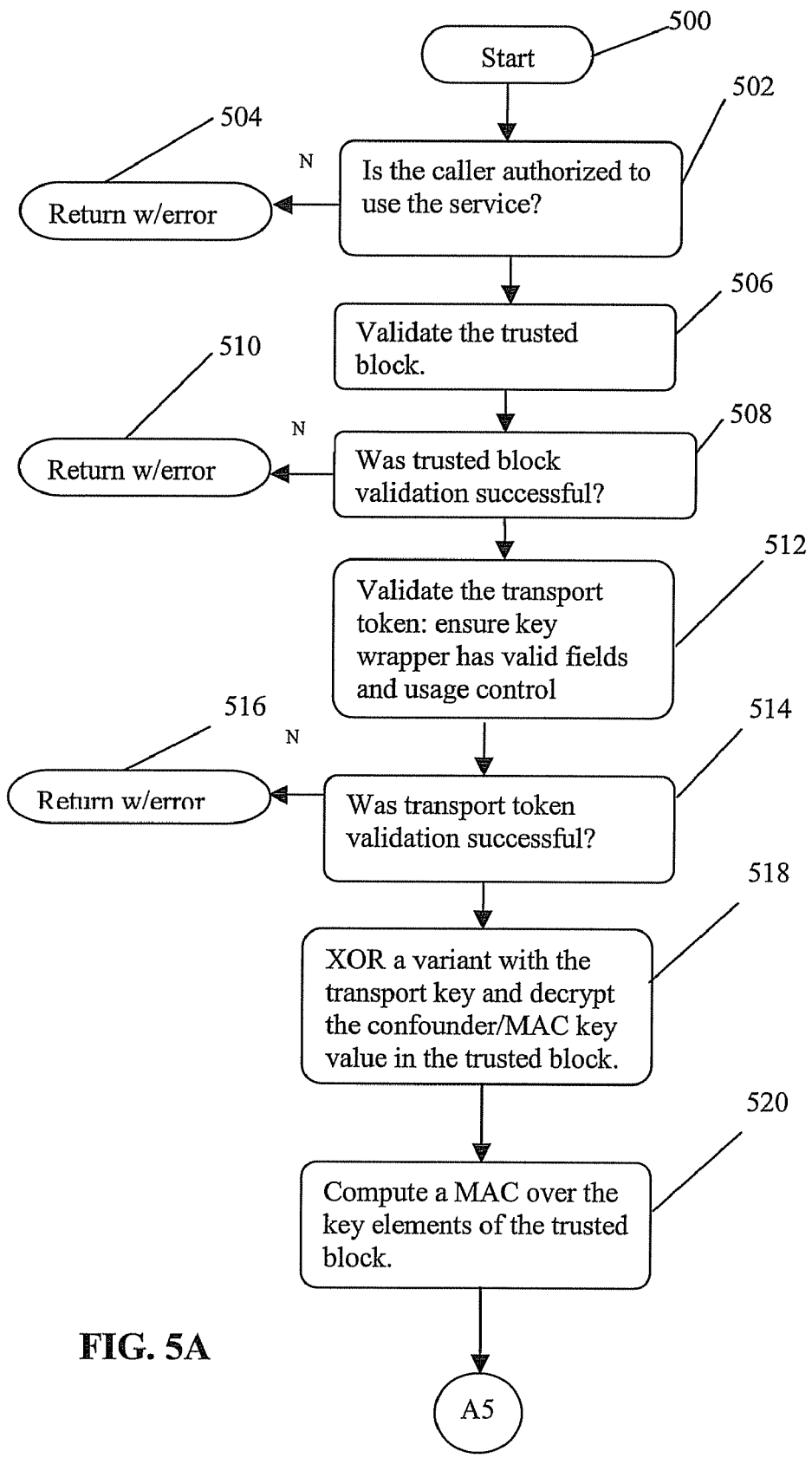
FIGS. 5A and 5B are flow charts depicting the conversion of the active, external trusted block to internal trusted block format according to an embodiment of the present invention.
Figure 5B:
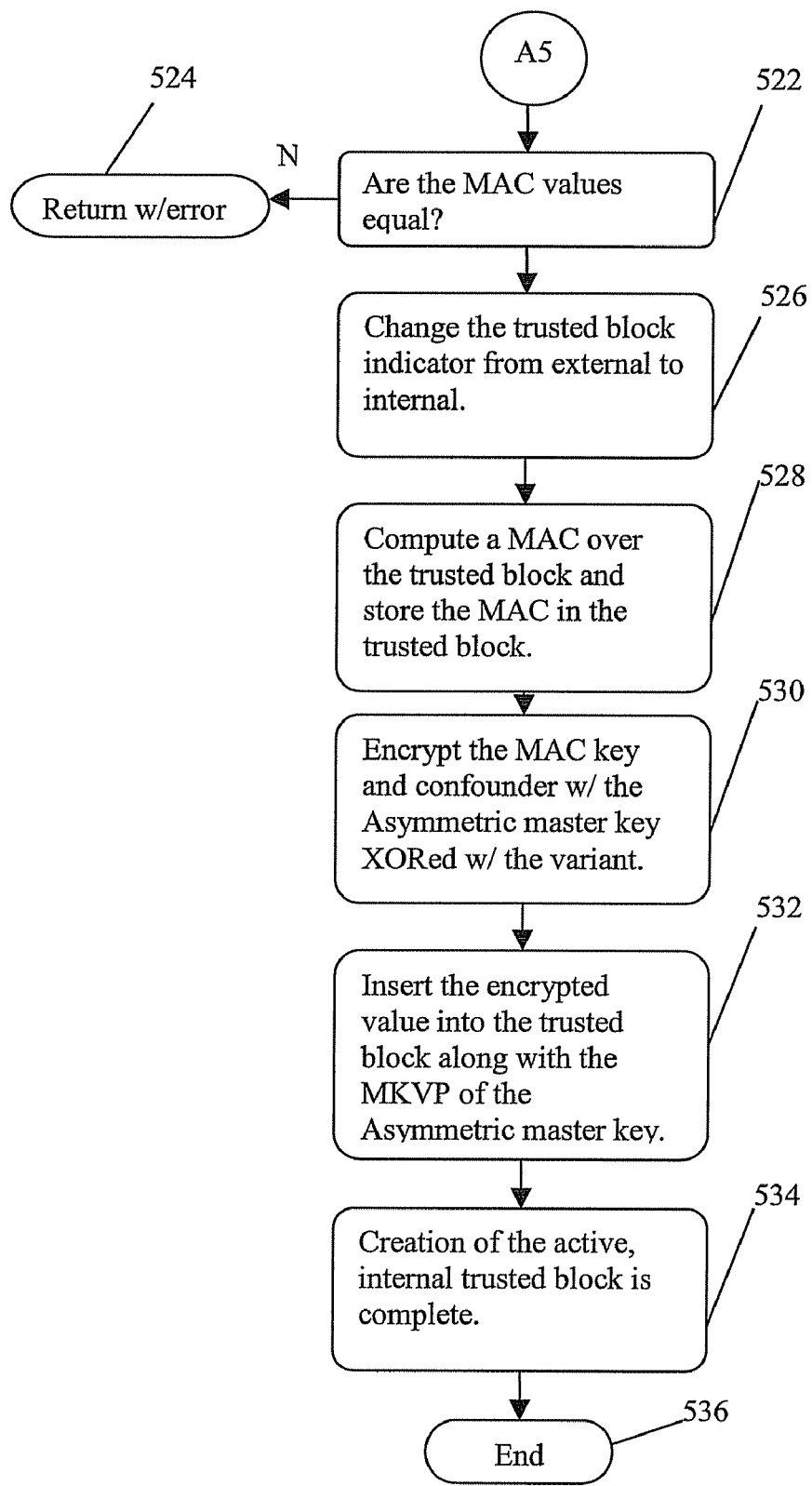

Step 3 (FIGS. 5A and 5B) of the creation of the Trusted Block is as follows (Convert the Active, External Trusted Block to Internal Trusted Block Format starting at 500 in FIG. 5A—The public key import service (PKI) implements the Trusted Block Import function and is used to convert the trusted block form external format to internal format. When the trusted block is in internal format it is considered operational and can be used on the local system):

1. The first thing that must be done is to validate that the caller of the service has authority to import a trusted block (502). As with creation of the trusted block authorization is required to use the trusted block in other services even if the trusted block is in the active state. If the credentials of the caller cannot be verified against the authorization criteria, the caller will not be allowed to perform the step, an error will be posted and the process terminated (504).
2. The trusted block must be validated (506). The trusted block must be external and in the active state. Validation includes verifying that there are no extra sections, the token external indicator is set, the active flag is enabled, and fields within the block have valid lengths and values.
3. If the validation was not successful an error indicating the nature of the problem should be returned to the caller (508, 510).
4. The transport key token must be validated. The token itself is a wrapper for the key material. The token also contains key usage information. We must ensure that the key wrapper has valid fields and usage control information (512). The usage control information must indicate that this is a special key encrypting key that can be used in operations on trusted blocks. The usage restrictions are indicated by the presence of an IMP-PKA control vector in the transport key token.
5. If the token structure itself fails consistency checking or the wrong type of key usage information is present in the token, it must be rejected and an appropriate error posted (514, 516).
6. The next step is to decrypt the confounder/MAC key value that is in the trusted block. The transport key is exclusive or'ed with a variant and the decryption operation is performed (518).
7. The MAC key must now be used to create a MAC over the trusted block. The MAC is an ISO-16609 CBC mode TDES MAC (520).
8. The MAC value computed in step 520 must be compared with the MAC value that is stored in the trusted block (522). If the MAC values to not successfully compare, the trusted block has been tampered with or the caller provided the wrong transport key. If a verification failure occurs an error code will be returned to the caller (524).
9. Change the trusted block token identifier from external to internal (526).
10. An ISO-16609 CBC mode TDES MAC is once again computed over the trusted block and it is inserted into the appropriate place in the trusted block (528). This MAC value will be different than the one previously stored in the trusted block because the trusted block token identifier has been changed to internal.
11. Making the trusted block internal and ready for local use means that the MAC key and confounder must be encrypted under a fixed variant of the asymmetric master key. The asymmetric master key is exclusive or'ed with a variant and the encryption operation is performed (530).

12. Insert the encrypted MAC key and confounder into the appropriate location in the trusted block. Associated with the asymmetric master key is a master key verification pattern or MKVP (532). The MKVP is a cryptographically-computed hash of a key's cleartext value which can be used to verify that the correct key value is used, without disclosing any information about any bits in the key itself. The MVKP is also inserted into the trusted block.

13. This completes the conversion of an external active trusted block token to an internal active trusted block token (534, 536). The token can now be used by other services for local operations.

A preferred embodiment of the present invention utilizes functions that use the trusted block to perform cryptographic operations. These functions include:

The Remote Key Export (RKX) function that is used to generate or export a key under control of a trusted block.

The Digital Signature Verify (DSV) function that is used to verify an RSA digital signature using the public key carried in a trusted block.

The Remote Key Loading method of a preferred embodiment of the present invention involves encipherment of a newly generated or preexisting key under a key encrypting key and optionally, under a public key. A group of services in the preferred embodiment accomplish the Remote Key Loading. The service directly responsible for the remote key loading methodology is known as the Remote Key Export (RKX) service. The Trusted Block Create (TBC) service creates a "trusted block" containing not only the rules governing how the Remote Key Export service is to operate, but also containing a trusted root public key used to verify the digital signature in a certificate which in turn contains a public key that is used ultimately for the encipherment of the newly generated or preexisting key.

Additional contents of the trusted block of a preferred embodiment of the present invention include a Message Authentication Code (MAC) key and MAC value. A MAC value is computed over the entire content of the trusted block except for the encrypted MAC key field, MAC value field, and master key verification pattern field of the trusted block. The trusted block is created in external form, meaning that the MAC key used to create the trusted block's MAC value is enciphered under a key encrypting key. Prior to use by the Remote Key Export service, the trusted block must be converted to internal form, meaning that the MAC key contained in the trusted block must be changed from being enciphered under a key encrypting key to being enciphered under a variant of the PKA (or asymmetric) master key. This trusted block conversion from external form to internal form is accomplished via the Public Key Import (PKI) service. In the preferred embodiment, the PKI service is used to implement the Trusted Block Import Function.

Using the Remote Key Loading methodology of a preferred embodiment of the present invention, a key can be enciphered under one of two possible schemes by the RKX service resulting in asymmetric encrypted output, symmetric encrypted output, or both. (1) Using the RKX service, a key may be enciphered under a public key located in an input parameter certificate. The certificate will contain a digital signature, which must be verified with a root public key located in the trusted block input parameter. The output will be placed into the asymmetric encrypted key output parameter. (2) Using the RKX service, a key may be enciphered under a DES key located in the transport key input parameter. The output will be placed into the symmetric encrypted key output parameter.

The key that is output by the RKX service may be randomly generated within the adapter. When this is the case, the output will include a symmetric encrypted key and an optional asymmetric encrypted key. Symmetric encrypted output key format for this randomly generated key is always the RKX token format, encrypted under a variant of the MAC key. Asymmetric encrypted output key format may be either RSA OAEP or PKCS1.2 format according to the rule section in the trusted block whose rule ID matches the rule ID input parameter. The public key contained in the input certificate parameter is used to encrypt the generated key.

The RKX service will generate a random number key whose length is defined by the rule section in the trusted block that was selected by the rule ID input parameter. The output produced will consist of a symmetric encrypted external RKX token and optionally, an asymmetric encrypted key enciphered under the public key contained in the certificate input parameter. In the preferred embodiment, the output of this generate routine will never be an external CCA token. In order to create an output external CCA token from random number key generation, the RKX service may be invoked twice; once to generate the RKX token, and subsequently to use the newly generated RKX token as an input parameter source key identifier in a call to the RKX service. In this subsequent call, a rule ID may be provided to the RKX service that selects a rule different from the first rule ID used to generate the RKX token, and which defines the "export" of the source key (e.g. an RKX token) to an external CCA token.

The key that is to be exported by the RKX service is not limited to being a source key in the form of an RKX token. Additionally, the key to be exported may be an encrypted form of a preexisting key that is supplied to the RKX service as a source key parameter in the form of an internal CCA DES token or an external CCA DES token. Four basic steps are involved in exporting a preexisting key by the RKX service.

In step one, the encrypted source key input parameter is converted into cleartext form. If the source key is an RKX key token—the key must be decrypted under a variant of the MAC key that is located within the trusted block input parameter, provided that the rule ID in the RKX token matches the rule ID contained in the Rule Section of the trusted block. The MAC key in the trusted block must be decrypted under a fixed variant of the PKA master key before being used to decrypt the key in the RKX token. If the source key is an external CCA key token, the key must be decrypted under the importer key encrypting key input parameter, which first must be decrypted by the DES master key. If the source key is an internal CCA key token—the key must be decrypted under the DES master key.

In step two, the source key now in cleartext form is optionally checked and modified. If the source key input parameter was either an internal CCA key token or external CCA key token, the source key's control vector (CV) is checked for acceptability for key exportation. The trusted block's CV Mask determines which source key CV bits should be checked. The trusted block's CV Limit Template contains the required values for those source key CV bits that are to be checked. The CV mask and template are located in the trusted block's rule section that is selectable by the rule ID input parameter to the RKX service. If the source key input parameter is a key label for an internal CCA key token that is contained in key storage, verify that the label is valid by comparing it to the Source Key Label Template in the trusted block's rule section that is selectable by the rule ID input parameter to the RKX service. For the modification phase of step two, optionally apply the output key variant to the cleartext source key using an exclusive-or technique if specified to do so in the trusted block's rule section that is selected by the rule ID input parameter.

Step three is performed when the symmetric encrypted output key is determined to be in a CCA token format. In step three, the transport key is prepared for use on the modified source key from the previous step. The transport key may be either an RKX key token or an internal DES key token. Preparation of the transport key involves the optional application of a transport key variant and the optional application of a control vector. Both the transport key variant and control vector are found in the trusted block's rule section that is selected by the rule ID input parameter. If the transport key is contained in an RKX key token, the key must be decrypted under a fixed variant of the MAC key located within the trusted block input parameter, provided that the rule ID in the RKX token matches the rule ID contained in the rule section of the trusted block. The MAC key in the trusted block must be decrypted by the fixed variant of the PKA master key before being used to decrypt the transport key in the RKX token. If the transport key is an internal CCA token, the key must be decrypted under the DES master key.

A variant may be applied to cleartext transport key using an exclusive-or technique, if there is a transport key variant specified in the trusted block's rule section that is selected by the rule ID input parameter. Next, if there is a CV specified in the trusted block's rule section that is selected by the rule ID input parameter, the CV is applied to the transport key. If both the variant and the CV are applied to the cleartext transport key, then the variant is applied first, then the CV.

In step four, the rule section within the trusted block may indicate that the symmetric encrypted output should be either an RKX key token encrypted under a fixed variant of the MAC key, or a CCA key token. If the former is true, the transport key is ignored. If the latter is true, optionally encipher the modified (or unmodified) source key from step two with the modified (or unmodified) transport key from step three according to the rule section in the trusted block whose rule ID matches the rule ID input parameter. If a CV was applied to the transport key in step three, then the output symmetric encrypted CCA token will also contain this same CV. Likewise if no CV was applied to the transport key, then the output encrypted CCA token will contain a zero CV.

For asymmetric encrypted output, encipher the key under the public key contained in the certificate input parameter to the RKX service. This encipherment will follow the format option according to the rule section in the trusted block whose rule ID matches the rule ID input parameter. The output option may be either RSA OAEP or PKS1.2 format.

The trusted block is a data structure that contains several sections. In a preferred embodiment there are 5 types of sections (Please note that those skilled in the art of data structure design may find a multitude of ways to design a trusted block): the Trusted Public Key section, the Trusted Block Information section, the Trusted Block Label section, the Application Defined Data section, and the Rule section. Some of these sections have subsections that will be defined in the paragraphs that follow. Preceding these main sections is a Trusted Block Key Token Header that contains a token identifier, a header structure version number, and length of the entire trusted block structure.

The Trusted Public Key section is optional and if present, only one such section is allowed in the trusted block. This section includes the public key itself including a set of flags to indicate how the public key is to be used. The section includes a section identifier to indicate "Trusted RSA Public Key", a structure version number, length of the section, RSA public key exponent length in bytes, RSA public key modulus length in bits, RSA public key modulus length is bytes, RSA public key exponent, RSA public key modulus, and the flags. The flags field will indicate whether the public key contained in this section can be used in digital signature operations only, key management operations only, or both digital signature and key management operations.

The Trusted Block Information section is required and only one such section is allowed in the trusted block. The section includes a section identifier to indicate "Trusted Block Information", a structure version number, length of the section, a flags field, one required subsection, and one optional subsection. The flags indicate whether the trusted block is in an inactive state or active state. The trusted block is created in the inactive state and placed into the active state under dual control by the TBC service. A required subsection, named the Protection Information subsection, includes: the encrypted form of an 8 byte confounder and 24 byte MAC key, an 8 byte ISO-16609 CBC mode TDES MAC value, and a 16 byte PKA master key verification pattern computed using MDC4. The PKA master key verification pattern is set to zero if the trusted block is external, meaning that the confounder and MAC key are encrypted under a key encrypting key. The PKA master key verification pattern is nonzero when the trusted block is internal, meaning that the confounder and MAC key are encrypted under a fixed variant of the PKA (or asymmetric) master key. An optional subsection, named the Activation and Expiration Date subsection, includes: flags indicating whether or not the activation and expiration dates should be checked by the 4764 cryptographic adapter; activation date in year, month, day of month format; and expiration date in year, month, day of month format.

The Trusted Block Label section is optional and if present, only one such section is allowed in the trusted block. The section includes a section identifier to indicate "Trusted Block Label", a structure version number, length of the section, and a label. In the preferred embodiment, the length of the label is 64 bytes. Host software can use this label to perform access control checking on the trusted block.

The Application Defined Data section is optional and if present, only one such section is allowed in the trusted block. The section includes a section identifier to indicate "Application Defined Data", a structure version number, length of the section, length of the application data, and the application defined data. In a preferred embodiment, the length of the application data may be between 0 and 400 bytes inclusive. The application-defined data may be used to hold a public key certificate for the trusted public key contained in the Trusted Public Key section.

The Rule section is optional. Zero, one, or more than one, rule sections may be present in the trusted block. When a trusted block has zero rule sections, typically the Trusted Public Key section is present and the trusted block is used for digital signature verification purposes only. At least one rule section is required when generating a new random key, or exporting a preexisting key with the RKX service. Multiple rule sections are typically used whenever the RKX service is used to create a key hierarchy. The basic concept is that RKX tokens generated by the RKX service may be used as a source key and/or transport key in subsequent RKX service invocations using the same trusted block.

Each Rule section contains a section identifier, a structure version number, length of the section, rule ID, export/generate flag, generated key length, key check algorithm identifier, symmetric encrypted output key format flag, asymmetric encrypted output key format flag, and up to five possible subsections. The subsections include: an optional Transport Key Variant subsection, an optional Transport Key Rule Reference subsection, a Common Export Key Parameters subsection that is required only if the RKX service is to export a preexisting key to an output format that is either an RKX token format or CCA token format, a Source Key Rule Reference subsection that is required only if the RKX service is exporting a source key that is in RKX token format, and an optional Export Key CCA Token Parameters subsection. The latter subsection is used when the source key input parameter is a CCA token. The key type of the CCA token can be filtered by using the CV limit mask and template contained in the subsection.

The rule ID field of the Rule section is a value identifying the rule. The rule ID for one rule section must differ in value from rule IDs used in other rule sections within the trusted block. A particular Rule section is chosen for use by the RKX service according to the value of the Rule ID input parameter of the RKX service.

The export/generate flag in the Rule section indicates whether a new key should be generated or a preexisting key located in the source key input parameter, should be exported. If a key is to be generated, the "generated key length" field will indicate the length in bytes of the generated key.

The key check algorithm identifier field may indicate either "no action" in which case no key check value is computed, encrypt an 8-byte block of binary zeroes with the key, or compute the MDC2 hash of the key and return the 16 byte value. For the case when the key check algorithm specifies an encryption of an 8-byte block of binary zeroes, and if the key to be generated or exported is single length, then the key encodes the 8 bytes of zeroes. If the key to be generated or exported is double length, the key triple encodes the 8-byte value as follows: the left half key encodes the 8-byte zero value, this result is decoded by the right key half, and that result is encoded by the left key half. If the key is single length, return the leftmost 3 or 4 bytes of the result of the encryption according to the value of the key check length input parameter as follows: (1) if the key is single length and if the key check length input parameter is set to 3, then 3 bytes will be returned. (2) If the key is single length and if the key check length input parameter is set to a value between 4 and 8 bytes inclusive, 4 bytes will be returned. (3) If the key is longer than single-length, return the entire 8 byte encryption result. Under no circumstances will there be 1, 2, 5, 6, or 7 byte encryption result returned.

The symmetric encrypted output key format flag indicates the output symmetric key formats allowed by the rule section. The output may be either an RKX token encrypted under a variant of the MAC key, or a CCA token encrypted under a transport key. The transport key input parameter to the RKX service may be an RKX token, a CCA token, or a label of a CCA token. A transport key variant contained in the Transport Key Variant subsection and/or a control vector contained in the Common Export Key Parameters subsection may be applied to the transport key. If both are applied, the variant is applied first, and then the control vector.

The asymmetric encrypted output key format flag indicates the output asymmetric key formats allowed by the rule section. Either no asymmetric key should be output, asymmetric output should be in PKCS 1.2 format, or asymmetric output should be in RSA-OAEP format. This latter format can make use of the Extra Data input parameter to the RKX service.

The Rule section's Transport Key Variant subsection is optional. If present, the subsection includes a tag identifier to indicate "Transport Key Variant", length of the subsection, a structure version number, length of the variant, and the variant. The variant is to be exclusive-OR'ed (XOR) into the cleartext transport key. The length of the variant must be greater than or equal to the length of the transport key that is supplied to the RKX service when this rule is used. If the variant is longer than the transport key, it is truncated on the right to the length of the key before it is used. This variant is used if two conditions are satisfied: the length of the variant must be nonzero, and the output symmetric encrypted key format is set to indicate CCA token format. Transport keys are not used for output symmetric encrypted keys that are RKX tokens.

The Rule section's Transport Key Rule Reference subsection is optional but should be present if the transport key input parameter to the RKX service is an RKX token, otherwise the RKX token transport key will not be accepted for use. If present, the subsection includes a tag identifier to indicate "Transport Key Rule Reference", length of the subsection, a structure version number, and the rule ID. The rule ID identifies the rule section that must have been used to create the RKX token transport key.

The Rule section's Common Export Key Parameters subsection is required for a key export request to the RKX service. The subsection includes a tag identifier to indicate "Common Export Key Parameters", length of the subsection, a structure version number, the exported key's minimum length in bytes which also applies to the source key input parameter, the exported key's maximum length in bytes which also applies to the source key input parameter, the output key variant length in bytes, the output key variant, the length of the CV in bytes, and the CV. If the output key variant length is zero, then the output key variant is not used. Otherwise, the output key variant will be exclusive-OR'ed with the cleartext value of the key being exported (or generated). This variant must be at least as long as the longest key that will be exported using the rule, or as long as the key being generated using the rule. If the variant is longer than the key, the leftmost bytes of the variant are used, up to the key length. e.g. if the variant is 24 bytes and the key is 16 bytes, the first 16 bytes of the variant are exclusive-OR'ed with the key and the remaining 8 bytes of the variant are not used. The CV within this subsection, if used, will be exclusive-OR'ed with the transport key.

The rules governing the usage of the control vector (CV) in the Common Export Key Parameters subsection that are defined whenever the symmetric encrypted output key is to be a CCA token format, are as follows:

(1) If the length of the CV in this subsection is zero, and if the source key input parameter is a CCA token, then the source key's CV will be used when encrypting the source key under the transport key. The source key's CV will be preserved in the symmetric encrypted output if the output is to be in the form of a CCA token. If the length of the CV in this subsection is zero, and if the source key input parameter is an RKX token, then no CV will be used.

(2) If the length of the CV in this subsection is nonzero, then it must be greater than or equal to the length of the source key input parameter. The CV length in this subsection may be either single or double length. If the source key is single length, and if the CV length in this subsection is double length, and if the left half of the double length CV in this subsection is nonzero with key form bits set to "single length key", then the right half of this double length CV will be ignored. Note: CCA service CVG (Control Vector Generate) will generate a CV for a single length key by building a CV of double length with the right half of the CV set to binary zeroes. This CV may be placed into this subsection when building the trusted block.

(3) If the CV length in this subsection is double length and the CV is equal to 16 bytes of binary zeroes, then all CV bit definitions are ignored. Furthermore, if the symmetric encrypted output key is in CCA token format, the token will have a flag set to indicate that a CV is present, but the CV value in the output CCA token will contain 16 bytes of binary zeroes. Furthermore, if the source key input parameter is a single length key, the key will not be replicated to a double length key.

(4) If the access control point for "Replicate Key Allowed" is active, and if the source key input parameter contains a single length key in either RKX token or CCA token format, and if the CV in this subsection is double length with both halves nonzero, and if the CV's key form bits do not specify "single length key" and do not specify "guaranteed unique halves", then the key in the source key input parameter is replicated, meaning that both halves of the double length key are identical in value.

(5) If the symmetric encrypted output key format flag is set to indicate that an RKX token will be output by the RKX service, then the CV in this subsection will be ignored since a transport key is not used for output symmetric RKX tokens.

The Rule section's Source Key Rule Reference subsection is optional but must be present if the source key input parameter to the RKX service is an RKX token, otherwise the RKX token source key will not be accepted for use. If present, the subsection includes a tag identifier to indicate "Source Key Rule Reference", length of the subsection, a structure version number, and the rule ID. The rule ID identifies the rule section that must have been used to create the RKX token source key.

The Rule section's Export Key CCA Token Parameters subsection is optional for key export of CCA tokens. If using a CCA token as a source key input parameter, its key type can be "filtered" by using the CV limit mask and template in this subsection. If present, the subsection includes a tag identifier to indicate "Export Key CCA Token Parameters", length of the subsection in bytes, a structure version number, the export key CV limit mask length in bytes, the export key CV limit mask, the export key CV limit template, the source key label template length in bytes, and the source key label template.

If the export key CV limit mask length is zero, then the export key CV limit mask and the export key CV limit template are both nonexistent. The export key CV limit mask and the export key CV limit template work together to restrict the acceptable control vectors for CCA keys to be exported. The CV limit mask indicates which CV bits should be checked. The CV limit template contains the required values for those CV bits that are to be checked. The CV for the key to be exported is first AND'ed with the CV Limit Mask, and then the result is compared with the CV Limit Template. If the two do not match, the request is rejected with an error. The export key CV limit mask length must not be less than the Export Key Minimum Length set in the Common Export Key Parameters subsection. The export key CV limit mask length must be equal in length to the actual length of the source key input parameter to the RKX service, otherwise the RKX service request will be rejected with an error.

The source key label template length in bytes must be set to either 0 or 64. No other values are allowed. If this length is zero and a source key label is present, then the label will not be checked. If this length is 64 and a source key label is not present, an error will be returned by the RKX service. A single asterisk (wildcard) in the source key label template field will not be interpreted to accept the absence of a source key label.

In the preferred embodiment, if the source key label template length is nonzero, the label template is left justified in the source key label template field. The label template must conform to the following rules in the preferred embodiment (note that other methodologies may be employed): The first character cannot be between 0x00-0x1F, nor can it be 0xFF; the first character cannot be numeric, 0x30-0x39; a label is terminated by a space on the right; the only special characters permitted are 0x23 (#), 0x24 ($), 0x40 (@), 0x2E (.), and wildcard 0x2A (*); the wildcard 0x2A (*) is permitted as the first character, the last character, or only character; once a space is encountered, every character to the right up to the 64 byte length must be spaces; only alphanumeric characters are allowed a-z, A-Z, 0-9, the aforementioned four special characters, the wildcard (*), and the space (0x20).

The sequence of services leading up to the RKX service is as follows:

First a trusted block is created under dual control in two parts. An external trusted block is created with all its sections and subsections by one individual having a role and/or profile differing from a second individual's role and/or profile, by using the TBC service with keyword set to INACTIVE. The confounder and MAC key contained in the trusted block's Protection Information subsection under the Information section is encrypted under a variant of the IMP-PKA key encrypting key located in the transport_key_identifier input parameter. The trusted block is termed inactive because its flag in the trusted block Information section is set to "inactive". The second individual having a role and/or profile differing from the first individual uses the TBC service with keyword set to ACTIVATE. The flag in the trusted block information section is set to "activated", making the resulting trusted block "active".

Second, the active trusted block is provided as an input parameter to the PKI service, which in turn converts the trusted block to internal format, by virtue of the fact that the MAC key contained within the trusted block will be encrypted under a fixed variant of the PKA (or asymmetric) master key.

Finally, the internal format of the trusted block is now ready to be used as an input parameter to the RKX service.

The RKX uses a special structure to hold encrypted symmetric keys in a way that binds them to the trusted block, and allows sequences of RKX calls to be bound together as if they were an atomic operation. Table 18 shows a conceptual view of the RKX key structure, which is also known as an RKX key Token.

TABLE 18

| Offset (bytes) | Length (bytes) | Description of RKX token field |
|---|---|---|
| 0 | 1 | Token Type 0x02 (external key token) |
| 1 | 3 | Reserved, must be 0x00.00.00 |
| 4 | 1 | Version Number 0x10 |
| 5 | 1 | Reserved, must be 0x00 |
| 6 | 1 | Flag (reserved, must be 0x00) |
| 7 | 1 | Key length in bytes, including confounder |
| 8 | 32 | Encrypted confounder and key. |
| 40 | 8 | Rule ID for the trusted block rule section that was used to create this RKX token. |
| 48 | 8 | Reserved, must be filled with 0x00 bytes. |
| 56 | 8 | MAC Value - ISO-16609 TDES CBC-mode MAC. The MAC is computed over the 56 bytes starting at offset 0 in this token, and including the encrypted key value and the rule ID using the same MAC key that is used to protect the trusted block itself. |

The confounder begins at offset 8 and the key begins at offset 16. The key field uses 8, 16, or 24 bytes to hold its value. Unused bytes in this field must be set to 0x00. The key is left justified starting at offset 16 in the event that the key is less than 24 bytes in length. The layout of the confounder and key is as follows: confounder (8 bytes), key left (8 bytes), key middle (8 bytes), and key right (8 bytes).

A fixed, randomly derived variant is exclusive-OR'ed with the MAC key located within the trusted block in the Trusted Block Information section before it is used to encipher or decipher the generated or exported confounder and key at offset 8 of the RKX key token above. The random variant has the following hex value:
EB 4B 1D F5 D8 1B 63 8D-5F DE 17 B1 00 27 35 AC-55 BB 05 78 AF DI B8 18
The MAC key within the trusted block, when in internal format, can be recovered by decipherment under the PKA master key. The trusted block is originally created in external form by the TBC service and then converted to internal form by the PKI service (Note that this PKI service implements the Trusted Block Import Function), prior to the RKX call. A fixed, randomly derived variant is exclusive-OR'ed with the PKA master key before it is used to encipher or decipher the MAC key within the trusted block when the trusted block is in internal format. The random variant has the following hex value:
C9 2EBB 35 D2 AA 56 D8-9C 66 E4 12 2B E7 A0 A3-B4 55 FF E4 D7 E7 F6 41

A call to the RKX service can use an RKX token and a trusted block whose rule section references the rule ID that must have been used to create the RKX token. The trusted block rule section's Rule ID can be compared with the RKX token's Rule ID for verification purposes.

In the preferred embodiment, the Rule ID is an 8-byte ASCII character string, with no null terminator. The acceptable characters for the Rule ID are A-Z, a-z, 0-9, - (hyphen), and _ (underscore). If the Rule ID is less than eight characters long, it must be left justified and padded on the right with space characters. Other implementations besides the preferred embodiment may use other characters.

The MAC value at offset 56 guarantees that the key and the rule ID cannot be modified without detection, providing integrity, and binding the rule ID to the key itself. In addition, the MAC will only verify with the same trusted block that created the key, thus binding the key structure to that specific trusted block.

Figure 6:
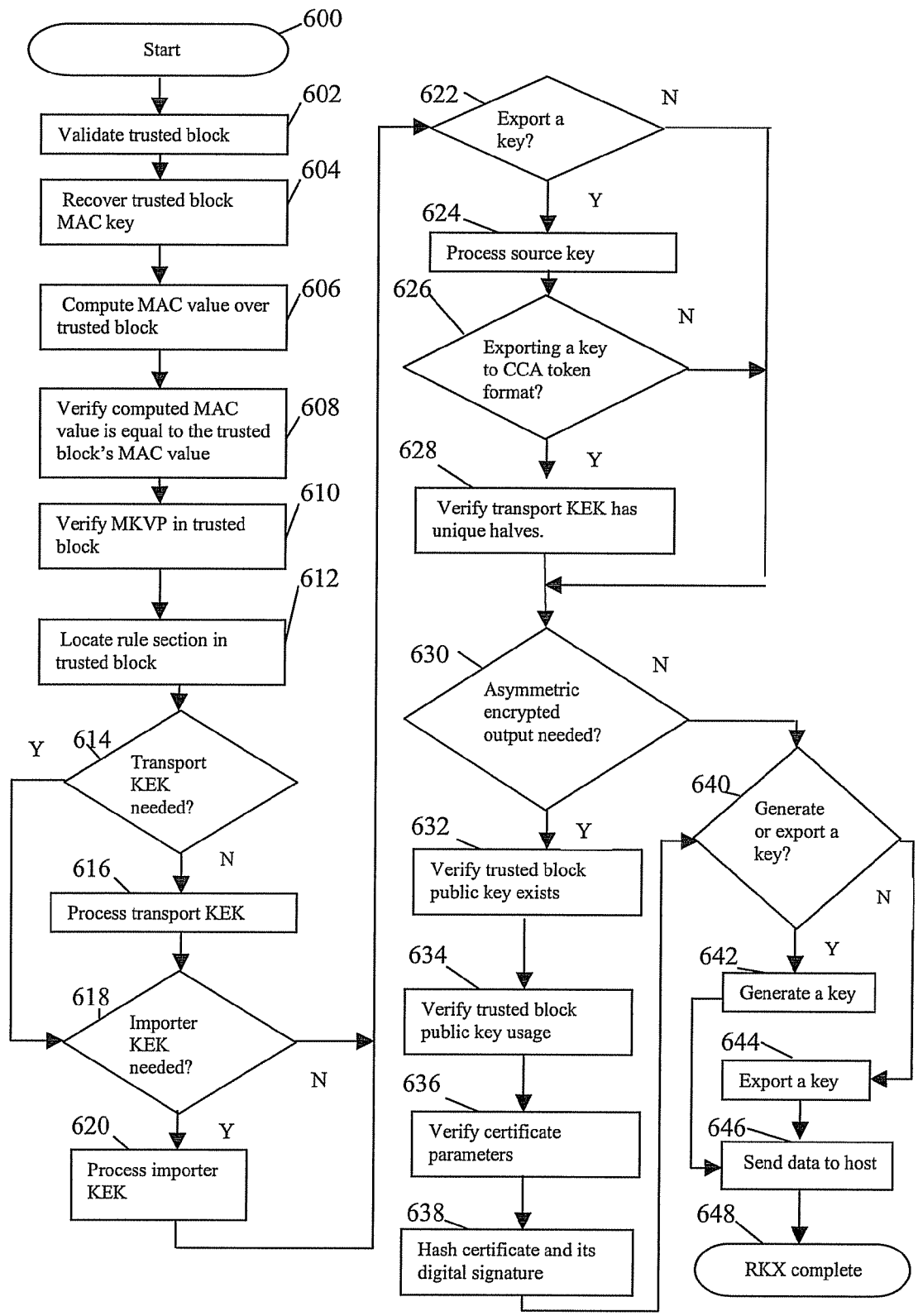
FIG. 6 is a flow chart depicting the steps of the main routine of the Remote Key Export methodology according to an embodiment of the present invention.

FIG. 6 together with table 19 highlight the major steps involved in the Remote Key Export methodology (RKX Service—main( )).

TABLE 19

Figure 7:
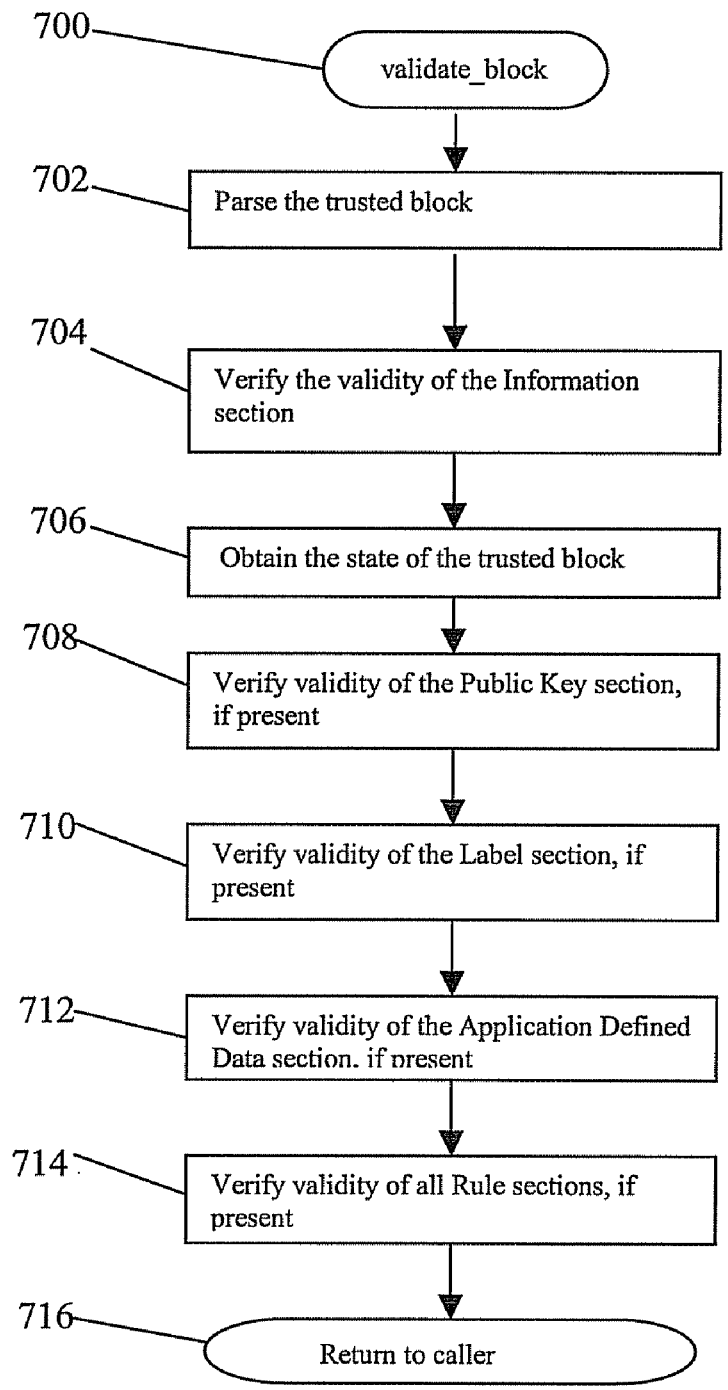
FIG. 7 is a flow chart depicting the steps of a validation routine that verifies the validity of the trusted block according to an embodiment of the present invention.

| Step number and brief summary | Detailed description |
| --- | --- |
| 600, 602 - Validate the trusted block | See FIG. 7 - validate block( ) for details. Verify that all these conditions are met:<br>  A. No unknown sections have been built into the trusted block,<br>  B. The trusted block token identifier is internal,<br>  C. The Active flag is enabled,<br>  D. Fields within the trusted block have valid lengths and valid values.<br>If these conditions are not met, abort operation with an error. |
| 604 - Recover trusted block MAC key | See FIG. 8 - decrypt tb mac key( ) for details.<br>  A. Decrypt the confounder and MAC key located in the Protection Information section of the trusted block under a variant of the PKA Master Key and using an IV of binary zeroes.<br>  B. The variant is the following hexadecimal string where each byte has even parity so that the parity of the XOR result of the PKA master key with the variant is not altered: C9 2E BB 35 D2 AA 56 D8 - 9C 66 E4 12 2B E7 A0 A3 - B4 55 FF E4 D7 E7 F6 41.<br>  C. Decryption is performed using triple DES CBC mode. |
| 606 - Compute MAC value over the trusted block | See FIG. 9 - compute tb mac( ) for details.<br>  A. Copy the trusted block to some temporary_block.<br>  B. Fill in the following Protection Information section fields of the temporary block with binary zeroes: encrypted MAC key, ISO-16609 TDES CBC MAC value, MKVP (master key verification pattern).<br>  C. Compute an ISO-16609 CBC mode TDES MAC over the entire temporary block contents using the recovered TDES MAC key and an IV of binary zeroes. |
| 608 - Computed MAC = stored trusted block MAC? | The computed MAC from step 3 is compared to the MAC value contained in the trusted block Protection Information section.<br>  A. If equal, proceed to step 610,<br>  B. Else, abort operation with an error. |
| 610 - Verify the MKVP in the trusted block | This routine obtains the MDC4 hash of the current PKA master key and compares the result to the MKVP contained in the Protection Information section of the trusted block. If a mismatch occurs, the MDC4 hash of the old PKA master key is obtained and compared to the MKVP contained in the Protection Information section of the trusted block. If a mismatch still occurs, abort the operation with an error. |
| 612 - Locate rule section in trusted block | Locate a Rule section in the trusted block with an ID equal to the value in the input parameter, rule_id. This will be the rule section that is used during the RKX service being requested. If not found, abort operation with an error. |

TABLE 19-continued

| Step number and brief summary | Detailed description |
| --- | --- |
| 614 - Is the transport KEK needed? | If all the following conditions are true, proceed to step 616. Else, proceed to step 618.<br>  A. A transporter KEK was provided in the transport key identifier input parameter, or a transporter KEK key label was provided in the transport key identifier input parameter. In the latter case, retrieval of the transporter KEK from the key storage repository was successful.<br>  B. The rule section in the trusted block selected in step 612 indicates that an export key operation is to take place.<br>  C. The rule section in the trusted block selected in step 612 indicates that the symmetric encrypted key output is to be in CCA token format. |
| 616 - Process transport KEK | See FIG. 10 - process transport key( ) for details.<br>  A. If the transporter KEK is a CCA token, triple decrypt the transporter KEK under the DES master key using the transport KEK's CV.<br>  B. If the transporter key is an RKX token, decrypt the confounder and key contained in the token, under a variant of the MAC key located in the trusted block's Protection Information section.<br>  C. If a transport key variant exists in the trusted block rule section selected in step 612, then XOR the transport key variant with the cleartext transport key. |
| 618 - Is the importer KEK needed? | If the following conditions are true, proceed to step 620. Else, proceed to step 622:<br>  A. An importer KEK was provided in the importer key identifier input parameter, or an importer KEK key label was provided in the importer key identifier input parameter. In the latter case, retrieval of the importer KEK from the key storage repository was successful.<br>  B. The rule section in the trusted block selected in step 612 indicates that an export key operation is to take place. |
| 620 - Process importer KEK | See FIG. 11 - process importer key( ) for details.<br>  A. If the operation is export, verify that the importer key's CV is an IMPORTER type.<br>  B. If the operation in import and the importer key is a CCA token, verify that the importer key's CV matches the Import Key CV mask and template in the Import Key CCA Token Parameters.<br>  C. If the importer key is a CCA token, triple decrypt the importer key under the master key with importer key's CV. |
| 622 - Exporting a key? | If the following conditions are true, proceed to step 624. Else, proceed to step 630:<br>  A. A source key was provided in the source key identifier input parameter, or a source key label was provided in the source key identifier input parameter. In the latter case, retrieval of the source key from the key storage repository was successful.<br>  B. The rule section in the trusted block selected in step 612 indicates that an export key operation is to take place. |
| 624 - Process source key | See FIG. 12 - process source key( ) for details. Process the source key differently according to whether the source key is an RKX token, an internal CCA token, or external CCA token.<br>  A. If the source key is an RKX token, decrypt the confounder and key contained in the token, under a variant of the MAC key located in the trusted block's Protection Information section.<br>  B. If the source key is either an external or internal CCA token, verify the source key's CV against the trusted block's selected rule section's CV mask and template. Verify that the key may be exported. Verify that if the source key was a key label, the trusted block's rule section's key label template allows the source key's label.<br>  C. If the source key is an external CCA token, then decrypt the key contained in the token, under the importer KEK from step 620.<br>  D. If the source key is an internal CCA token, triple decrypt the key under the master key with source key's CV. If the source key is single length, and if key replication is allowed, replicate the single length key to a double length key. |
| 626 - Exporting a key to CCA token format? | If the following conditions are true, proceed to step 628. Else, proceed to step 630:<br>  A. The rule section in the trusted block selected in step 612 indicates that an export key operation is to take place. |

TABLE 19-continued

| Step number and brief summary | Detailed description |
|---|---|
| | B. The rule section in the trusted block selected in step 612 indicates that the symmetric encrypted output format is to be a CCA token format. |
| 628 - Verify transport KEK has unique halves | If the transporter key is an RKX token, double length, with equal halves; or if the transporter key is a CCA token, type EXPORTER, with equal halves, then abort operation with an error. |
| 630 - Asymmetric encrypted output needed? | If the rule section in the trusted block selected in step 612 indicates that an asymmetric encrypted key will be output, then proceed to step 632, otherwise proceed to step 640. |
| 632 - Trusted block public key exists? | When producing asymmetric encrypted key output and if the trusted block does not have a Trusted Public Key section, abort the operation with an error. |
| 634 - Trusted block public key usage correct? | When producing asymmetric encrypted key output, verify that the trusted block's Trusted Public Key section has a public key usage flag consistent with the RKX service. This implies that the key usage flag be set to allow either key management operations only, or both digital signature and key management operations. If the key usage flag is set to allow digital signature operations only, then abort the operation with an error. |
| 636 - Verify input certificate parameters | See FIG. 13 - verifyCertParms( ) for details. This routine verifies the validity of the certificate__parms__length input parameter as well as the lengths contained in the certificate parms table. The lengths in the certificate parms table include modulus length, exponent length, digital signature length, and length of the certificate data hashed to compute the digital signature. The lengths of these parameters contained in the certificate along with their offsets, are used to determine if the parameters overlap, which would indicate an error. |
| 638 - Hash the certificate and verify its signature. | Compute the SHA-1 hash on the certificate input parameter located by adding the offset of the first byte of certificate data to be hashed (the offset being located in the certificate parms input parameter) to the beginning of the certificate input parameter for a length found in the certificate parms input parameter that represents the amount of data to be hashed. Once the hash is obtained, prepend the BER encoded string to hash. Verify certificate signature using the PKCS 1.0/1.1 encryption method.. |
| 640, 642, 644 - Generate or export a key? | Referring to the rule section in the trusted block selected in step 612, determine whether to generate a key or export a key.<br>A. If generating a new key, proceed to FIG. 14 - rkx generate( ).<br>B. If exporting a preexisting key found in the source key identifier input parameter, proceed to FIG. 15 - rkx export( ).<br>Once a key is either generated or exported, or if an error occurred in the process that would prematurely abort the process, a response message is built to send to the host from the cryptographic adapter as described in the next step, step 646. |
| 646 - Send a data packet to the host containing the symmetric encrypted output key, optional asymmetric encrypted output key, and optional key check value. | A. A symmetric encrypted output key will always be returned to the host from the cryptographic adapter from this service.<br>B. An asymmetric encrypted key may or may not be returned based upon the contents of the rule section selected in step 612. For example, if the rule section's Asymmetric Encrypted Output Key Format flag is set to "no asymmetric key", then only a symmetric encrypted key will be returned to the host.<br>C. The key check value may or may not be returned based upon the contents of the rule section selected in step 612. If the rule section's Key Check Algorithm identifier field specifies "Do not compute a key check value", then no key check value will be returned and the key check value length will be set to zero. Otherwise return the key check value from FIG. 17, step 614 (if the RKX service generated a key) or from FIG. 18, step 606 (if the RKX service exported a key). |
| 648 - RKX complete | The service is complete. |

FIG. 7 together with table 20 provide the major steps involved in the routine that verifies the validity of the trusted block for use by the call service (validate_block( )).

TABLE 20

| Step number and brief summary | Detailed description |
| --- | --- |
| | The Validate_block routine (700) verifies that the trusted block is valid for use by the calling service. |
| 702 - Parse the trusted block. | This routine will parse the trusted block; filling in a buffer that holds a table of pointers to structures that hold the counts of each section, the pointers to these sections, and the pointers to each section's required and/or optional subsections. This routine will:<br>  A. Verify that the total size of the trusted block is equal to the sum of the lengths of all sections, then<br>  B. Locate and save the Active flag contained in the Information section.<br>The table of pointers to these structures will be organized in such as way as to easily locate a particular section and subsection within the trusted block, whose sections and subsections may be organized in any order upon creation of the trusted block. |
| 704 - Verify validity of the Information section | This routine will:<br>  A. Verify the existence of the Information section,<br>  B. Verifies that the length of the section is not less than the sum of the lengths of the subsections; namely, the Protection Information section (required to be present) and the Activation and Expiration Date subsection (optionally present),<br>  C. Verifies that there is only one Protection Information subsection,<br>  D. Verifies that the trusted block activation date is valid: month is in the range of 1-12; days are not zero; days not greater than the maximum number of days in the specified month,<br>  E. Verifies that the trusted block expiration date is valid month is in the range of 1-12; days are not zero; days not greater than the maximum number of days in the specified month,<br>  F. Verifies that the activation date is less than or equal to the expiration date.<br>  G. Verifies that the expiration date is not less than or equal to the cryptographic adapter's real time clock data and time. |
| 706 - Obtain the state of the trusted block | This routine verifies that the trusted block token is either internal or external, and active or inactive, based upon both the value of the trusted block's token identifier located in the Trusted Block Key Token Header, and the service that called the validate_block routine. This routine verifies that only the TBC, PKI, DSV, KTC, and RKX services call this routine. Any other service that calls this routine results in an error.<br>  A. If the TBC service calls validate_block with the INACTIVE keyword parameter, the token identifier in the Trusted Block Key Token Header is ignored and the active flag in the Trusted Block Information section is ignored.<br>  B. If the TBC service calls validate_block with the ACTIVATE keyword parameter, the token identifier in the Trusted Block Key Token Header must be an external token and the active flag in the Trusted Block Information section must be in the inactive state.<br>  C. If the RKX service calls validate_block the token identifier in the Trusted Block Key Token Header must be an internal token and the active flag in the Trusted Block Information section must be in the active state.<br>  D. If the PKI service calls validate_block the token identifier in the Trusted Block Key Token Header must be an external token and the active flag in the Trusted Block Information section must be in the active state.<br>  E. If the DSV service calls validate_block, the token identifier in the Trusted Block Key Token Header must be an internal token and the active flag in the Trusted Block Information section must be in the active state.<br>  F. If the KTC service calls validate_block the token identifier in the Trusted Block Key Token Header must be an internal token and the active flag in the Trusted Block Information section must be in the active state. |
| 708 - Verify validity of the Public Key section if present | This routine checks for the presence of Public Key section within the Trusted Block. If the Public Key section is present, the routine:<br>  A. Verifies that the length of this section is greater than or equal to the sum of its constituent parts: section identifier, structure version number, length field, public key exponent |

TABLE 20-continued

| Step number and brief summary | Detailed description |
|---|---|
| | The Validate_block routine (700) verifies that the trusted block is valid for use by the calling service. |
| |     byte length field, public key modulus bit length, public key modulus byte length, public key exponent, public key modulus, and usage flags;<br>B. Verifies that the modulus bytes length is not trivial (i.e. zero length);<br>C. Verifies that the exponent byte length is not trivial (i.e. zero length);<br>D. Verifies that the modulus length in bits is not greater than the modulus length in bytes;<br>E. Verifies that the modulus length in bits does not exceed the maximum value used for encrypting with symmetric RSA keys as set forth by the function control vector resident within the cryptographic adapter;<br>F. Verifies that the modulus length in bits is not less than 512 bits;<br>G. Verifies that the public key usage flags are set to a valid value;<br>H. Verifies that the public key exponent has odd parity. |
| 710 - Verify validity of the Label section if present | This routine verifies that the length of this section is valid and that the label contains valid characters. Wildcard characters are allowed. |
| 712 - Verify validity of the Application Defined Data section if present | This routine verifies that the length of this section is valid. |
| 714 - Verify validity of all Rule sections that are present | This routine checks the validity of all rule sections present in the trusted block. At least one rule section must be present if the RKX service called the validate_block routine.<br>A. Verify that the length of the rule section is greater than or equal to the sum of its constituent parts; defined as the sum of the section identifier, structure version number, length field, rule ID field, flags field, generated key length field, key check algorithm identifier, symmetric encrypted output key format flag, and asymmetric encrypted output key format flag.<br>B. Verify that each rule ID field of each rule section is unique in value, i.e. not equal to another rule ID of another rule section contained in the trusted block.<br>C. Verify that the rule ID is an ASCII string with no NULL terminator, and follows the acceptable character set of A-Z, a-z, hyphen (-), and underscore (_). If the rule ID is less than 8 characters, then the rule ID must be left justified and padded on the right with spaces.<br>D. Verify that the Generated Key Length field is zero if the Flags field indicates that an export operation is to occur; and either 8 (for single length key), 16 (for double length key), or 24 (for a triple length key) if the Flags field indicates that a generate operation is to occur.<br>E. Verify that the Key Check Algorithm field indicates that either: no key check should be done; the key check algorithm will involve encryption of 8 bytes of zeroes with the key being generated or exported; or an MDC2 hash of the generated or exported key will be performed.<br>F. Verify that the Symmetric Encrypted Output Format flag is set to either RKX token format or CCA token format.<br>G. Verify that the Asymmetric Encrypted Output Format is set to either no asymmetric output, PKCS1.2 formatted output, or RSA-OAEP formatted output.<br>H. Verify that the lengths of the subsections in each rule section are valid, and that none of the subsections per given rule section are duplicated.<br>I. Validity checks are tailored to each subsection as follows:<br>J. For a Transport Key Variant subsection, verify that the transport key variant length, if not zero, should be at least as long as a single length key, and verify the transport key variant has even parity.<br>K. For a Transport Key Rule Reference subsection, verify that the transport key rule ID is an ASCII string with no NULL terminator, and follows the acceptable character set of A-Z, a-z, hyphen (-), and underscore (_). If the rule ID is less than 8 characters, then the rule ID must be left justified and padded on the right with spaces.<br>L. For a Common Export Key Parameters subsection, Verify that the Export Key Maximum Length is less |

TABLE 20-continued

| Step number and brief summary | Detailed description |
|---|---|
| | The Validate_block routine (700) verifies that the trusted block is valid for use by the calling service. |
| |     than or equal to the value of the CV Length field if the CV length is not zero with the exception of the following case: If the Export Key Maximum length is 24 bytes, then the CV Length may be equal to 16 bytes if the CV value in this subsection is set to either all binary zeroes, or all binary zeroes with the key-part bit and parity bit turned on.<br>    If the Output Key Variant Length is not zero, verify that the Output Key Variant has even parity, verify that its length is greater than or equal to the Generated Key Length value in the Rule section if a generate operation is to take place, and verify that its length is greater than or equal to the Export Key Maximum Length in this subsection if an export operation is to be performed.<br>    If an export operation is to be performed, verify that the Export Key Minimum Length is not zero, is a multiple of 8 bytes, is not greater than 24 bytes, and is not greater than the Export Key Maximum Length. Furthermore, verify that the Export Key Maximum Length is not zero, is a multiple of 8 bytes, and is not greater than 24 bytes.<br>    If the CV Length is not zero, perform the validity checks on the CV in this subsection such that the CV bits conform to control vector standards as documented in the CCA Basic Services Reference and Guide Appendix C: CCA control-vector definitions and key encryption.<br>M. For a Source Key Rule Reference subsection, verify that the source key rule ID is an ASCII string with no NULL terminator, and follows the acceptable character set of A-Z, a-z, hyphen (-), and underscore (_). If the rule ID is less than 8 characters, then the rule ID must be left justified and padded on the right with spaces.<br>N. For an Export Key CCA Token Parameters subsection, Verify that if the Export Key CV Limit Mask Length is nonzero, then its value is either 8 bytes or 16 bytes. Furthermore, the Export Key CV Limit Mask's length must equal the length of the Export Key CV Limit Template.<br>    Verify that the Source Key Label Template Length is equal to either zero or 64 bytes. If the latter is true, verify that there are no binary zeroes in the Source Key Label Template field.<br>    Verify that the CV Limit Mask Length is equal to the Export Key Maximum Length field in the Common Export key Parameters subsection.<br>    If there are any invalid subsections encountered, abort the operation with an error. |
| 716 - Return to caller | |

Figure 8:
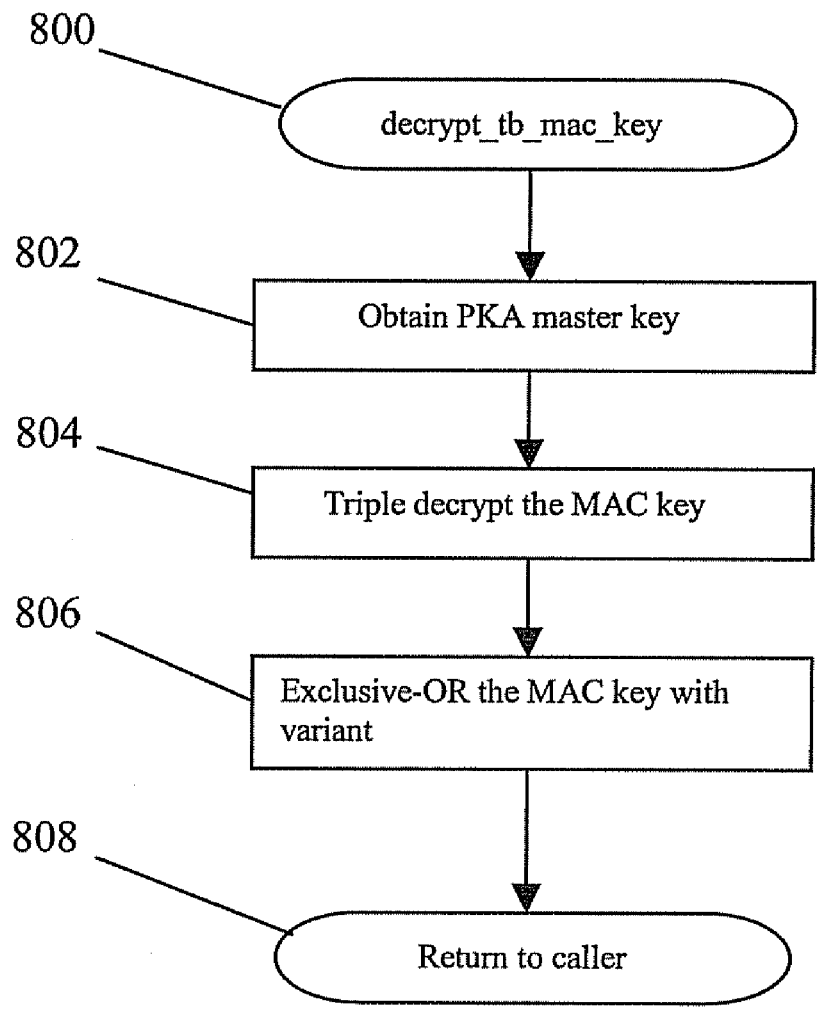
FIG. 8 is a flow chart depicting the routine for the decryption of the trusted block MAC key according to an embodiment of the present invention.

FIG. 8 together with table 21 highlight the major steps involved in the routine that decryptes the MAC key of the trusted block for use by the call service (decrypt_tb_mac_key( )).

TABLE 21

| Step number and brief summary | Detailed description |
|---|---|
| | Decrypt trusted block MAC key 800 with either the old or current PKA master key according to whether the trusted block's MKVP matched the old or current PKA MKVP. A variant will be exclusive-OR'ed with the cleartext PKA master key before the decryption is performed. The decrypted 24-byte MAC key will be exclusive-OR'ed with a variant. |
| 802 - Obtain PKA master key. | This routine obtains the MDC4 hash of the current PKA master key and compares the result to the MKVP contained in the Protection Information section of the trusted block. If a mismatch occurs, the MDC4 hash of the old PKA master key is obtained and compared to the MKVP contained in the Protection Information section of the trusted block. If a mismatch still occurs, abort the operation with an error. |

TABLE 21-continued

| Step number and brief summary | Detailed description |
|---|---|
| | Decrypt trusted block MAC key 800 with either the old or current PKA master key according to whether the trusted block's MKVP matched the old or current PKA MKVP. A variant will be exclusive-OR'ed with the cleartext PKA master key before the decryption is performed. The decrypted 24-byte MAC key will be exclusive-OR'ed with a variant. |
| 804 - Triple decrypt MAC key | The current or old master key, chosen based upon the match found in step 802, is exclusive-OR'ed with the PKA master key variant, defined as 0xC9 2E BB 35 D2 AA 56 D8, 9C 66 E4 12 2B E7 A0 A3 B4 55 FF E4 D7 E7 F6 41. The confounder and MAC key located in the Protection Information of the trusted block is then triple decrypted using the cipher-block chaining mode. |
| 806 - XOR MAC key with variant | The MAC key variant, defined as 0xEB 4B 1D F5 D8 1B 63 8D 5F DE 17 B1 00 27 35 AC 55 BB 05 78 AF DI B8 18, is exclusive-OR'ed with the cleartext MAC key. The confounder, having served its purpose in step 804, is ignored in this step. |
| 808 - Return to caller. | |

Figure 9:
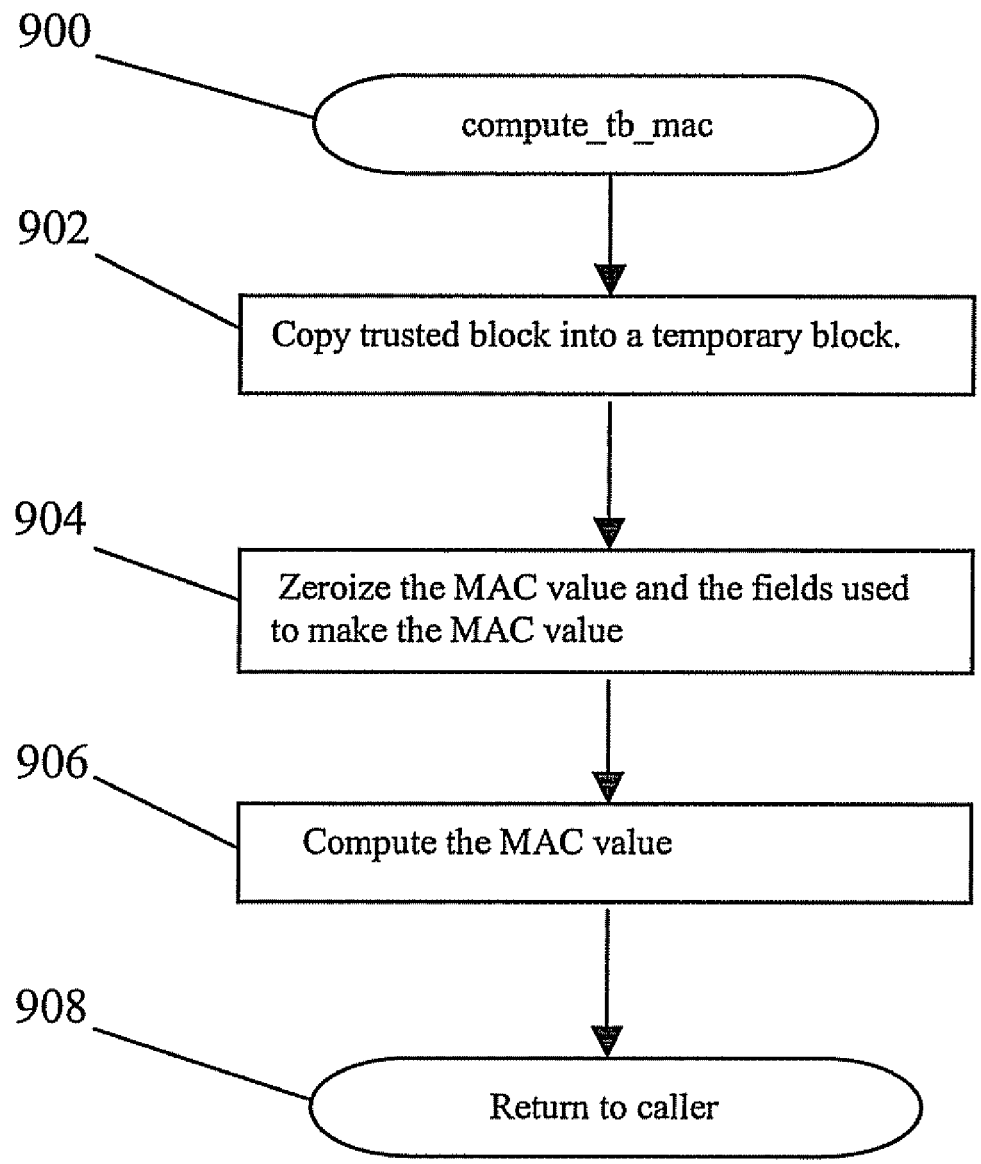
FIG. 9 is a flow chart depicting the routine for computing the MAC over a trusted block according to an embodiment of the present invention.

FIG. 9 together with table 22 provide the major steps involved in the routine that computes a MAC value over a trusted block (compute_tb_mac( )).

TABLE 22

| Step number and brief summary | Detailed description |
|---|---|
| | The compute tb mac routine (900) computes the MAC over a trusted block. |
| 902 - Copy trusted block to a temporary block | Copy trusted block to a temporary block. |
| 904 - Zeroize fields used to make the MAC value and which are parts of the MAC value. | Fill the following temporary block fields with binary zeroes in the Protection Information section of the trusted block: MAC key field that includes the confounder, MAC value field, and MKVP field. |
| 906 - Compute MAC value | Compute ISO-16609 cipher-block chaining mode, triple DES MAC over temporary block using the cleartext MAC key obtained in FIG. 8, step 804. The cleartext MAC key does not have the MAC key variant exclusive-OR'ed to it during this step. |
| 908 - Return to caller. | |

Figure 10:
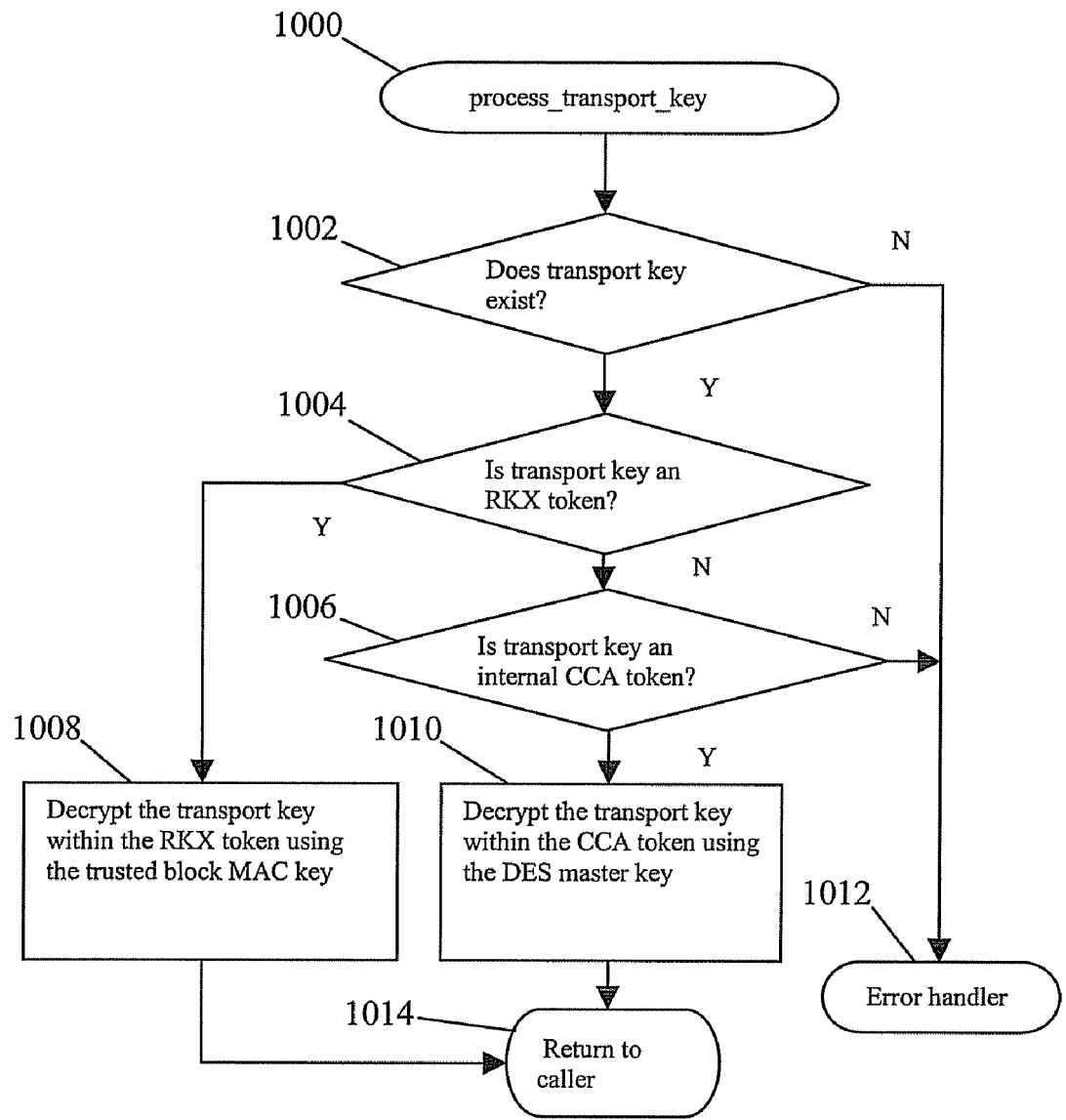
FIG. 10 is a flow chart depicting the routine for verifying that the transporter key is either a valid RKX token or a valid CCA token according to an embodiment of the present invention.

FIG. 10 together with table 23 highlight the major steps involved in the process transport key routine (1000) that verifies that the transporter key is either a valid RKX token or a valid CCA token (process_transport_key( )).

TABLE 23

| Step number and brief summary | Detailed description |
|---|---|
| | The process transport key routine 1000 verifies that the transporter key is either a valid RKX token or a valid CCA token. If valid, the key is decrypted. If a transport key variant exists, it is exclusive-OR'ed with the cleartext transport key. |
| 1002 - Does transporter key exist? | This routine is called whenever the RKX service is to perform a key export operation. If the RKX API input parameter, transport_key_identifier, contains a NULL token, defined as a token whose first byte is set to 0x00; or if the transport_key_identifier was NULL, then abort the operation with an error. |
| 1004 - Is transporter key an RKX token? | If the transporter key token type is external and the version number is 0x10 indicating an RKX token, proceed to step 1008. Else proceed to step 1006. |
| 1008 - Decrypt the transport key in the RKX token. | A. Verify that the RKX token's key length field is set equal to the sum of either the confounder length and a single length key, the confounder and a double length key, or the confounder and a triple length key.<br>B. If the RKX token's key length field is set equal to the sum of the confounder length and a single length key, |

TABLE 23-continued

| Step number and brief summary | Detailed description |
|---|---|
| | The process transport key routine 1000 verifies that the transporter key is either a valid RKX token or a valid CCA token. If valid, the key is decrypted. If a transport key variant exists, it is exclusive-OR'ed with the cleartext transport key. |
| | abort the operation with an error because a transporter key must not be single length in the preferred embodiment.<br>C. Using the trusted block's Protection Information section's cleartext MAC key exclusive-OR'ed with the MAC key variant from FIG. 8, step 806, compute the ISO-16609 cipher-block chaining mode triple DES MAC over the RKX token starting at offset 0 up to but not including offset 56 in Table 18.<br>D. Compare computed MAC against RKX token MAC value at offset 56. If unequal, abort the operation with an error (1012). Else, decrypt the RKX token's confounder and key using the trusted block's Protection Information section's cleartext Mac key exclusive-OR'ed with the MAC key variant from FIG. 8, step 806.<br>E. Verify that the trusted block's Transport Key Rule Reference subsection's rule ID matches the transporter key RKX token's rule ID at offset 40 of Table 18. If unequal, abort the operation with an error.<br>F. Using the trusted block's Common Export Key Parameter's subsection, determine if the CV length for the key to be exported is nonzero. If nonzero, then verify that the RKX token's key length field is not set equal to the sum of the confounder length and a triple length key. If so, abort the operation with an error because a triple length transporter key is not compatible with control vectors.<br>G. If a Transport Key Variant subsection within the Rule section exists, exclusive-or the variant contained in the Transport Key Variant subsection with the cleartext transporter key, saving the result for later use.<br>H. If the transporter key does not have odd parity, create a warning message for the host response, but continue to use the transporter key<br>I. Proceed to step 1014. |
| 1006 - Is transporter key an internal CCA token? | If the transporter key token type is internal, proceed to step 1010. Else, abort operation with an error. |
| 1010 - Decrypt the transporter key in the CCA token. | A. Verify that the CCA token has a nonzero CV. Perform the validity checks on the CV in this token such that the CV bits conform to control vector standards as documented in the CCA Basic Services Reference and Guide Appendix C: CCA control-vector definitions and key encryption.<br>B. Verify the validity of the token validation value contained within the CCA token.<br>C. Verify that the transporter key is a double length key.<br>D. Using the transporter key token's MKVP, determine whether to use the current or old DES master key to decrypt the transporter key. Decrypt the transporter DES key under the corresponding DES master key using the transporter key token's CV according to the CCA Basic Services Guide and Reference Appendix C.<br>E. If a Transport Key Variant subsection within the Rule section exists, verify that the transport key variant has even parity. If not, abort the operation with an error.<br>F. If a Transport Key Variant subsection within the Rule section exists, exclusive-or the transport key variant with the cleartext transporter key. |
| 1014 - Return to caller | |

Figure 11:
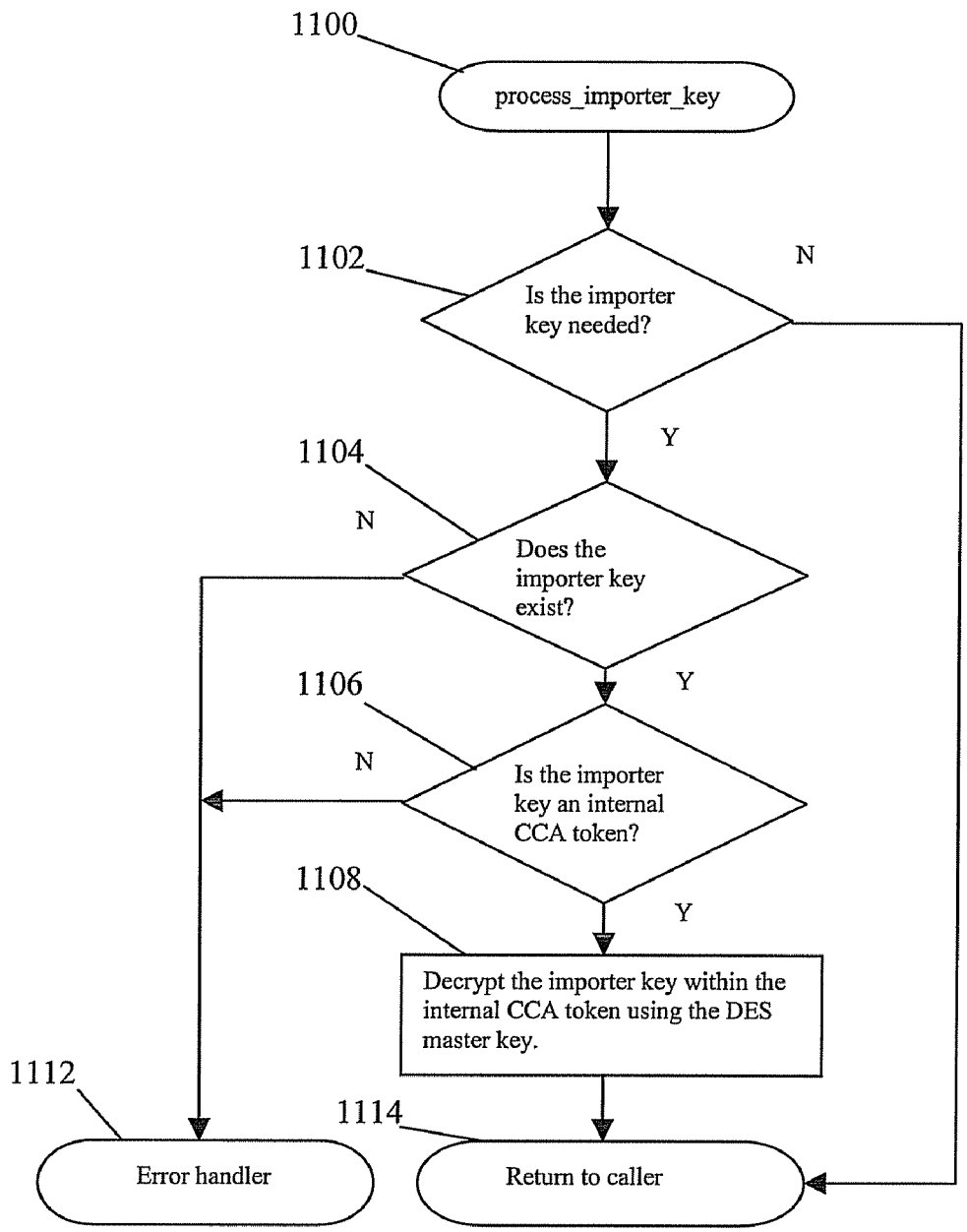
FIG. 11 is a flow chart depicting the routine for verifying that the importer key is a valid internal CCA token according to an embodiment of the present invention.

FIG. 11 (process_importer_key( )) together with table 24 provide the major steps involved in the process of verifying the importer key, if present, is a valid internal CCA token.

TABLE 24

| Step number and brief summary | Detailed description<br>The process importer key routine (1100) will verify that the importer key, if present, is a valid internal CCA token. If valid, the importer key is decrypted for later use. |
|---|---|
| 1102 - Is the importer key needed? | If the source_key_identifier is an RKX token which requires the MAC key within the trusted block for decryption, or if the source_key_identifier is an internal CCA token which requires a DES master key for decryption, then ignore the importer key and proceed to step 1114. Else, proceed to step 1104. |
| 1104 - Does the importer key exist? | If the importer_key_identifier contains a NULL token, defined as a token whose first byte is set to 0x00; or if the importer_key_identifier is NULL, and the source key is an external CCA token, abort the operation with an error. Else, proceed to step 1106. |
| 1106 - Is the importer key an internal CCA token? | If the importer_key_identifier is an internal CCA token, proceed to step 1108. Else, abort the operation with an error 1112. |
| 1108 - Decrypt the importer key in the CCA token | A. Verify that the CCA token has a nonzero CV. Perform the validity checks on the CV in this token such that the CV bits conform to control vector standards as documented in the CCA Basic Services Reference and Guide Appendix C: CCA control-vector definitions and key encryption.<br>B. Verify the validity of the token validation value contained within the CCA token.<br>C. Verify that the importer key is a double length key.<br>D. Using the importer key token's MKVP, determine whether to use the current or old DES master key to decrypt the importer key. Decrypt the importer DES key under the corresponding DES master key using the importer key token's CV.<br>E. If the importer key does not have odd parity, create a warning message for the host response, but continue to use the importer key. |
| 1114 - Return to caller. | |

Figure 12:
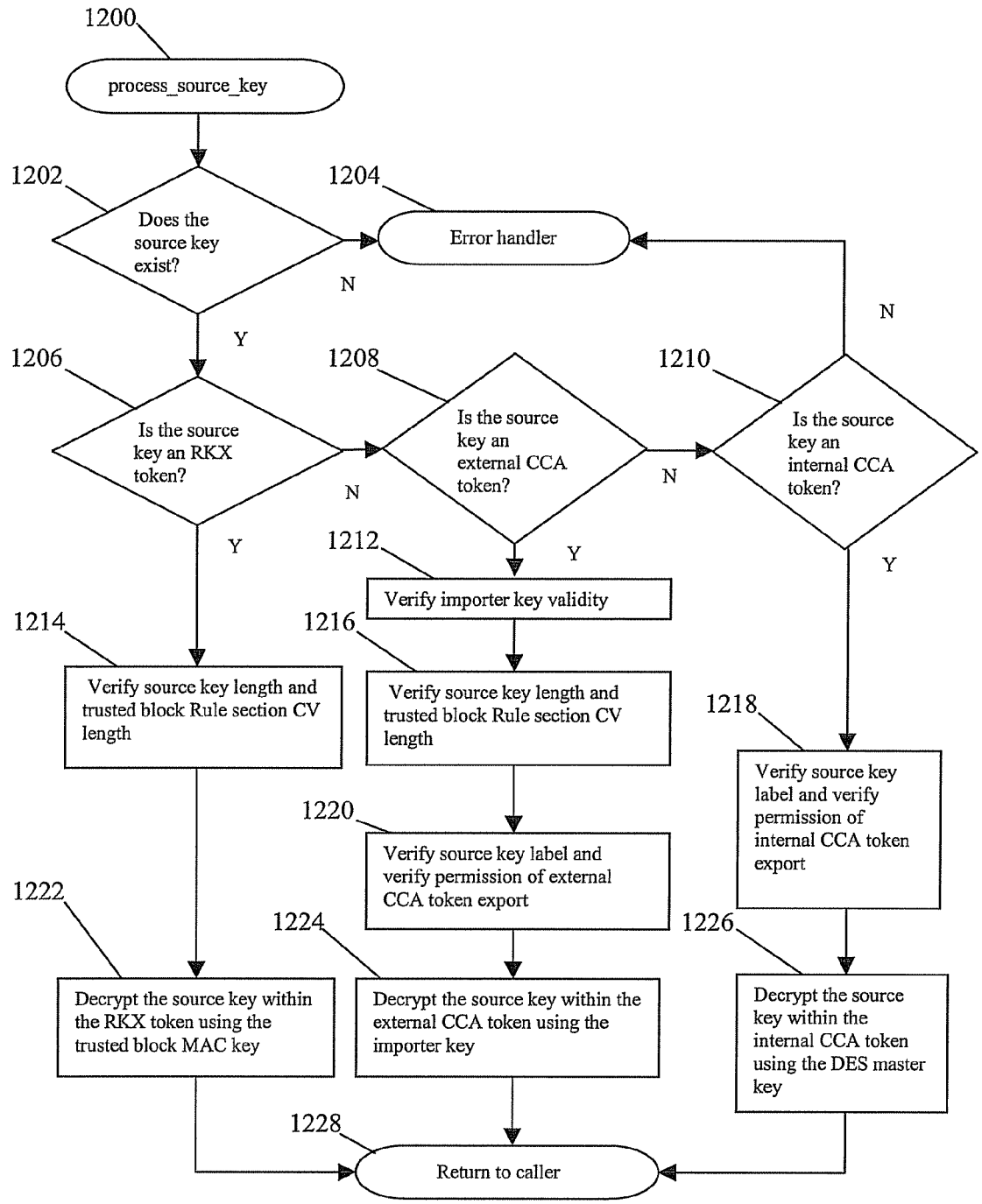
FIG. 12 is a flow chart depicting the routine for verifying that source key is a valid RKX token or a valid CCA token according to an embodiment of the present invention.

FIG. 12 (process_source_key( )) together with table 25 provide the major steps involved in the process of verifying if the source key is either a valid RKX token or a valid CCA token.

TABLE 25

| Step number and brief summary | Detailed description<br>The process_source_key routine 1200 Verify that the source key is either a valid RKX token or a valid CCA token. If valid, the key is decrypted. If an output key variant exists, it is exclusive-OR'ed with the cleartext source key. |
|---|---|
| 1202 - Does the source key exist? | If the source_key_identifier contains a NULL token, defined as a token whose first byte is set to 0x00; or if the source_key_identifier is NULL, then abort the operation with an error. Else, proceed to step 1206. |
| 1206 - Is source key an RKX token? | If the source key token type is external and the version number is 0x10 indicating an RKX token, proceed to step 1214. Else proceed to step 1208. |
| 1214 - Verify source key length and trusted block Rule section CV Length. | This description is written to accommodate either a source that is an RKX token or a source key that is a CCA token, and is implemented as a subroutine in the preferred embodiment.<br>A. Verify that the source key length is not larger than the CV Length in the Rule section's Common Export Key Parameters subsection. In the event that the CV Length is zero, the source key length will not be compared to the CV Length.<br>B. If the CV Length is single (meaning 8 bytes in length), and the source key length is double (meaning 16 bytes in length), abort the operation with an error.<br>C. If the source key is contained within an RKX token, a source key length of triple length (meaning 24 bytes) and a nonzero CV is considered an error since a triple length key is not compatible with control vectors which are designed for single and double length keys; however, if the CV Length in the Common Export Key |

TABLE 25-continued

| Step number and brief summary | Detailed description |
|---|---|
| | The process_source_key routine 1200 Verify that the source key is either a valid RKX token or a valid CCA token. If valid, the key is decrypted. If an output key variant exists, it is exclusive-OR'ed with the cleartext source key. |

Parameters subsection is zero or if the CV length is
   nonzero but the CV value is all binary zeroes, then the
   source key length restriction is waived.
   D. Verify that the length of the source key is greater than
      or equal to the Export Key Minimum Length in the
      Common Export Key Parameters subsection.
   E. Verify that the length of the source key is less than or
      equal to the Export Key Maximum Length in the
      Common Export Key Parameters subsection.
   F. Verify that the length of the source key is less than or
      equal to the Output Key Variant Length in the
      Common Export Key Parameters subsection provided
      that the Output Key Variant Length is nonzero (if the
      Output Key Variant Length is zero, then this
      comparison step is not performed).
   G. If the CV Length in the Common Export Key
      Parameters subsection is greater than the source key
      length, then this would imply that the CV Length is 16
      and the source key length is 8 bytes. (Note that the
      possible CV Lengths are 0, 8, or 16; while the possible
      source key lengths are 8, 16, or 24 bytes). Therefore, in
      this case, the source key may be replicated (meaning
      that the 8-byte value is replicated to 16 bytes such that
      there are 2 equal halves), if the CV value in the
      Common Export Key Parameters subsection permits
      the replication and furthermore if the replication does
      not exceed the Export Key Maximum Length in the
      Common Export Key Parameters subsection.
   H. If the Rule section Symmetric Encrypted Output Key
      Format flag is set for CCA token output, and if the CV
      Length in the Common Export Key Parameters
      subsection is set to zero, then preserve the source key's
      CV value for the case of the source key being a CCA
      token. If the source key is an RKX token, the issue is
      moot since there is no CV contained in the token to be
      preserved.
   I. Various combinations of source key length, Common
      Export Key Parameter CV Length, and Common
      Export key Parameter CV value are examined for
      validity.
      1) If the Common Export Key Parameters subsection
         contains a CV Length that is neither zero, single
         length, nor double length, then abort the operation
         with an error.
      2) If the CV Length is set to single or double, the
         source key is single length, and the Common
         Export Key Parameters subsection contains a CV
         value that is set to binary zeroes, proceed to step
         1228.
      3) If the CV Length is double, the source key is
         double length, and the Common Export Key
         Parameters subsection contains a CV value that is
         set to binary zeroes, proceed to step 1228.
      4) If the source key length is triple, the CV Length is
         double, and the Common Export Key Parameters
         subsection contains a CV value that is set to binary
         zeroes, proceed to step 1228.
      5) If the source key length is triple, the CV Length is
         double, and the Common Export Key Parameters
         subsection contains a CV value that is nonzero,
         then abort the operation with an error.
      6) If the source key length is triple and the CV Length
         is single, then abort the operation with an error.
      7) If the CV Length is single, but the Common Export
         Key Parameters subsection contains a CV value
         that indicates that the key to which this CV is to be
         associated with must be double, then abort the
         operation with an error.
      8) If the CV Length is double, the source key length is
         double, and the Common Export Key Parameters
         subsection contains a CV value that has a nonzero
         left half, but the CV left half indicates that the key
         to which this CV is to be associated with must be

TABLE 25-continued

| Step number and brief summary | Detailed description<br>The process_source_key routine 1200 Verify that the source key is either a valid RKX token or a valid CCA token. If valid, the key is decrypted. If an output key variant exists, it is exclusive-OR'ed with the cleartext source key. |
|---|---|
| | single, then abort the operation with an error. |
| | 9) If the CV Length is double, the source key length is double, and the Common Export Key Parameters subsection contains a CV value that has a nonzero left half, the CV left half indicates that the key to which this CV is to be associated with must be double, but the CV value has a binary zero right half, then abort the operation with an error. |
| | 10) If the CV Length is double, the source key length is double, and the Common Export Key Parameters subsection contains a CV value that has a nonzero left half, the CV left half indicates that the key to which this CV is to associated with must be double, the CV value has a nonzero right half, but the left half of the CV does not indicate that the CV is a left half or the right half of the CV does not indicate that the CV is a right half, then abort the operation with an error. |
| | 11) If the CV Length is double, the source key length is double, and the Common Export Key Parameters subsection contains a CV value that has a nonzero left half, the CV left half indicates that the key to which this CV is to associated with must be double, the CV value has a nonzero right half, the left half of the CV indicates that the CV is a left half, and the right half of the CV indicates that the CV is a right half, then perform the validity checks on the CV in the Common Export Key Parameters subsection such that the CV bits conform to control vector standards as documented in the CCA Basic Services Reference and Guide Appendix C: CCA control-vector definitions and key encryption. If there is a validity check failure, abort the operation with an error. |
| | 12) If the CV Length is single and the source key length is double, then abort the operation with an error. IF the CV Length is double, the source key length is single, the left half of the CV value in the Common Export Key Parameters subsection contains a nonzero value and its value indicates that the key to be associated with this CV must be single length, then perform the validity checks on the CV in the Common Export Key Parameters subsection such that the CV bits conform to control vector standards as documented in the CCA Basic Services Reference and Guide Appendix C: CCA control-vector definitions and key encryption. If there is a validity check failure, abort the operation with an error. |
| | 13) If the CV Length is double, the source key length is single, the left half of the CV value in the Common Export Key Parameters subsection contains a nonzero value, the right half of the CV value in the Common Export Key Parameters subsection contains a nonzero value, the left half of the CV indicates that the CV is a left half, and the right half of the CV indicates that the CV is a right half, then perform the validity checks on the CV in the Common Export Key Parameters subsection such that the CV bits conform to control vector standards as documented in the CCA Basic Services Reference and Guide Appendix C: CCA control-vector definitions and key encryption. If there is a validity check failure, abort the operation with an error. |
| | 14) If the CV Length is double, the source key length is single, the left half of the CV value in the Common Export Key Parameters subsection contains a nonzero value, the right half of the CV value in the Common Export Key Parameters subsection contains a nonzero value, the left half of the CV indicates that the CV is a left half, and the right half of the CV fails validity checks, then perform the |

TABLE 25-continued

| Step number and brief summary | Detailed description |
|---|---|
| | The process_source_key routine 1200 Verify that the source key is either a valid RKX token or a valid CCA token. If valid, the key is decrypted. If an output key variant exists, it is exclusive-OR'ed with the cleartext source key. |
| | validity checks on the left half of the CV in the Common Export Key Parameters subsection such that the CV bits conform to control vector standards. If there is a validity check failure, abort the operation with an error. Since the key is single length, a bad value for the CV right half is ignored. |
| 1222 - Decrypt the source key in the RKX token. | A. Verify that the RKX token's key length field is set equal to the sum of either the confounder length and a single length key, the confounder and a double length key, or the confounder and a triple length key.<br>B. If the RKX token's key length field is set equal to the sum of the confounder length and a single length key, abort the operation with an error because a transporter key must not be single length in the preferred embodiment.<br>C. Using the trusted block's Protection Information section's cleartext MAC key exclusive-OR'ed with the MAC key variant from FIG. 8, step 806, compute the ISO-16609 cipher-block chaining mode triple DES MAC over the RKX token starting at offset 0 up to but not including offset 56 in Table 18.<br>D. Compare computed MAC against RKX token MAC value at offset 56 of Table 18. If unequal, abort the operation with an error. Else, decrypt the RKX token's confounder and key using the trusted block's Protection Information section's cleartext Mac key exclusive-OR'ed with the MAC key variant from FIG. 8, step 806.<br>E. Verify that the trusted block's Source Key Rule Reference subsection's rule ID matches the source key RKX token's rule ID at offset 40 of Table 18. If unequal, abort the operation with an error.<br>F. Determine whether source key replication is needed. If the input key length is single, the CV Length in the Common Export Key Parameters subsection is double length, the Rule section's Symmetric Encrypted Output key Format flag is set to CCA token format output, the left and right halves of the CV value in the Common Export Key Parameters subsection contain key-form bits indicating that the key to which this CV is to be associated with, has left and right halves that are not identical, then verify that the user's role has access control permissions enabled which would allow the replication of the single length source key to become a 16 byte (double length) key with the first 8 bytes equal to the second 8 bytes.<br>G. Generate a warning message if the resultant key does not have odd parity, but continue to use the key. Do not abort the operation.<br>H. Proceed to step 1228. |
| 1208 - Is the source key an external CCA token? | If the source key is an external CCA DES token, proceed to step 1212. Else proceed to step 1210. |
| 1212 - Verify importer key validity, | If the importer_key_identifier contains a NULL token, defined as a token whose first byte is set to 0x00; or if the importer_key_identifier is NULL, then abort the operation with an error. |
| 1216 - Verify source key length and trusted block Rule section CV Length. | Follow the procedure outlined in step 1214 of this figure. |
| 1220 - Verify source key label template, and verify permission of external CCA token export. | A. If the trusted block's rule section selected in FIG. 6, step 612, contains an Export Key CCA Token Parameters subsection that has a nonzero Source Key Label Template Length, and the source_key_identifier was not a key label, abort the operation with an error.<br>B. If the external CCA token's CV bit referred to as the "export OK" bit 17 is equal to binary zero, abort the operation with an error. |
| 1224 - Decrypt the source key within the external CCA token. | A. Verify that the external CCA token contains a valid TVV (token validation value), version number, and token fields.<br>B. If the version number of the external token is 1, verify |

TABLE 25-continued

| Step number and brief summary | Detailed description<br>The process_source_key routine 1200 Verify that the source key is either a valid RKX token or a valid CCA token. If valid, the key is decrypted. If an output key variant exists, it is exclusive-OR'ed with the cleartext source key. |
|---|---|
| | that the source key's CV contains binary zeroes and furthermore verify that the source key's length is either double or triple. A single length source key with a version number set to 1 will result in an error and the operation will be aborted.<br>C. Verify that the importer key does not have a zero CV value. If so, abort the operation with an error.<br>D. Verify that the importer key does not have equal halves (i.e. the left and right 8 byte quantities are not equal). If so, abort operation with an error.<br>E. Triple decrypt each 8-byte section of the source key using the importer key from FIG. 11, step 1114. If the CV Length in the Common Export Key Parameters subsection is greater than the source key length, then this would imply that the CV Length is 16 and the source key length is 8 bytes. (Note that the possible CV Lengths are 0, 8, or 16; while the possible source key lengths are 8, 16, or 24 bytes). Therefore, in this case, the source key may be replicated (meaning that the 8-byte value is replicated to 16 bytes such that there are 2 equal halves), if the CV value in the Common Export Key Parameters subsection permits the replication and furthermore if the replication does not exceed the Export Key Maximum Length in the Common Export Key Parameters subsection.<br>F. Generate a warning message if the source key does not have odd parity, but continue to use the key. Do not abort the operation.<br>G. Proceed to step 1228. |
| 1210. Is the source key an internal CCA token? | If the source key is an internal CCA DES token, proceed to step 1218. Otherwise abort the operation with an error. |
| 1218. Verify source key label template, and verify permission of internal CCA token export. | A. If the trusted block's rule section selected in FIG. 6, step 612, contains an Export Key CCA Token Parameters subsection that has a nonzero Source Key Label Template Length, and the source_key_identifier Was not a key label, abort the operation with an error.<br>B. If the trusted block's rule section selected in FIG. 6, step 612, contains an Export Key CCA Token Parameters subsection that has a nonzero Source Key Label Template Length, and the source_key_identifier was a key label, indicating that the source key resides in a key storage repository:<br>  1) Verify that the Source Key Label Template Length is 64 bytes,<br>  2) Verify that the first character in the template is not be between 0x00-0x1F, nor can it be 0xFF;<br>  3) Verify that the first character in the template is not numeric, 0x30-0x39; verify that the label in the template is terminated by a space on the right and that the remainder of the 64 byte field is padded with space characters (0x20);<br>  4) Verify that the only special characters which may occur in the label template are 0x23 (#), 0x24 ($), 0x2E (.), and 0x40 (@);<br>  5) Verify that the wildcard 0x2A (*) is permitted as the first character, the last character, or only character;<br>  6) Verify that once a space is encountered, every character to the right of that space character, up to the 64 byte length, must be spaces as well;<br>  7) Verify that only alphanumeric characters are present in the label template: a-z, A-Z, 0-9, and the 4 special characters, #, $, ., and @.<br>  8) Once the key label template has been verified for validity, compare the template with the source key label. If a miscompare results, abort the operation with an error.<br>C. If the external CCA token's CV bit referred to as the "export OK" bit 17 is equal to binary zero, abort the operation with an error. |
| 1226 - Decrypt the source key within | A. Verify that the CCA token has a nonzero CV. Perform the validity checks on the CV in this token such that |

TABLE 25-continued

| Step number and brief summary | Detailed description<br>The process_source_key routine 1200 Verify that the source key is either a valid RKX token or a valid CCA token. If valid, the key is decrypted. If an output key variant exists, it is exclusive-OR'ed with the cleartext source key. |
|---|---|
| the internal CCA token. | the CV bits conform to control vector standards as documented in the CCA Basic Services Reference and Guide Appendix C: CCA control-vector definitions and key encryption.<br>B. Verify the validity of the token validation value contained within the CCA token.<br>C. Verify source key length and trusted block Rule section CV Length by following the procedure outlined in step 1214.<br>D. Verify that the source key is a double length key, or a triple length key having a binary zero value for its CV. Using the source key token's MKVP, determine whether to use the current or old DES master key to decrypt the source key. Decrypt the source DES key under the corresponding DES master key using the source key token's CV according to the CCA Basic Services Guide and Reference Appendix C.<br>E. If the CV Length in the Common Export Key Parameters subsection is greater than the source key length, then this would imply that the CV Length is 16 and the source key length is 8 bytes. (Note that the possible CV Lengths are 0, 8, or 16; while the possible source key lengths are 8, 16, or 24 bytes). Therefore, in this case, the source key may be replicated (meaning that the 8-byte value is replicated to 16 bytes such that there are 2 equal halves), if the CV value in the Common Export Key Parameters subsection permits the replication and furthermore if the replication does not exceed the Export Key Maximum Length in the Common Export Key Parameters subsection.<br>F. Generate a warning message if the resultant key does not have odd parity, but continue to use the key. Do not abort the operation. |
| 1228 - Return to caller. | |

Figure 13:
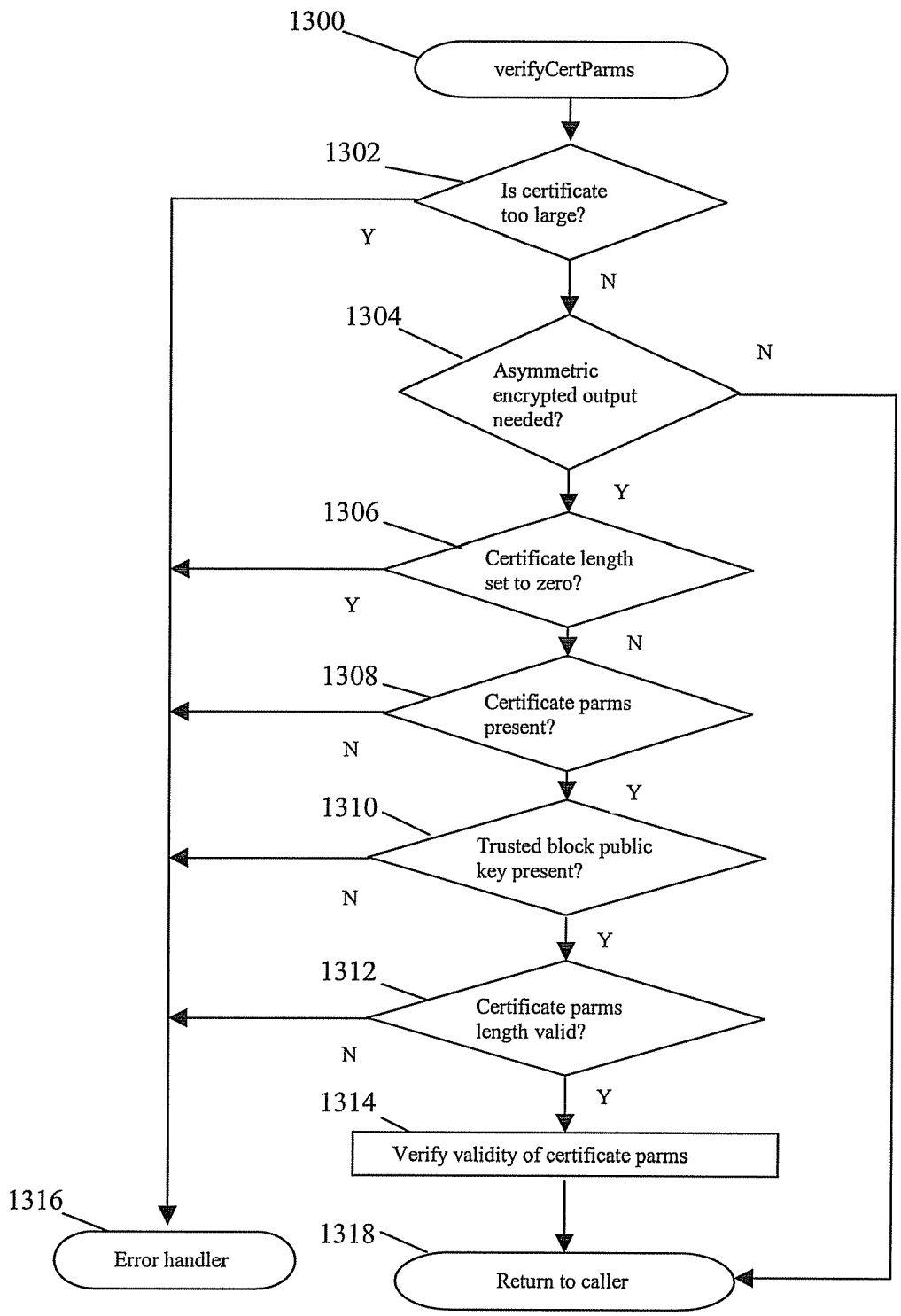
FIG. 13 is a flow chart depicting the routine for verifying the validity of the certificate parameters length field as well as the validity of the lengths contained within the certificate parameters table according to an embodiment of the present invention.

FIG. 13 (verifyCertParms( )) together with table 26 highlight the major steps involved in the process of verifying the validity of the certificate parameter length field, as well as, the lengths contained within the certificate parameters table.

TABLE 26

| Step number and brief summary | Detailed description<br>The verifyCertParms( ) routine 1300 verifies the validity of the certificate parms length field as well as the validity of the lengths contained within the certificate parms table. |
|---|---|
| 1302 - Is certificate too large? | Verify that the certificate_length input parameter is not greater than some predefined maximum value. If so, abort operation with an error. Else, proceed to step 1304. |
| 1304 - Asymmetric output desired? | If the rule section chosen in FIG. 6, step 612, specifies asymmetric encrypted output, proceed to step 1306. Else, proceed to step 1318. |
| 1306 - Certificate length zero? | Verify that the certificate_length is not zero. If zero, abort operation with an error. Else proceed to step 4. |
| 1308 - Certificate parms present? | Verify that the certificate_parms input parameter is present and that the certificat_parms_length is large enough to accommodate all the elements that are needed;<br>A. The offset of the public key modulus within the certificate,<br>B. The length of the public key modulus,<br>C. The offset of the public key exponent within the certificate,<br>D. The length of the public key exponent,<br>E. The offset of the digital signature within the certificate,<br>F. The length of the digital signature,<br>G. The identifier for the hash algorithm used,<br>H. The identifier for the digital signature hash formatting method,<br>I. The offset of the block of data within the certificate |

TABLE 26-continued

| Step number and brief summary | Detailed description |
|---|---|
| | The verifyCertParms( ) routine 1300 verifies the validity of the certificate parms length field as well as the validity of the lengths contained within the certificate parms table. |
| | that is to be hashed to compute the digital signature, and<br>J. The length of the certificate data hashed to compute the digital signature.<br>If the certificate_parms parameter is not present, or does not meet the aforementioned requirements, abort the operation with an error (1316). Else proceed to step 1310. |
| 1310 - Trusted block public key present? | Verify the public key section within the trusted block exists. If not, abort operation with an error. Else, proceed to step 1312. |
| 1312 - Certificate parms lengths valid? | Verify that neither<br>A. The certificate parms modulus length, nor<br>B. The certificate parms exponent length, nor<br>C. The certificate parms signature length, nor<br>D. The certificate parms data-to-hashed length is zero.<br>If any of these lengths are zero, abort operation with an error (1318). Else proceed to step 1314. |
| 1314 - Verify the validity of the certificate parameters | A. Verify that the sum of the modulus offset and the modulus length does not exceed the length of the certificate;<br>B. Verify that the sum of the exponent offset and the exponent length does not exceed the length of the certificate;<br>C. Verify that the sum of the signature offset and signature length does not exceed the length of the certificate;<br>D. Verify that the sum of the offset of the block of data within the certificate that is to be hashed and the length of this block does not exceed the length of the certificate.<br>E. Verify that the modulus value within the certificate, pointed to by the modulus offset in the certificate parms, is not all binary zeroes.<br>F. Verify that the exponent value within the certificate, pointed to by the exponent offset in the certificate parms, is not all binary zeroes.<br>G. Verify that the certificates signature size, which may be less than the value of the signature length field but padded on the left with zero bits, is less than or equal to the size in bytes of the trusted block's public key modulus. If the certificate signature size is exactly equal to the size of the trusted block's public key modules, then compare the values of the certificate signature and trusted block public key modulus to verify that the value of the signature is less than the value of the modulus.<br>H. Using the certificate parms offsets and lengths for modulus, exponent, and signature; verify that the modulus, exponent, and signature do not overlap each other.<br>I. Verify that the public key modulus bit length in the certificate, pointed to by the certificate parms public key modulus offset, does not exceed the maximum allowable size set within the cryptographic adapter. |
| 1318 - Return to caller | |

Figure 14:
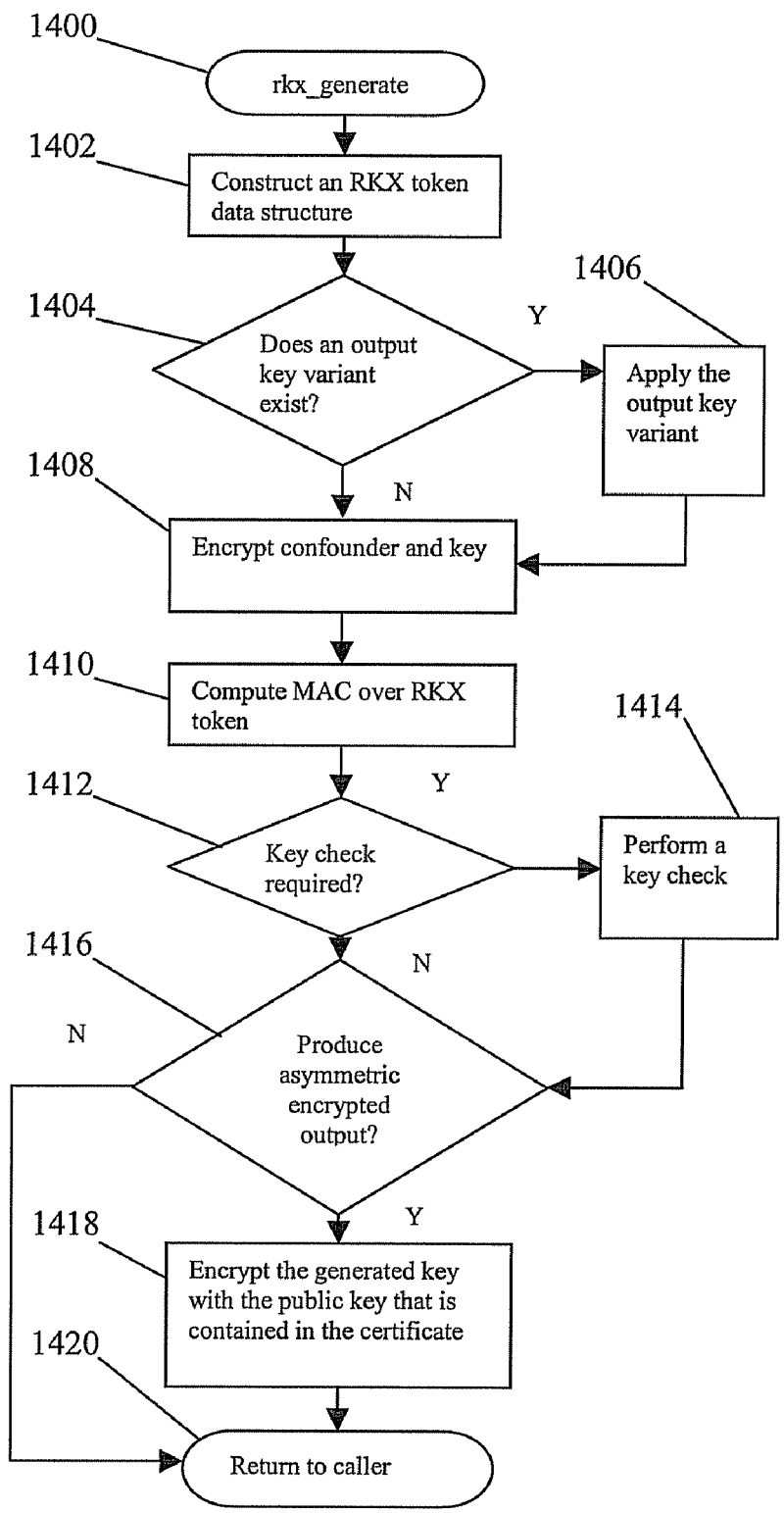
FIG. 14 is a flow chart depicting the routine for generating an RKX token data structure according to an embodiment of the present invention.

FIG. 14 (rkx_generate( )) 1400 together with table 27 provide the major steps involved in the process of building an RKX token data structure.

TABLE 27

| Step number and brief summary | Detailed description |
|---|---|
| 1402 - Construct an RKX token data structure | Build an RKX token data structure consisting of the following parts: an external key token type 0x02 and version number 0x10 per Table 18; the rule ID retrieved from the rule section selected in FIG. 6 step 612; the sum of the Generated Key Length in bytes retrieved from the rule section selected in FIG. 6 step 612 and the length of a confounder (8 bytes); an 8 byte random number for the |

TABLE 27-continued

| Step number and brief summary | Detailed description |
|---|---|
| | confounder; and either an 8, 16, or 24 byte random number for the key. |
| 1404 - Does an output key variant exist? | If the Common Export Key Parameter subsection of the rule section selected by the rule ID input parameter in FIG. 6, step 612, exists and furthermore contains an output key variant, then proceed to step 1406. Else proceed to step 1408. |
| 1406 - Apply the output key variant | Exclusive-or the variant contained in the Common Export Key Parameter subsection of the rule section selected by the rule ID input parameter in FIG. 6, step 612, with the generated random number key portion. If the output key variant length is greater than the generated key length, then the leftmost bytes of the variant are used, up to key length. If the output key variant length is less than the length of the generated key portion, then abort the operation with an error. |
| 1408 - Encrypt confounder and key | An ISO-16609 triple DES Cipher Block Chaining Mode encryption of the confounder prepended to the random key portion (after the output key variant is applied per step 1406 of this figure if the output key variant was present, or after step 1402 of this figure if the output key variant is not present) is performed using an initial vector set to zero. |
| 1410 - Compute MAC over RKX token | Compute the ISO-16609 triple DES Cipher Block Chaining Mode MAC over the RKX token between offsets 0 and 55 inclusive, and place the 8-byte MAC value into the RKX token at offset 56. |
| 1412 - Key check required? | If the rule section selected by the rule ID in FIG. 6, step 612, indicates that a key check is to be performed, proceed to step 1414 in this figure. Else, proceed to step 1416 in this figure. |
| 1414 - Perform a key check | If the key check algorithm identifier in the rule section selected by the rule ID in FIG. 6, step 612, indicates that an encryption of 8 bytes of zeroes is to be performed with the cleartext key from step 1402 of this figure, then execute the following actions:<br>  A. If the generated key is single length, then output only 3 bytes of the resultant encryption in FIG. 6, step 646, if the input key_check_length parameter value was set to 3;<br>  B. Otherwise if the input key_check_length parameter value was set to a value between 4 and 8 inclusive, output only 4 bytes in FIG. 6, step 646. An input key_check_length parameter value of 0, 1, or 2 will result in an error due to insufficient length to hold the result, and the operation will be aborted.<br>  C. If the generated key is double or triple length, then output the full 8 bytes of the resultant encryption in FIG. 6, step 646, provided that the input key_check_length parameter value is set to 8. Otherwise, abort the operation with an error due to insufficient length to hold the result.<br>If the key check algorithm identifier in the rule section selected by the rule ID in FIG. 6, step 612, indicates that an MDC-2 hash of the cleartext key from step 1 is to be performed, then<br>  a) Odd-parity adjust each byte of the cleartext key and<br>  b) Execute the MDC2 hash algorithm on the odd-parity adjusted key without the use of padding. Return the 16-byte value in FIG. 6, step 646, provided that the input key_check_length parameter is set to 16. A length less than 16 will result in an error and the operation will be aborted. |
| 1416 - Produce asymmetric encrypted output? | Using the trusted block rule section selected from FIG. 6, step 612, determine whether asymmetric encrypted output is to be produced. If not, proceed to step 1420. Else, proceed to step 1418. |
| 1418 - Encrypt the generated key with the public key contained in the certificate | Determine from the rule section selected from FIG. 6, step 612, whether PKCS1.2 output or RSA-OAEP output format is desired.<br>  A. If RSA-OAEP output is specified in the rule section, then format the generated key from step 1402 if no output key variant was used, or format the result of the generated key exclusive-OR'ed with the output key variant from step 1406, into an OAEP encryption block according to the method described in the RSA DSI PKCS#1-v2.0 documentation for RSAES-OAEP.<br>  B. If PKCS1.2 output was specified in the rule section, |

TABLE 27-continued

| Step number and brief summary | Detailed description |
|---|---|
| | then format the generated key from step 1402 if no output key variant was used, or format the result of the generated key exclusive-OR'ed with the output key variant from step 1406, into a PKCS 1.2 encryption block according to the method described in the RSA DSI PKCS #1 documentation for block type 2. In the RSA PKCS #1 v2.0 standard, RSA terminology describes this as the RSAES-PKCS1-v1_5 format. |
| 1420 - Return to caller | |

Figure 15:
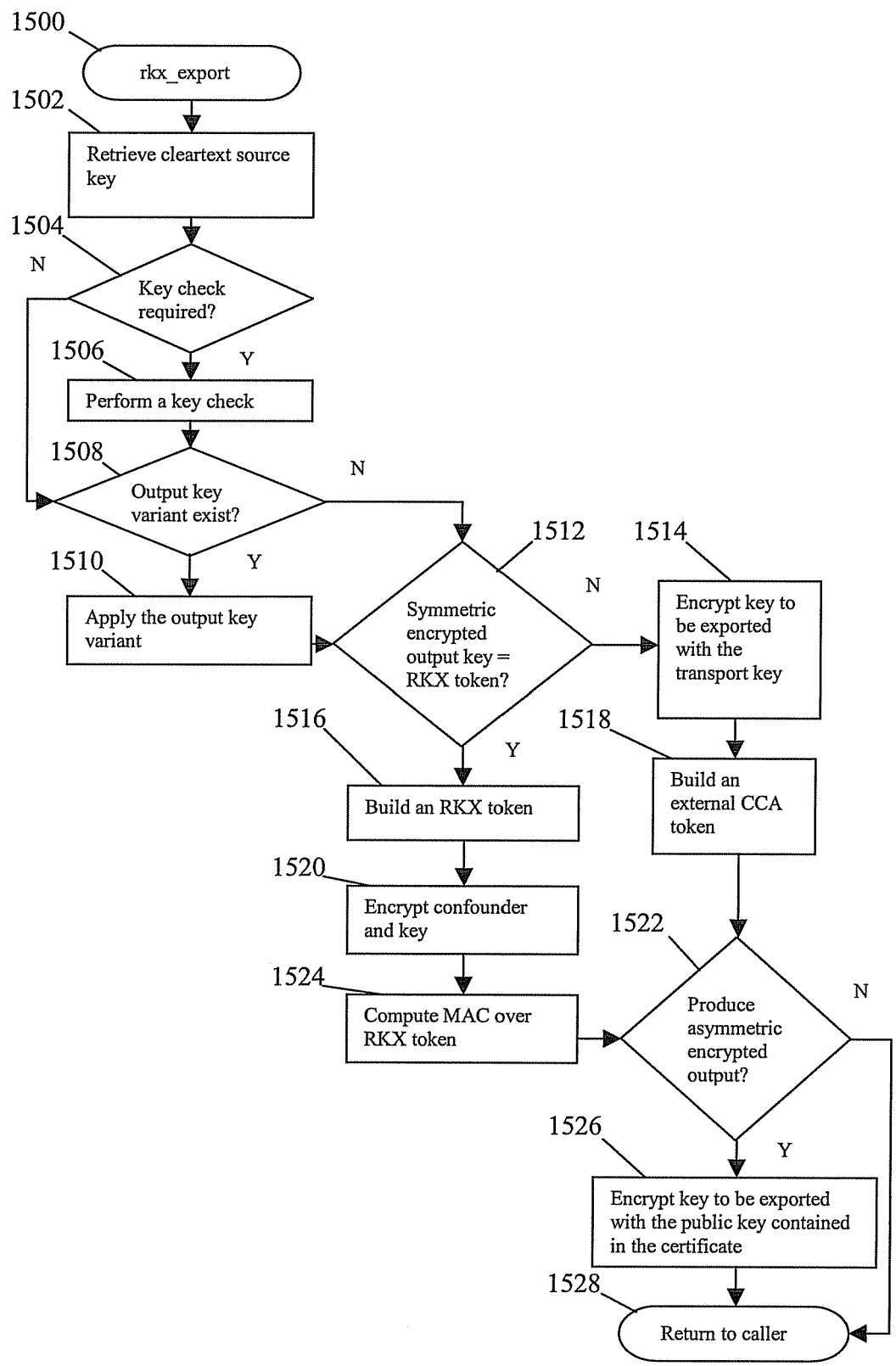
FIG. 15 is a flow chart depicting the routine for exporting either an RKX data structure or CCA data structure according to an embodiment of the present invention.

FIG. 15 (rkx_export( )) 1500 together with table 28 highlight the major steps involved in the process of exporting an RKX token.

TABLE 28

| Step number and brief summary | Detailed description |
|---|---|
| 1502 - Retrieve cleartext source key | Extract the key and key length out of the source key token that has been recovered into cleartext form in FIG. 12. |
| 1504 - Key check required? | If the rule section selected by the rule ID in FIG. 6, step 612, indicates that a key check is to be performed, proceed to step 1506 in this figure. Else, proceed to step 1508 in this figure. |
| 1506 - Perform a key check | If the key check algorithm identifier in the rule section selected by the rule ID in FIG. 6, step 612, indicates that an encryption of 8 bytes of zeroes is to be performed with the cleartext key from step 1502 of this figure, then execute the following actions:<br>  A. If the source key is single length, then output only 3 bytes of the resultant encryption in FIG. 6, step 646, if the input key_check_length parameter value was set to 3;<br>  B. Otherwise if the input key_check_length parameter value was set to a value between 4 and 8 inclusive, output only 4 bytes in FIG. 6, step 646. An input key_check_length parameter value of 0, 1, or 2 will result in an error due to insufficient length to hold the result, and the operation will be aborted.<br>  C. If the source key is double or triple length, then output the full 8 bytes of the resultant encryption in FIG. 6, step 646, provided that the input key_check_length parameter value is set to 8. Otherwise, abort the operation with an error due to insufficient length to hold the result.<br>If the key check algorithm identifier in the rule section selected by the rule ID in FIG. 6, step 612, indicates that an MDC-2 hash of the cleartext key from step 1502 is to be performed, then<br>  a) Odd-parity adjust each byte of the cleartext key and<br>  b) Execute the MDC2 hash algorithm on the odd-parity adjusted key without the use of padding, per the MDC-2 description in the CCA Basic Services Guide and Reference; Appendix 10. Return the 16-byte value in FIG. 6, step 646, provided that the input key_check_length parameter is set to 16. A length less than 16 will result in an error and the operation will be aborted. |
| 1508 - Does an output key variant exist? | If the Common Export Key Parameter subsection of the rule section selected by the rule ID input parameter in FIG. 6, step 612, contains an output key variant, then proceed to step 1510. Else proceed to step 1512. |
| 1510 - Apply the output key variant | Exclusive-or the variant contained in the Common Export Key Parameter subsection of the rule section selected by the rule ID input parameter in FIG. 6, step 612, with the cleartext source key from step 1502 of this figure. If the output key variant length is greater than the source key length, then the leftmost bytes of the variant are used, up to key length. If the output key variant length is less than the length of the source key, then abort the operation with an error. |
| 1512 - Create an RKX token for the | If the rule section of the trusted block selected by the rule ID input parameter in FIG. 6, step 612, indicates that |

TABLE 28-continued

| Step number and brief summary | Detailed description |
|---|---|
| symmetric encrypted output key? | the symmetric encrypted output key format should be an RKX token, proceed to step 1516. Else, proceed to step 1514. |
| 1516 - Build an RKX token | Build an RKX token data structure consisting of the following parts:<br>A. An external key token type 0x02 and version number 0x10 per Table 18;<br>B. The rule ID retrieved from the rule section selected in FIG. 6 step 612;<br>C. The sum of the key length in bytes retrieved from the source key token in step 1502 of this figure and the length of a confounder (8 bytes);<br>D. An 8 byte random number for the confounder;<br>E. And either an 8, 16, or 24 byte value that is either:<br>  1) The result of the exclusive-or operation between the cleartext source key from step 1502 and the output key variant from step 1510, or<br>  2) The cleartext source key alone, from step 1502, in the event that no output key variant is present. |
| 1520 - Encrypt confounder and key | An ISO-16609 triple DES Cipher Block Chaining Mode encryption of the confounder and key portion built in step 1516, is performed using an initial vector set to zero. |
| 1524 - Compute MAC over RKX token | Compute the ISO-16609 triple DES Cipher Block Chaining Mode MAC over the RKX token between offsets 0 and 55 inclusive, and place the 8-byte MAC value into the RKX token at offset 56. Proceed to step 1522. |
| 1514 - Encrypt key to be exported with the transport key | Perform validity checks on the source key using the value of the control vector (CV) in the Common Export Key Parameters subsection of the rule section selected in FIG. 6, step 612, and the source key's 8-byte, 16-byte, or 24 byte value as follows:<br>A. If the CV Length in the Common Export Key Parameters subsection is 8 bytes and if the source key is 16 bytes in length, abort the operation with an error;<br>B. if the CV Length in the Common Export Key Parameters subsection is 16 bytes and if the source key is 16 bytes in length, and the CV contained in the Common Export Key Parameters subsection indicates that the source key should be a single length key, then abort the operation with an error;<br>C. if the CV Length in the Common Export Key Parameters subsection is 16 bytes and if the source key is 16 bytes in length with the two halves being equal, and the CV contained in the Common Export Key Parameters subsection indicates that the source key should have unique halves, then abort the operation with an error;<br>D. if the source key is triple length with all parts being unique, then the CV Length in the Common Export Key Parameters subsection must be either 0 or 16 bytes. In the latter case the CV contained in the Common Export Key Parameters subsection must contain binary zeroes, otherwise the operation is aborted with an error.<br>Obtain the transporter key length and key parts from FIG. 10.<br>  1) If the transporter key is contained in an RKX token, its length must be either double or triple. A single length transporter key will result in an error and the operation will be aborted.<br>  2) If the transporter key is contained in a CCA token, its length must be double. A single or triple length transporter key from a CCA token will result in an error and the operation will be aborted.<br>Perform EDE encryption on each 8-byte quantity of the source key according to the EDE multiple encipherment procedure using a CV as specified in the CCA Basic services Guide and Reference: Appendix C.<br>  i. The CV which will be used may be either the CV located in the Common Export Key Parameters subsection of the trusted block;<br>  ii. or if the CV Length contained in the Common Export Key Parameters subsection is 0, then the source key's CV will be used.<br>  iii. If the source key's CV is to be used, and if the source key is an RKX token which by definition |

TABLE 28-continued

| Step number and brief summary | Detailed description |
|---|---|
| | does not contain a CV, then the CV value to be used will be 16 bytes of binary zeroes.<br>iv. If the source key's CV is to be used, and if the source key is a CCA token of single length, then the preferred embodiment does not allow a CV of zero value to be used. A source key of single length and zero value CV is checked for in FIG. 12, step 1224 part B, as well as in FIG. 12, step 1226 part A.<br>Two methods of EDE multiple encipherment will be allowed depending upon the value of the CV:<br>Method 1: The CV to be used is not all binary zeroes. In this case, the source key can be either single or double length. A triple length source key may be exported with a CV containing all binary zeroes, but cannot be exported with a CV that is nonzero. When the CV to be used contains a nonzero value, the preferred embodiment requires that the transporter key be double length; however, it is possible that in future revisions of the invention, a triple length transporter key may be allowed. If the source key is either single or double length:<br>then the left half of the CV is exclusive-OR'ed with the transporter key's left half, making Key1 and Key3;<br>and the left half of the CV is exclusive-OR'ed with the transporter key's right half, making Key2.<br>If the source key is double length:<br>then the right half of the CV is exclusive-OR'ed with the transporter key's left half, making Key4 and Key6;<br>and the right half of the CV is exclusive-OR'ed with the transporter key's right half, making Key5.<br>If the source key is single length, then the EDE multiple encipherment procedure is performed on the source key with Key1, Key2, and Key3.<br>If the source key is double length; then an EDE multiple encipherment procedure is performed on the source key's left half with Key1, Key2, and Key3; and an EDE multiple encipherment procedure is performed on the source key's right half with Key4, Key5, and Key6.<br>Method 2: The CV to be used is all binary zeroes. In this case, the source key can be double length or triple length, not single. The transporter key may be either double length if contained in an RKX token or CCA token, or triple length if contained in an RKX token. If the source key is double length and the transporter key is double length:<br>The transport key's left half will be used as Key1, Key3, Key4, and Key6.<br>The transport key's right half will be used as Key2 and Key5.<br>The EDE multiple encipherment procedure is performed on the source key's left half with Key1, Key2, and Key3.<br>The EDE multiple encipherment procedure is performed on the source key's right half with Key4, Key5, and Key6.<br>If the source key is triple length and the transporter key is double length:<br>The transporter key's left half will be used as Key1, Key3, Key4, and Key6.<br>The transporter key's right half will be used as Key2 and Key5.<br>The EDE multiple encipherment procedure is performed on the source key's first third with Key1, Key2, and Key3.<br>The EDE multiple encipherment procedure is performed on the source key's middle third with Key4, Key5, and Key6.<br>The EDE multiple encipherment procedure is performed on the source key's last third with Key1, Key2, and Key3.<br>If the source key is double length and the transport key is triple length:<br>The transport key's first third will be used as Key1 |

TABLE 28-continued

| Step number and brief summary | Detailed description |
|---|---|
| | and Key4.
The transport key's middle third will be used as Key2 and Key5.
The transport key's last third will be used as Key3 and Key6.
The EDE multiple encipherment procedure is performed on the source key's left half with Key1, Key2, and Key3.
The EDE multiple encipherment procedure is performed on the source key's right half with Key4, Key5, and Key6.
If the source key is triple length and the transporter key is triple length:
The transport key's first third will be used as Key1 and Key4.
The transport key's middle third will be used as Key2 and Key5.
The transport key's last third will be used as Key3 and Key6.
The EDE multiple encipherment procedure is performed on the source key's first third with Key1, Key2, and Key3.
The EDE multiple encipherment procedure is performed on the source key's middle third with Key4, Key5, and Key6.
The EDE multiple encipherment procedure is performed on the source key's last third with Key1, Key2, and Key3. |
| 1518 - Build the CCA external key token | Build an external CCA token.
  A. Set the CCA token's version number to 0.
  B. If the source key being exported is either double or triple length and the Common Export Key Parameters subsection of the Rule section selected in FIG. 6, step 612, contains a CV Length of 16 bytes and the CV value in this section is equal to 16 bytes of binary zeroes, then set the external token's version number to 1.
  C. If the source key being exported is either double of triple length and the Common Export Key Parameters subsection of the Rule section selected in FIG. 6, step 612, contains a CV Length of 0 and the CV value in the source key is equal to 16 bytes of binary zeroes (or if the source key was an RKX token), then set the external token's version number to 1.
  D. Copy the CV contained in the Common Export Keys Parameters subsection to the CCA token's CV field if the CV Length in this subsection is nonzero; otherwise copy the CV contained in the source key to the CCA token's CV field.
  E. Calculate the Token Validation Value (TVV) and place it into the CCA token. |
| 1522 - Produce asymmetric encrypted output? | Using the trusted block rule section selected from FIG. 6, step 612, determine whether asymmetric encrypted output is to be produced. If not, proceed to step 1528. Else, proceed to step 1526. |
| 1526 - Encrypt the key to be exported with the public key contained in the certificate | Determine from the rule section selected from FIG. 6, step 612, whether PKCS1.2 output or RSA-OAEP output format is desired.
  A. If RSA-OAEP output is specified in the rule section, then format the source key from step 5021 if no output key variant was used, or format the result of the source key exclusive-OR'ed with the output key variant from step 1510, into an OAEP encryption block according to the method described in the RSA DSI PKCS#1-v2.0 documentation for RSAES-OAEP.
  B. If PKCS1.2 output was specified in the rule section, then format the source key from step 1502 if no output key variant was used, or format the result of the source key exclusive-OR'ed with the output key variant from step 1510, into a PKCS 1.2 encryption block according to the method described in the RSA DSI PKCS #1 documentation for block type 2. In the RSA PKCS #1 v2.0 standard, RSA terminology describes this as the RSAES-PKCS1-v1_5 format. |
| 1528 - Return to caller. | |

The following example of RKX usage takes the previously defined functions and illustrates how the function might be combined in an application to distribute a key to a remote device such as an ATM and keep a copy for local use. Some of the terminology used reflects typical terms used in ATM networks. The example illustrates a fairly complex real-world key distribution scenario, in which the following values are produced.

TMK (Terminal Master Key)—which is the root KEK used by the ATM to exchange other keys. The TMK is produced in two forms: encrypted under the ATM public key, so it can be sent to the ATM, and as an RKX token that will be used in subsequent calls to the RKX verb to produce other keys.

Key-encrypting key KEK1—that is encrypted under the TMK in a form that can be understood by the ATM.

PIN-encrypting key PINKEY—that will be used by the ATM to encrypt customer-entered PINs, and by the zSeries host to verify those PINs. The PINKEY is produced in two forms: encrypted under KEK1 in a form that can be understood by the ATM, and as a CCA internal key token with the proper PIN key control vector, encrypted under the CCA DES master key and suitable for use with the zSeries CEX2C coprocessor.

It takes seven steps to produce these keys using the RKX service. These steps use a combination of four rules that would be contained in a single trusted block. The rules are referred to as GENERATE1, GENERATE2, EXPORT1, EXPORT2, and EXPORT3.

The GENERATE1 Rule section includes the following information:
Rule ID set to ASCII "GENERAT1"
Flag indicating that a new key is to be generated with length of 16 bytes
Flag indicating that the new key is to be symmetrically encrypted in RKX token format
Flag indicating that the new key is to be also asymmetrically encrypted in PKCS 1.2 output format
An output key variant which will be exclusive OR'ed with the cleartext value of the generated key The GENERATE2 Rule section includes the following information:
Rule ID set to ASCII "GENERAT2"
Flag indicating that a new key is to be generated with length of 16 bytes
Flag indicating that the new key is to be symmetrically encrypted in RKX token format
Flag indicating that the new key is not to be asymmetrically encrypted.
An output key variant which will be exclusive OR'ed with the cleartext value of the generated key The EXPORT1 Rule section includes the following information:
Rule ID set to ASCII "EXPORT1"
Flag indicating that an existing source key is to be exported
Flag indicating that the exported key is to be symmetrically encrypted in CCA token format
Flag indicating that the new key is not to be asymmetrically encrypted.
Exported key length must be between 8 and 16 bytes in length
No output key variant
No transport key variant
The rule ID that must have been used to create the transport key is "GENERAT1"
The rule ID that must have been used to create the source key is "GENERAT2"

The EXPORT2 Rule section includes the following information:
Rule ID set to ASCII "EXPORT2"
Flag indicating that an existing source key is to be exported
Flag indicating that the exported key is to be symmetrically encrypted in CCA token format
Flag indicating that the new key is not to be asymmetrically encrypted.
Exported key length must be between 8 and 16 bytes in length
No output key variant
No transport key variant
The rule ID that must have been used to create the transport key is "GENERAT2"
The rule ID that must have been used to create the source key is "GENERAT2"

The EXPORT3 Rule section includes the following information:
Rule ID set to ASCII "EXPORT3"
Flag indicating that an existing source key is to be exported
Flag indicating that the exported key is to be symmetrically encrypted in CCA token format
Flag indicating that the new key is not to be asymmetrically encrypted.
Exported key length must be between 8 and 16 bytes in length
No output key variant
No transport key variant
A PINVER control vector to be applied to the cleartext transport key
The rule ID that must have been used to create the source key is "GENERAT2"
No rule ID present for the transport key, indicating that the transport key must be in CCA token format 1. Use RKX with rule GENERATE1 to generate a TMK for use with the ATM. The key will be output in two forms.
   $e_{Pu}(TMK)$: Encrypted under the ATM public key, supplied in the certificate parameter, CERT.
   RKX(TMK): As an RKX token, suitable for subsequent input to the RKX function.
2. Use RKX with rule GENERATE2 to generate a key-encrypting key KEK1 as an RKX token, RKX(KEK1).
3. Use RKX with rule GENERATE2 to generate a PIN key PINKEY as an RKX token: RKX(PINKEY). Page: 118 (Note that the RKX(KEK1) and the RKX(PINKEY) are not equivalent even though these keys were both generated using the GENERAT2 rule. The keys are different by virtue of the fact that the RKX service generates keys with a random number generator.)
4. Use RKX with rule EXPORT1 to export KEK1 encrypted under the TMK as a CCA token using a variant of zeroes applied to the TMK. This produces $e_{TMK}(KEK1)$.
5. Use RKX with rule EXPORT2 to export PINKEY encrypted under KEK1 as a CCA token using a variant of zeroes applied to KEK1. This produces $e_{KEK1}(PINKEY)$.
6. Use RKX with rule EXPORT3 to export PINKEY under KEK2, an existing CCA key-encrypting key on the local zSeries server. This produces $e_{KEK2}(PINKEY)$, with the CCA control vector for a PIN key.
7. Use the Key Import (KIM) function to import the PINKEY produced in step 6 into the local system as an operational key. This produces $e_{MK}(PINKEY)$, a copy of the key encrypted under the local DES master key (MK) and ready for use by CCA PIN API functions.

The Digital Signature Verify service (DSV) is used to verify a digital signature by providing the digital signature, the public key, the hash formatting method, and the hash of the data to be validated. Digital signatures may be verified using public keys that are contained in trusted blocks regardless of whether the trusted block also contains rules to govern its use when generating or exporting keys with the RKX verb (API).

A keyword named "TPK-ONLY", when provided as an input parameter to the DSV service, blocks the use of regular CCA RSA key tokens and only permit the use of public keys contained in trusted blocks to execute the digital signature verification. If the keyword TPK-ONLY (Trusted Public Key only) is present, the DSV service will abort with an error if the public key supplied in the PKA_public_key_identifier parameter is not a trusted block containing a trusted public key. This allows an application to have assurance that a sensitive signature verification operation can be limited to operation with trusted public keys.

Table 29 summarizes application programming interface used to carry out digital signature verification.

TABLE 29

| | | |
|---|---|---|
| rule_array_count | Input | Integer |
| rule_array | Input | String |
| PKA_public_key_identifier_length | Input | Integer |
| PKA_public_key_identifier | Input | String |
| hash_length | Input | Integer |
| hash | Input | String |
| signature_field_length | Input | Integer |
| signature_field | Input | String |

The elements of table 29 are as follows:

rule_array_count
  The rule_array_count parameter is a pointer to an integer variable containing the number of elements in the rule_array variable. The value must be zero, one, or two for this verb.

rule_array
  The rule_array parameter is a pointer to a string variable containing an array of keywords. The keywords are eight bytes in length, and must be left justified and padded on the right with space characters.

| Keyword | Meaning |
|---|---|
| Digital signature hash formatting method (one, optional, for RSA) | |
| X9.31 | Format the hash according to the ANSI X9.31 standard and compare to the digital signature. |
| PKCS-1.1 | Format the hash as specified in the RSA Data Security, Inc., Public Key Cryptography Standards #1 block type 01 and compare to the digital signature. The RSA PKCS #1 standard refers to this as RSASSA-PKCS-v1_5 when you BER encode the hash as described under the second note to the hash parameter. |
| ISO-9796 | Format the hash according to the ISO 9796-1 standard and compare to the digital signature. |
| PKCS-1.0 | Format the hash as specified in the RSA Data Security, Inc., Public Key Cryptography Standards #1 block type 00 and compare to the digital signature. |
| ZERO-PAD | The supplied hash value is placed in the low-order bit positions of a bit-string of the same length as the modulus with all non-hash-value bit positions set to zero. After ciphering the supplied digital signature, the result is compared to the hash-extended bit string. |

-continued

| Keyword | Meaning |
|---|---|
| PKA public key token type (optional) | |
| TPK-ONLY | The PKA_public_key_identifier must be a trusted block that contains two sections: (1) Trusted Block Information section which is required for all trusted blocks, and (2) Trusted Public Key section which contains the trusted public key and usage rules that indicate whether or not the trusted public key can be used in digital signature operations. |

Notes:
1. The hash for PKCS-1.1 and PKCS-1.0 should have been created using MD5 or SHA-1 algorithms.
2. The hash for ISO-9796 and ZERO-PAD can be obtained by any hashing method.

PKA_public_key_identifier_length
  The PKA_public_key_identifier_length parameter is a pointer to an integer variable containing the number of bytes of data in the PKA_public_key_identifier variable.

PKA_public_key_identifier
  The PKA_public_key_identifier parameter is a pointer to a string variable containing either a key label identifying a key-storage record of a registered public-key, a key label identifying a key-storage record of a Trusted Block, an RSA key token, or an internal Trusted Block key token.

hash_length
  The hash_length parameter is a pointer to an integer variable containing the number of bytes of data in the hash variable.

hash
  The hash parameter is a pointer to a string variable containing the hash information to be verified.

Notes:
1. For ISO-9796, the information identified by the hash parameter must be less than or equal to one-half of the number of bytes required to contain the modulus of the RSA key. Although ISO 9796-1 allows messages of arbitrary bit length up to one-half of the modulus length, this verb requires the input text to be a byte multiple up to the correct maximum length.
2. For PKCS-1.0 or PKCS-1.1, the information identified by the hash parameter must be 11 bytes shorter than the number of bytes required to contain the modulus of the RSA key, and should be the ASN.1 BER encoding of the hash value. You can create the BER encoding of an MD5 or SHA-1 value by prepending these strings to the 16-byte or 20-byte hash values, respectively: For MD5; X'3020300C 06082A86 4886F70D 02050500 0410' For SHA-1; X'30213009 06052B0E 03021A05 000414'
3. For ZERO-PAD, the information identified by the hash parameter must be less than or equal to the number of bytes required to contain the modulus of the RSA key.

signature_field_length
  The signature_field_length parameter is a pointer to an integer variable containing the number of bytes of data in the signature_field variable.

signature_field
  The signature_field parameter is a pointer to a string variable containing the digital signature. The digital signature bit-field is in the low-order bits of the byte string containing the digital signature.

Figure 16:
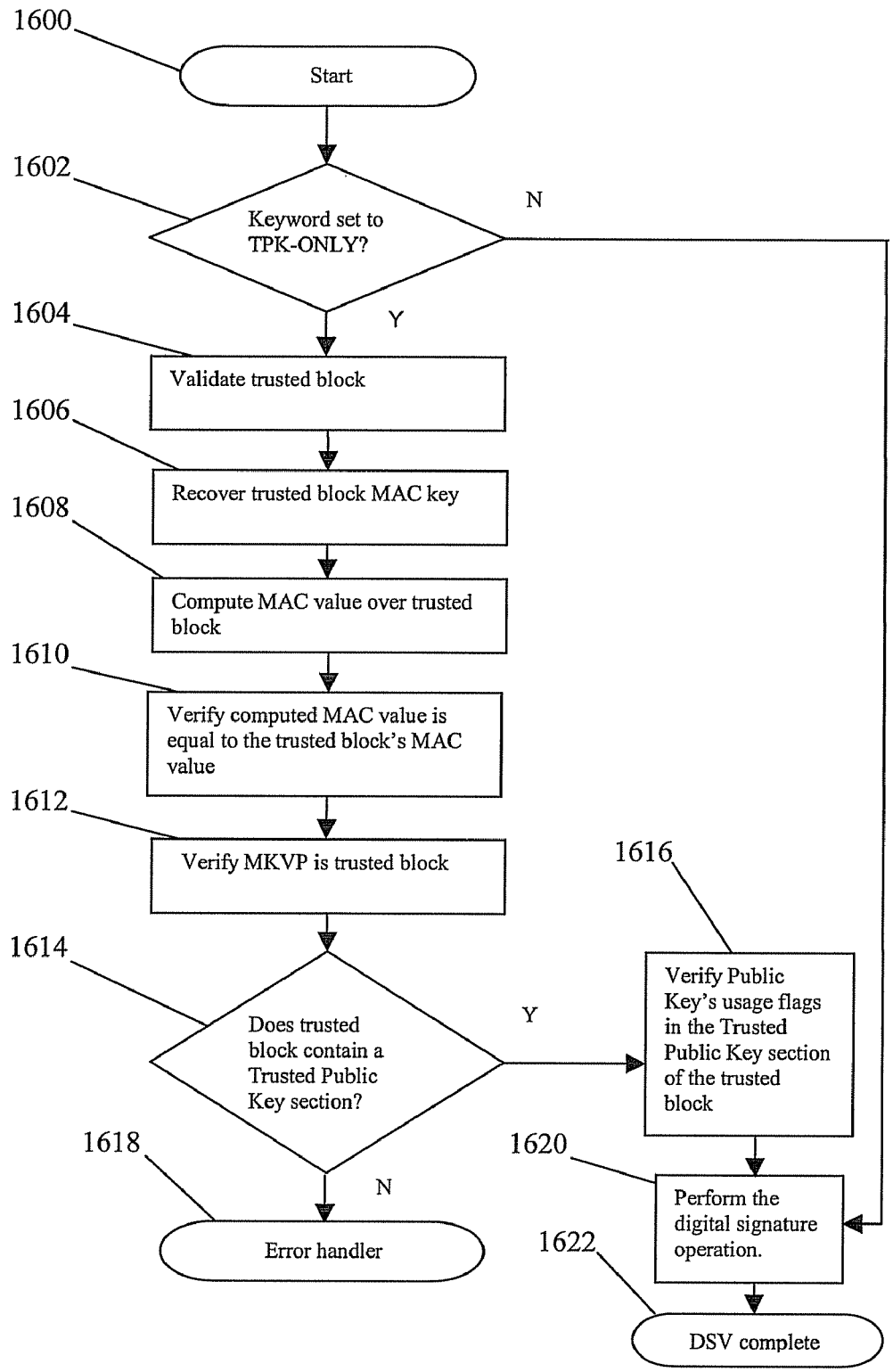
FIG. 16 is a flow chart depicting the application programming interface used to carry out digital signature verification according to an embodiment of the present invention.

FIG. 16 (DSV Service—main( )) 1600 together with Table 30 highlight the major steps involved in the digital signature verification process.

TABLE 30

| Step number and brief summary | Detailed description |
|---|---|
| 1600 - Keyword set to "TPK-ONLY"? | If the input keyword parameter is set to "TPK-ONLY", proceed to step 1604. Else, proceed to step 1620. |
| 1604 - Validate the trusted block | See FIG. 7 - validate_block( ) for details. Verify that all these conditions are met:<br>E. No unknown sections have been built into the trusted block,<br>F. The trusted block token identifier is internal,<br>G. The Active flag is enabled,<br>H. Fields within the trusted block have valid lengths and valid values.<br>If these conditions are not met, abort operation with an error (1618). |
| 1606 - Recover trusted block MAC key | See FIG. 8 - decrypt_tb_mac_key( ) for details.<br>D. Decrypt the confounder and MAC key located in the Protection Information section of the trusted block under a variant of the PKA Master Key and using an IV of binary zeroes.<br>E. The variant is the following hexadecimal string where each byte has even parity so that the parity of the XOR result of the PKA master key with the variant is not altered: C9 2E BB 35 D2 AA 56 D8-9C 66 E4 12 2B E7 A0 A3-B4 55 FF E4 D7 E7 F6 41.<br>F. Decryption is performed using triple DES CBC mode. |
| 1608 - Compute MAC value over the trusted block | See FIG. 9 - compute_tb_mac( ) for details.<br>D. Copy the trusted block to some temporary_block.<br>E. Fill in the following Protection Information section fields of the temporary block with binary zeroes: encrypted MAC key, ISO-16609 TDES CBC MAC value, MKVP (master key verification pattern).<br>F. Compute an ISO-16609 CBC mode TDES MAC over the entire temporary block contents using the recovered TDES MAC key and an IV of binary zeroes. |
| 1610 - Computed MAC = stored trusted block MAC? | The computed MAC from step 1608 is compared to the MAC value contained in the trusted block Protection Information section.<br>C. If equal, proceed to step 1612,<br>D. Else, abort operation with an error. |
| 1612 - Verify the MKVP in the trusted block | This routine obtains the MDC4 hash of the current PKA master key and compares the result to the MKVP contained in the Protection Information section of the trusted block. If a mismatch occurs, the MDC4 hash of the old PKA master key is obtained and compared to the MKVP contained in the Protection Information section of the trusted block. If a mismatch still occurs, abort the operation with an error (1618). |
| 1614 - Does trusted block contain a Trusted Public Key section? | If the trusted block does not contain a Trusted public Key section, abort the operation with an error. Else, proceed to step 1616. |
| 1616 - Verify Public Key's usage flags in the Trusted Public Key section of the trusted block | The Flags field in the Trusted Public Key section of the trusted block must be set to indicate that the public key in this section may be used in digital signature operations. If not, then abort the operation with an error (1618). Else, proceed to step 1620. |
| 1620 - Perform the digital signature operation | The digital signature operation is perform using either the public key within the Trusted Public Key section verified in step 8, or a public key supplied in the PKA_public_key_identifier when the keyword is not set to "TPK-ONLY". |
| 1622 - DSV complete | The service is complete. |

The flow charts/diagrams depicted herein are just examples. There may be many variations to these charts/diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for securely transferring symmetric cryptographic keys to other devices, wherein said method utilizes a data structure comprising instructions that are cryptographically protected against alteration or misuse, wherein said instructions further comprise a trusted block that defines specific key management policies that are permitted when applications employ said trusted block to generate or export said symmetric cryptographic keys, and wherein said applications comprise:

application programming interfaces (API);
      embedded firmware;
      operating system code;
      and hardware configured operations; and
    wherein said applications further comprise:
      a Trusted_Block_Create (TBC) function;
      a Remote_Key_Export (RKX) function;
      wherein said TBC function creates said trusted block; and
      wherein said RKX function uses said Trusted Block to generate or export symmetric keys according to a set of parameters in said Trusted Block; and
    wherein said trusted block has a number of fields containing rules that provide an ability to limit how said trusted block is used, thereby reducing the risk of said trusted block being employed in unintended ways or with unintended keys; and
    wherein said method comprises:
    receiving instructions from at least two separate individuals in order to create said trusted block.

2. The method according to claim 1, wherein said trusted block has a data structure comprising: zero or one trusted public key section, zero or more rule sections, zero or one trusted block label section, one trusted block information section, and zero or one application defined data section.

3. The method according to claim 1, wherein said trusted block is protected by a MAC that is computed over the contents of said data structure; and
    wherein said trusted block contains a public key and optional rules to control export of other keys associated with said other device(s) that use that public key; and
    wherein for remote key distribution, said public key will be the root certification key for the other device, and said public key will be used to verify the signature on public key certificates for individual devices; and
    wherein it is also possible for the Trusted Block to be used simply as a trusted public key container, in which case said public key in said trusted block will be used in functions such as Digital Signature Verify.

4. The method according to claim 1, wherein said rules in said trusted block further comprise a function to generate or export said symmetric cryptographic keys; and
    wherein said function to generate or export said symmetric cryptographic keys is said RKX function; and
    wherein said RKX function creates a RKX token; and
    wherein said RKX token holds said symmetric cryptographic keys so as to bind them to said trusted block, and allows sequences of RKX calls to be bound together as if they are an atomic operation.

5. The method according to claim 1, wherein said RKX function provides for secure transport of said symmetric keys from a security module to another device.

* * * * *